US012792595B2

(12) United States Patent
Singh et al.

(10) Patent No.: US 12,792,595 B2
(45) Date of Patent: Nov. 10, 2026

(54) ALERT AND SUPPRESSION UPDATING IN A CLUSTER COMPUTING SYSTEM

(71) Applicant: Cisco Technology, Inc., San Jose, CA (US)

(72) Inventors: Jagmohan Singh, Milpitas, CA (US); Hongxun Liu, Palo Alto, CA (US); Saketh Kurnool, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/966,022

(22) Filed: Dec. 2, 2024

(65) Prior Publication Data

US 2025/0094413 A1 Mar. 20, 2025

Related U.S. Application Data

(63) Continuation of application No. 18/103,374, filed on Jan. 30, 2023, now Pat. No. 12,182,104.

(51) Int. Cl.

*G06F 16/23* (2019.01)
*G06F 16/22* (2019.01)
*G06F 16/248* (2019.01)

(52) U.S. Cl.

CPC ...... *G06F 16/2379* (2019.01); *G06F 16/2228* (2019.01); *G06F 16/248* (2019.01)

(58) Field of Classification Search

CPC .................................................. G06F 16/2379
USPC ......................................................... 707/722
See application file for complete search history.

(56) References Cited

U.S. PATENT DOCUMENTS

| | | | | |
|---|---|---|---|---|
| 5,627,886 | A | 5/1997 | Bowman | |
| 6,816,461 | B1 * | 11/2004 | Scrandis | H04L 41/0631 370/242 |
| 7,937,344 | B2 | 5/2011 | Baum et al. | |
| 8,112,425 | B2 | 2/2012 | Baum et al. | |
| 8,751,529 | B2 | 6/2014 | Zhang et al. | |

(Continued)

FOREIGN PATENT DOCUMENTS

| | | | |
|---|---|---|---|
| CN | 112948206 | A | 6/2021 |
| CN | 113934547 | A | 1/2022 |

OTHER PUBLICATIONS

Splunk Enterprise 8.0.0 Overview, available online, retrieved May 20, 2020 from docs.splunk.com (17 pages).

(Continued)

*Primary Examiner* — Syling Yen

(74) *Attorney, Agent, or Firm* — SHOOK, HARDY & BACON L.L.P.

(57) ABSTRACT

A computer-implemented method includes a processing node sending a request that includes an identified alert record from a shared alert data store that is shared amongst a cluster of processing nodes including the processing node. The processing node receives, responsive to the request, a delete alert record uniquely identifying the identified alert record and including an annotation identifying a new delete alert record as being a delete alert record type. The processing node matches, responsive to the annotation, the delete alert record to a local copy of the identified alert record based on the delete alert record uniquely identifying the identified alert record. The processing node deletes, based on the annotation, the local copy of the identified alert record according to the delete alert record.

20 Claims, 29 Drawing Sheets

(56) References Cited

U.S. PATENT DOCUMENTS

| | | | |
|---|---|---|---|
| 8,788,525 B2 | 7/2014 | Neels et al. |
| 9,215,240 B2 | 12/2015 | Merza et al. |
| 9,286,413 B1 | 3/2016 | Coates et al. |
| 10,127,258 B2 | 11/2018 | Lamas et al. |
| 2009/0327429 A1 | 12/2009 | Hughes et al. |
| 2014/0068629 A1 | 3/2014 | Boller et al. |
| 2019/0098106 A1 | 3/2019 | Mungel et al. |

OTHER PUBLICATIONS

Splunk Cloud 8.0.2004 User Manual, available online, retrieved May 20, 2020 from docs.splunk.com (66 pages).
Splunk Quick Reference Guide, updated 2019, available online at https://www.splunk.com/pdfs/solution-guides/splunk-quick-reference-guide.pdf, retrieved May 20, 2020 (6 pages).
Carasso, David, "Exploring Splunk" published by CITO Research, New York, NY, Apr. 2012 (156 pages).
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010 (9 pages).
Splunk Inc., "Distributed Alert and Suppression Management in a Cluster Computing System", U.S. Appl. No. 17/588,079, including its prosecution history.

* cited by examiner

302

302A 127.0.0.1 – eva [10/Oct/2000:13:55:36-0700] “GET/apache.gif HTTP/1.0” 200 2326 0.0947
127.0.0.1 – emerson [10/Oct/2000:13:56:36-0700] “GET/eastwood.gif HTTP/1.0” 200 2980 0.0899

302C 302B 127.0.0.3 – eliza [10/Oct/2000:13:57:36-0700] “GET/ezra.gif HTTP/1.0” 200 2900 0.0857
[Sunday Oct 10 1:58:33 2010] [error] [client 127.10.1.1.015] File does not exist: /home/emmeline/pub_html/images/alisia.gif 302E 302D 91.205.189.15 - - [28/Apr/2014:18:22:16] *GET /oldlink?itemId=EST-14&JSESSIONID=SD6SL7FF7ADFF53113 HTTP 1.1" 200 1665 "http://www.buttercupgames.com/oldlink?itemId=EST-14" "Mozilla/5.0 (Windwos NT 6.1; WOW 64) AppleWebKit/536.5 (KHTML, like Gecko) Chrome/19.0.1084.46 Safari/536.5" 159

304 docker: {
container_id: f7360a148a670c4c257f4ee024be81284b6017d72ae41ea8ee5d
}
kubernetes: {
container_name: kube-apiserver
host: ip-172-20-43-173.ec2.internal
labels: {
k8s-app: kube-apiserver
}
master_url: https://100.64.0.1:443/api
namespace_id: e5af26aa-4ef9-11e8-a4e1-0a2bf2ab4bba
namespace_name: kube-system
pod_id: 0a73017b-4efa-11e8-a4e1-0a2bf2ab4bba
pod_name: kube-apiserver-ip-172-20-43-173.ec2.internal
}
log: I0503 23:04:12.595203 1 wrap.go:42] GET /apis/admissionregistrations.k8s.io/v1beta1/validatingwebhookconfiguration 200 [[kube-apiserver/v1.9.3 (linux/amd64) kubernetes/d283541] 127.0.0.1:55026 stream: stdout
time: 2018-05-03T23:04:12.619948395Z
}

304A

304B

306

| time | ID | CPU | memory |
|---|---|---|---|
| 10/10/00 12:01:00.013 | eliza | 14% | 80% |
| 10/10/00 12:01:05.153 | eva | 26% | 70% |

FIG. 3A

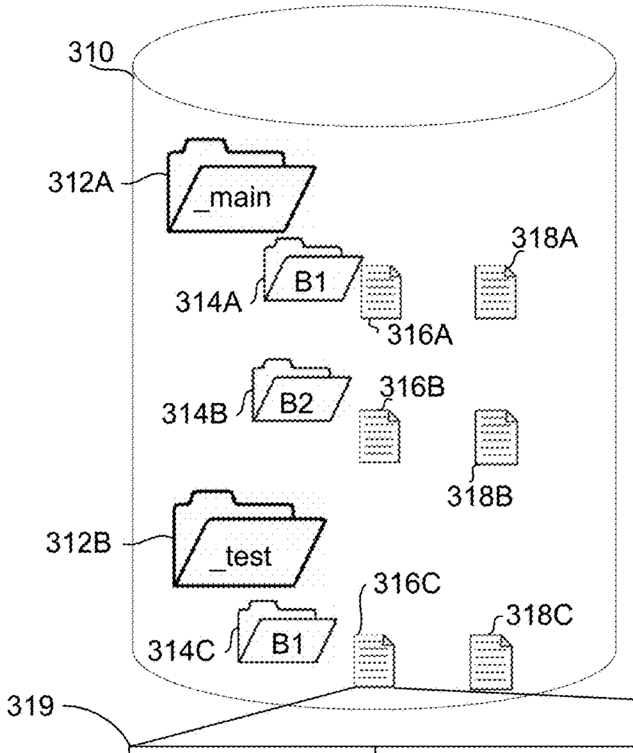

| | Time 332 | Machine Data 330 | Host 334 | Source 336 | Sourcetype 338 |
|---|---|---|---|---|---|
| 320 | 10/10/2000 1:55 p.m. | 127.0.0.1 – eva [10/Oct/2000:13:55:36-0700] "GET/apache.gif HTTP/1.0" 200 2326 0.0947 (1140, 1141, 1142, 1143, 1144, 1145, 1146) | www1 | access.log | access_combined |
| 322 | 10/10/2000 1:56 p.m. | 127.0.0.1 – emerson [10/Oct/2000:13:56:36-0700] "GET/ eastwood.gif HTTP/1.0" 200 2980 0.0899 | www2 | access.log | access_combined |
| 324 | 10/10/2000 1:57 p.m. | 127.0.0.3 – eliza [10/Oct/2000:13:57:36-0700] "GET/ezra.gif HTTP/1.0" 200 2900 0.0857 | www2 | access.log | access_combined |
| 326 | 10/10/2000 1:58 p.m. | [Sunday Oct 10 1:58:33 2010] [error] [client 127.10.1.1.015] File does not exist: /home/emmeline/pub_html/images/alisia.gif | www2 | error.log | apache_error |

FIG. 3B

| 1 | 2 | 3 | 4 | 5 | 6 | 7 | 8 | 9 | 10 | 11 | 12 |
|---|---|---|---|---|---|---|---|---|---|---|---|
| 16:21:20.000 3/1/17 | 16:21:45.000 3/1/17 | 16:22:30.000 3/1/17 | 16:22:53.020 3/1/17 | 16:22:54.815 3/1/17 | 16:24:15.100 3/1/17 | 16:24:37.610 3/1/17 | 16:26:01.000 3/1/17 | 16:27:50.000 3/1/17 | 16:27:56.470 3/1/17 | 16:28:08.320 3/1/17 | 16:28:17.000 3/1/17 |
| Address1 | Address2 | Address3 | Address4 | Address5 | Address6 | Address7 | Address8 | Address9 | Address10 | Address11 | Address12 |

319

| | Time 332 | Machine Data 330 | Host 334 | Source 336 | Sourcetype 338 |
|---|---|---|---|---|---|
| 320 | 10/10/2000 1:55 p.m. | 127.0.0.1 – eva [10/Oct/2000:13:55:36-0700] "GET/apache.gif HTTP/1.0" 200 2326 0.0947 | www1 | access.log | access_combined |
| 322 | 10/10/2000 1:56 p.m. | 127.0.0.1 – emerson [10/Oct/2000:13:56:36-0700] "GET/ eastwood.gif HTTP/1.0" 200 2980 0.0899 | www2 | access.log | access_combined |
| 324 | 10/10/2000 1:57 p.m. | 127.0.0.3 – eliza [10/Oct/2000:13:57:36-0700] "GET/ezra.gif HTTP/1.0" 200 2900 0.0857 | www2 | access.log | access_combined |
| 326 | 10/10/2000 1:58 p.m. | [Sunday Oct 10 1:58:33 2010] [error] [client 127.10.1.1.015] File does not exist: /home/emmeline/pub_html/images/alisia.gif | www2 | error.log | apache_error |

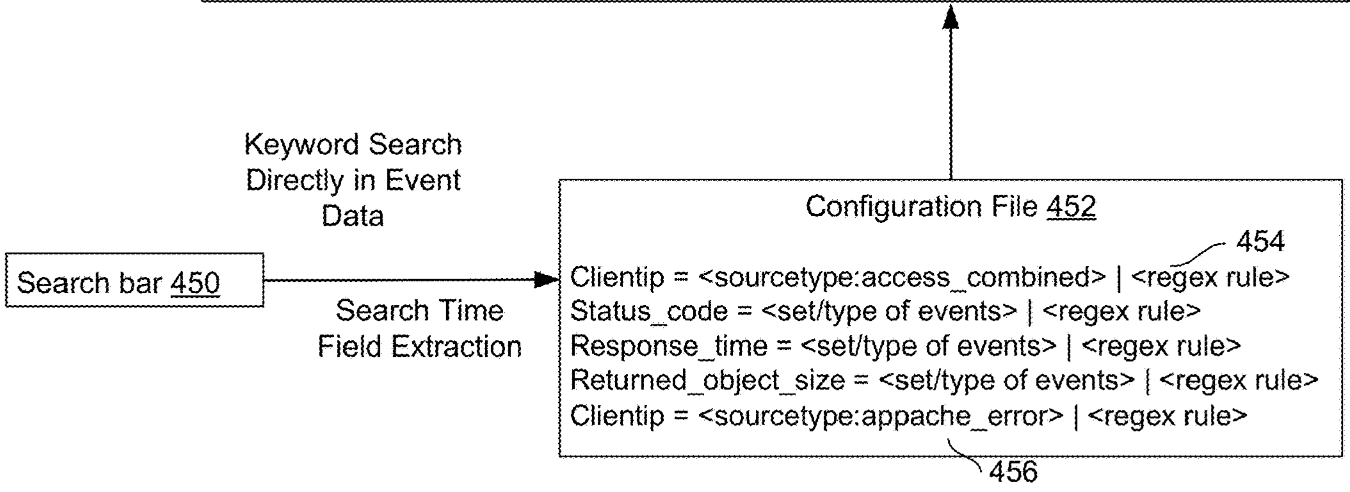

FIG. 4C

1600

| SAVED_SEARCH_SELECTOR | ALERT_ID |
|---|---|
| 21898631-D8E8-45A1-BFAE-470D21545666;admin;search;testalert; | 1666807503,,scheduler__admin__search__testalert_at_1666807500_665 |
| 21898631-D8E8-45A1-BFAE-470D21545666;admin;search;testalert; | 1666807803,,scheduler__admin__search__testalert_at_1666807800_666 |

*FIG. 16A*

1602

| SAVED_SEARCH_SELECTOR | ALERT_ID | TRIGGER_TIME | EXPIRATION_TIME (TTL) | TOTAL_ALERTS_COUNT | OTHER ATTRIBUTES |
|---|---|---|---|---|---|
| GUID1;SSS; | GUID1;USER;APP;ALERT1 | | | | ... |
| GUID1;SSS; | GUID1;USER;APP;ALERT2 | | | | ... |
| GUID1;USER;APP; ALERT1 | #TOTAL_ALERTS | | | 1 | ... |
| GUID1;USER;APP; ALERT1 | T1,,SID1 | T1 | TE1 | | ... |
| GUID1;USER;APP; ALERT2 | #TOTAL_ALERTS | | | 2 | ... |
| GUID1;USER;APP; ALERT2 | T2,,SID2 | T2 | TE2 | | ... |
| GUID1;USER;APP; ALERT2 | T3,,SID3 | T3 | TE3 | | ... |

*FIG. 16B*

1604

| SAVED_SEARCH_SELECTOR | ALERT_ID | TRIGGER_TIME | EXPIRATION_TIME (TTL) |
|---|---|---|---|
| 21898631-D8E8-45A1-BFAE-470D21545666;ADMIN;SEARCH;TESTALERT; | 1666813801,,SCHEDULER__ADMIN__SEARCH__TESTALERT_AT_1666813800_688 | 1666813801 | 1666817401 |

*FIG. 16C*

1606

| SAVED_SEARCH_SELECTOR | ALERT_ID | TRIGGER_TIME | EXPIRATION_TIME (TTL) |
|---|---|---|---|
| 21898631-D8E8-45A1-BFAE-470D21545666;ADMIN;SEARCH;TESTALERT; | 1666814513,D,SCHEDULER__ADMIN__SEARCH__TESTALERT_AT_1666813800_688 | 1666813801 | 1666817401 |

*FIG. 16D*

1608

| SAVED_SEARCH_SELECTOR | ALERT_ID | TRIGGER_TIME | EXPIRATION_TIME (TTL) | TOTAL_ALERTS_COUNT | OTHER ATTRIBUTES |
|---|---|---|---|---|---|
| GUID1;SSS; | GUID1;USER;APP;ALERT1 | | | | ... |
| GUID1;SSS; | GUID1;USER;APP;ALERT2 | | | | ... |
| GUID1;USER;APP;ALERT1 | #TOTAL_ALERTS | | | 1 | ... |
| GUID1;USER;APP;ALERT1 | T1,,SID1 | T1 | TE1 | | ... |
| GUID1;USER;APP;ALERT2 | #TOTAL_ALERTS | | | 2 | ... |
| GUID1;USER;APP;ALERT2 | T3,,SID3 | T3 | TE3 | | ... |
| GUID1;USER;APP;ALERT2 | T2NOW,D,SID2 | T2 | TE2 | | ... |

*FIG. 16E*

1610

| SAVED_SEARCH_ SELECTOR | ALERT_ID | TRIGGER_ TIME | EXPIRATION_TIME (TTL) | TOTAL_ALERTS _COUNT | OTHER ATTRIBUTES |
|---|---|---|---|---|---|
| GUID1;SSS; | GUID1;USER;APP;ALERT1 | | | | |
| GUID1;SSS; | GUID1;USER;APP;ALERT2 | | | | |
| GUID1;USER;APP; ALERT1 | #TOTAL_ALERTS | | | 2 | |
| GUID1;USER;APP; ALERT1 | T1,,SID1 | T1 | TE1 | | |
| GUID1;USER;APP; ALERT1 | T4,,SID4 | T4 | TE4 | | |
| GUID1;USER;APP; ALERT2 | #TOTAL_ALERTS | | | 2 | |
| GUID1;USER;APP; ALERT2 | T3,,SID3 | T3 | TE3 | | |
| GUID1;USER;APP; ALERT2 | T2NOW,D,SID2 | T2 | TE2 | | |

*FIG. 16F*

1612

| SAVED_SEARCH_SELECTOR | ALERT_ID | TRIGGER_TIME | EXPIRATION_TIME (TTL) | TOTAL_ALERTS_COUNT | OTHER ATTRIBUTES |
|---|---|---|---|---|---|
| GUID1;SSS; | GUID1;USER;APP;ALERT1 | | | | ... |
| GUID1;SSS; | GUID1;USER;APP;ALERT2 | | | | ... |
| GUID1;USER;APP;ALERT1 | #TOTAL_ALERTS | | | 2 | ... |
| GUID1;USER;APP;ALERT1 | T1NOW,D,SID1 | T1 | TE1 | | ... |
| GUID1;USER;APP;ALERT1 | T4NOW,D,SID4 | T4 | TE4 | | ... |
| GUID1;USER;APP;ALERT2 | #TOTAL_ALERTS | | | 2 | ... |
| GUID1;USER;APP;ALERT2 | T3,,SID3 | T3 | TE3 | | ... |
| GUID1;USER;APP;ALERT2 | TNOW,D,SID2 | T2 | TE2 | | ... |

*FIG. 16G*

1614

| SAVED_SEARCH_ SELECTOR | ALERT_ID | TRIGGER_ TIME | EXPIRATION_TIME (TTL) | TOTAL_ALERTS _COUNT | OTHER ATTRIBUTES |
|---|---|---|---|---|---|
| GUID1;SSS; | GUID1;USER;APP;ALERT2 | | | | ... |
| GUID1;USER;APP; ALERT1 | #TOTAL_ALERTS | | | 0 | ... |
| GUID1;USER;APP; ALERT2 | #TOTAL_ALERTS | | | 2 | ... |
| GUID1;USER;APP; ALERT2 | T3,,SID3 | T3 | TE3 | | ... |
| GUID1;USER;APP; ALERT2 | TNOW,D,SID2 | T2 | TE2 | | ... |

*FIG. 16H*

EXAMPLES OF ALERT RECORDS 1700

ALERT AND SUPPRESSION UPDATING IN A CLUSTER COMPUTING SYSTEM

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later can provide greater flexibility because it enables an analyst to analyze all of the generated data instead of only a fraction of it. Although the availability of vastly greater amounts of diverse data on diverse data systems provides opportunities to derive new insights, it also gives rise to technical challenges to search and analyze the data in a performant way.

BRIEF DESCRIPTION OF THE DRAWINGS

Illustrative examples are described in detail below with reference to the following figures:

FIG. 3A is a block diagram illustrating an embodiment of machine data received by the data intake and query system.

FIGS. 3B and 3C are block diagrams illustrating embodiments of various data structures for storing data processed by the data intake and query system.

FIG. 4C is a block diagram illustrating an embodiment of a configuration file that includes various extraction rules that can be applied to events.

FIGS. 16A, 16B, 16C, 16D, 16E, 16F, 16G, and 16H show example tables.

DETAILED DESCRIPTION

Figure 2:
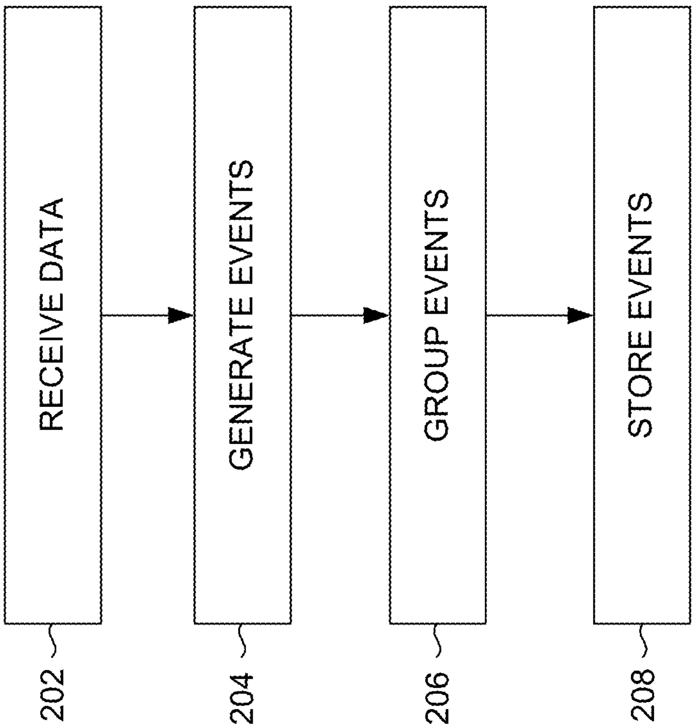
FIG. 2 is a flow diagram illustrating an embodiment of a routine implemented by the data intake and query system to process, index, and store data.

Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that concurrently report these types of information.

These challenges can be addressed by using an event-based data intake and query system, such as the SPLUNK® ENTERPRISE, SPLUNK® CLOUD, or SPLUNK® CLOUD SERVICE system developed by Splunk Inc. of San Francisco, California. These systems represent the leading platform for providing real-time operational intelligence that enables organizations to collect, index, and search machine data from various websites, applications, servers, networks, and mobile devices that power their businesses. The data intake and query system is particularly useful for analyzing data which is commonly found in system log files, network data, metrics data, tracing data, and other data input sources.

In the data intake and query system, machine data is collected and stored as "events." An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp. The time stamp may be derived from the portion of machine data in the event, determined through interpolation between temporally proximate events having known timestamps, and/or may be determined based on other configurable rules for associating timestamps with events.

In some instances, machine data can have a predefined structure, where data items with specific data formats are stored at predefined locations in the data. For example, the machine data may include data associated with fields in a database table. In other instances, machine data may not have a predefined structure (e.g., may not be at fixed, predefined locations), but may have repeatable (e.g., non-random) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The machine data generated by such data sources can include, for example and without limitation, server log files, activity log files, configuration files, messages, network packet data, performance measurements, sensor measurements, etc.

The data intake and query system can use flexible schema to specify how to extract information from events. A flexible schema may be developed and redefined as needed. The flexible schema can be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp, and stores the events. The system enables users to run queries against the stored events to, for example, retrieve events that meet filter criteria specified in a query, such as criteria indicating certain keywords or having specific values in defined fields. Additional query terms can further process the event data, such as, by transforming the data, etc.

As used herein, the term "field" can refer to a location in the machine data of an event containing one or more values for a specific data item. A field may be referenced by a field name associated with the field. As will be described in more detail herein, in some cases, a field is defined by an extraction rule (e.g., a regular expression) that derives one or more values or a sub-portion of text from the portion of machine data in each event to produce a value for the field for that event. The set of values produced are semantically-related (such as IP address), even though the machine data in each event may be in different formats (e.g., semantically-related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file can include one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or sourcetype. When events are to be searched based on a particular field name specified in a search, the system can use one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system can utilize a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from machine data or events. In some cases, an extraction rule comprises a regular expression, where a sequence of characters form a search pattern. An extraction rule comprising a regular expression is referred to herein as a regex rule. The system applies a regex rule to machine data or an event to extract values for a field associated with the regex rule, where the values are extracted by searching the machine data/event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields specified in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources.

In some embodiments, the configuration files and/or extraction rules described above can be stored in a catalog, such as a metadata catalog. In certain embodiments, the content of the extraction rules can be stored as rules or actions in the metadata catalog. For example, the identification of the data to which the extraction rule applies can be referred to a rule and the processing of the data can be referred to as an action.

1.0. Operating Environment

Figure 1:
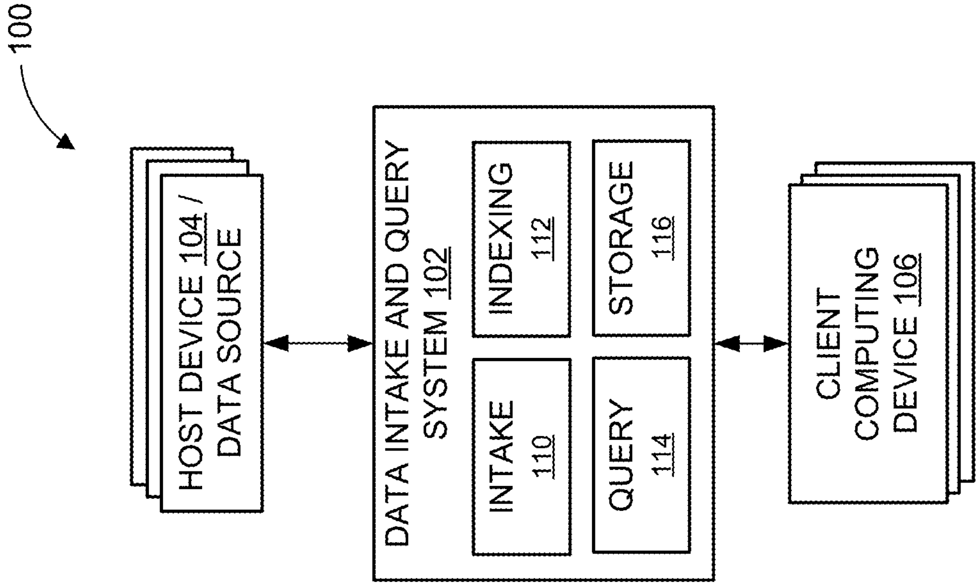
FIG. 1 is a block diagram of an embodiment of a data processing environment.

FIG. 1 is a block diagram of an embodiment of a data processing environment 100. In the illustrated embodiment, the environment 100 includes a data intake and query system 102, one or more host devices 104, and one or more client computing devices 106 (generically referred to as client device(s) 106).

The data intake and query system 102, host devices 104, and client devices 106 can communicate with each other via one or more networks, such as a local area network (LAN), wide area network (WAN), private or personal network, cellular networks, intranetworks, and/or internetworks using any of wired, wireless, terrestrial microwave, satellite links, etc., and may include the Internet. Although not explicitly shown in FIG. 1, it will be understood that a client computing device 106 can communicate with a host device 104 via one or more networks. For example, if the host device 104 is configured as a web server and the client computing device 106 is a laptop, the laptop can communicate with the web server to view a website.

A client device 106 can correspond to a distinct computing device that can configure, manage, or sends queries to the system 102. Examples of client devices 106 may include, without limitation, smart phones, tablet computers, handheld computers, wearable devices, laptop computers, desktop computers, servers, portable media players, gaming devices, or other device that includes computer hardware (e.g., processors, non-transitory, computer-readable media, etc.) and so forth. In certain cases, a client device 106 can include a hosted, virtualized, or containerized device, such as an isolated execution environment, that shares computing resources (e.g., processor, memory, etc.) of a particular machine with other isolated execution environments.

The client devices 106 can interact with the system 102 (or a host device 104) in a variety of ways. For example, the client devices 106 can communicate with the system 102 (or a host device 104) over an Internet (Web) protocol, via a gateway, via a command line interface, via a software developer kit (SDK), a standalone application, etc. As another example, the client devices 106 can use one or more executable applications or programs to interface with the system 102.

A host device 104 can correspond to a distinct computing device or system that includes or has access to data that can be ingested, indexed, and/or searched by the system 102. Accordingly, in some cases, a client device 106 may also be a host device 104 (e.g., it can include data that is ingested by the system 102 and it can submit queries to the system 102). The host devices 104 can include, but are not limited to, servers, sensors, routers, personal computers, mobile devices, internet of things (IoT) devices, or hosting devices, such as computing devices in a shared computing resource environment on which multiple isolated execution environment (e.g., virtual machines, containers, etc.) can be instantiated, or other computing devices in an IT environment (e.g., device that includes computer hardware, e.g., processors, non-transitory, computer-readable media, etc.). In certain cases, a host device 104 can include a hosted, virtualized, or containerized device, such as an isolated execution environment, that shares computing resources (e.g., processor, memory, etc.) of a particular machine (e.g., a hosting device or hosting machine) with other isolated execution environments.

As mentioned host devices 104 can include or have access to data sources for the system 102. The data sources can include machine data found in log files, data files, distributed file systems, streaming data, publication-subscribe (pub/sub) buffers, directories of files, data sent over a network, event logs, registries, streaming data services (examples of which can include, by way of non-limiting example, Amazon's Simple Queue Service ("SQS") or Kinesis™ services, devices executing Apache Kafka™ software, or devices implementing the Message Queue Telemetry Transport (MQTT) protocol, Microsoft Azure EventHub, Google Cloud PubSub, devices implementing the Java Message Service (JMS) protocol, devices implementing the Advanced Message Queuing Protocol (AMQP)), cloud-based services (e.g., AWS, Microsoft Azure, Google Cloud, etc.), operating-system-level virtualization environments (e.g., Docker), container orchestration systems (e.g., Kubernetes), virtual machines using full virtualization or paravirtualization, or other virtualization technique or isolated execution environments.

In some cases, one or more applications executing on a host device may generate various types of machine data during operation. For example, a web server application executing on a host device 104 may generate one or more web server logs detailing interactions between the web server and any number of client devices 106 or other devices. As another example, a host device 104 implemented as a router may generate one or more router logs that record information related to network traffic managed by the router. As yet another example, a database server application executing on a host device 104 may generate one or more logs that record information related to requests sent from other devices (e.g., web servers, application servers, client devices, etc.) for data managed by the database server. Similarly, a host device 104 may generate and/or store computing resource utilization metrics, such as, but not limited to, CPU utilization, memory utilization, number of processes being executed, etc. Any one or any combination of the files or data generated in such cases can be used as a data source for the system 102.

In some embodiments, an application may include a monitoring component that facilitates generating performance data related to host device's operating state, including monitoring network traffic sent and received from the host device and collecting other device and/or application-specific information. A monitoring component may be an integrated component of the application, a plug-in, an extension, or any other type of add-on component, or a stand-alone process.

Such monitored information may include, but is not limited to, network performance data (e.g., a URL requested, a connection type (e.g., HTTP, HTTPS, etc.), a connection start time, a connection end time, an HTTP status code, request length, response length, request headers, response headers, connection status (e.g., completion, response time (s), failure, etc.)) or device performance information (e.g., current wireless signal strength of the device, a current connection type and network carrier, current memory performance information, processor utilization, memory utilization, a geographic location of the device, a device orientation, and any other information related to the operational state of the host device, etc.), device profile information (e.g., a type of client device, a manufacturer, and model of the device, versions of various software applications installed on the device, etc.) In some cases, the monitoring component can collect device performance information by monitoring one or more host device operations, or by making calls to an operating system and/or one or more other applications executing on a host device for performance information. The monitored information may be stored in one or more files and/or streamed to the system 102.

In general, a monitoring component may be configured to generate performance data in response to a monitor trigger in the code of a client application or other triggering application event, as described above, and to store the performance data in one or more data records. Each data record, for example, may include a collection of field-value pairs, each field-value pair storing a particular item of performance data in association with a field for the item. For example, a data record generated by a monitoring component may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

In some embodiments, such as in a shared computing resource environment (or hosted environment), a host device 104 may include logs or machine data generated by an application executing within an isolated execution environment (e.g., web server log file if the isolated execution environment is configured as a web server or database server log files if the isolated execution environment is configured as database server, etc.), machine data associated with the computing resources assigned to the isolated execution environment (e.g., CPU utilization of the portion of the CPU allocated to the isolated execution environment, memory utilization of the portion of the memory allocated to the isolated execution environment, etc.), logs or machine data generated by an application that enables the isolated execution environment to share resources with other isolated execution environments (e.g., logs generated by a Docker manager or Kubernetes manager executing on the host device 104), and/or machine data generated by monitoring the computing resources of the host device 104 (e.g., CPU utilization, memory utilization, etc.) that are shared between the isolated execution environments. Given the separation (and isolation) between isolated execution environments executing on a common computing device, in certain embodiments, each isolated execution environment may be treated as a separate host device 104 even if they are, in fact, executing on the same computing device or hosting device.

Accordingly, as used herein, obtaining data from a data source may refer to communicating with a host device 104 to obtain data from the host device 104 (e.g., from one or more data source files, data streams, directories on the host device 104, etc.). For example, obtaining data from a data source may refer to requesting data from a host device 104 and/or receiving data from a host device 104. In some such cases, the host device 104 can retrieve and return the requested data from a particular data source and/or the system 102 can retrieve the data from a particular data source of the host device 104 (e.g., from a particular file stored on a host device 104).

The data intake and query system 102 can ingest, index, and/or store data from heterogeneous data sources and/or host devices 104. For example, the system 102 can ingest, index, and/or store any type of machine data, regardless of the form of the machine data or whether the machine data matches or is similar to other machine data ingested, indexed, and/or stored by the system 102. In some cases, the system 102 can generate events from the received data, group the events, and store the events in buckets. The system 102 can also search heterogeneous data that it has stored or search data stored by other systems (e.g., other system 102 systems or other non-system 102 systems). For example, in response to received queries, the system 102 can assign one or more components to search events stored in the storage system or search data stored elsewhere.

As will be described herein in greater detail below, the system 102 can use one or more components to ingest, index, store, and/or search data. In some embodiments, the system 102 is implemented as a distributed system that uses multiple components to perform its various functions. For example, the system 102 can include any one or any combination of an intake system 110 (including one or more components) to ingest data, an indexing system 112 (including one or more components) to index the data, a storage system 116 (including one or more components) to store the data, and/or a query system 114 (including one or more components) to search the data, etc.

In the illustrated embodiment, the system 102 is shown having four subsystems 110, 112, 114, 116. However, it will be understood that the system 102 may include any one or any combination of the intake system 110, indexing system 112, query system 114, or storage system 116. Further, in certain embodiments, one or more of the intake system 110, indexing system 112, query system 114, or storage system 116 may be used alone or apart from the system 102. For example, the intake system 110 may be used alone to glean information from streaming data that is not indexed or stored by the system 102, or the query system 114 may be used to search data that is unaffiliated with the system 102.

In certain embodiments, the components of the different systems may be distinct from each other or there may be some overlap. For example, one component of the system 102 may include some indexing functionality and some searching functionality and thus be used as part of the indexing system 112 and query system 114, while another computing device of the system 102 may only have ingesting or search functionality and only be used as part of those respective systems. Similarly, the components of the storage system 116 may include data stores of individual components of the indexing system and/or may be a separate shared data storage system, like Amazon S3, that is accessible to distinct components of the intake system 110, indexing system 112, and query system 114.

In some cases, the components of the system 102 are implemented as distinct computing devices having their own computer hardware (e.g., processors, non-transitory, computer-readable media, etc.) and/or as distinct hosted devices (e.g., isolated execution environments) that share computing resources or hardware in a shared computing resource environment.

For simplicity, references made herein to the intake system 110, indexing system 112, storage system 116, and query system 114 can refer to those components used for ingesting, indexing, storing, and searching, respectively. However, it will be understood that although reference is made to two separate systems, the same underlying component may be performing the functions for the two different systems. For example, reference to the indexing system indexing data and storing the data in the storage system 116 or the query system searching the data may refer to the same component (e.g., same computing device or hosted device) indexing the data, storing the data, and then searching the data that it stored.

As will be described in greater detail herein, the intake system 110 can receive data from the host devices 104 or data sources, perform one or more preliminary processing operations on the data, and communicate the data to the indexing system 112, query system 114, storage system 116, or to other systems (which may include, for example, data processing systems, telemetry systems, real-time analytics systems, data stores, databases, etc., any of which may be operated by an operator of the system 102 or a third party). Given the amount of data that can be ingested by the intake system 110, in some embodiments, the intake system can include multiple distributed computing devices or components working concurrently to ingest the data.

The intake system 110 can receive data from the host devices 104 in a variety of formats or structures. In some embodiments, the received data corresponds to raw machine data, structured or unstructured data, correlation data, data files, directories of files, data sent over a network, event logs, registries, messages published to streaming data sources, performance metrics, sensor data, image and video data, etc.

The preliminary processing operations performed by the intake system 110 can include, but is not limited to, associating metadata with the data received from a host device 104, extracting a timestamp from the data, identifying individual events within the data, extracting a subset of machine data for transmittal to the indexing system 112, enriching the data, etc. As part of communicating the data to the indexing system, the intake system 110 can route the data to a particular component of the intake system 110 or dynamically route the data based on load-balancing, etc. In certain cases, one or more components of the intake system 110 can be installed on a host device 104.

1.4.2. Indexing System Overview

As will be described in greater detail herein, the indexing system 112 can include one or more components (e.g., indexing nodes) to process the data and store it, for example, in the storage system 116. As part of processing the data, the indexing system can identify distinct events within the data, timestamps associated with the data, organize the data into buckets or time series buckets, convert editable buckets to non-editable buckets, store copies of the buckets in the storage system 116, merge buckets, generate indexes of the data, etc. In addition, the indexing system 112 can update various catalogs or databases with information related to the buckets (pre-merged or merged) or data that is stored in the storage system 116, and can communicate with the intake system 110 about the status of the data storage.

As will be described in greater detail herein, the query system 114 can include one or more components to receive, process, and execute queries. In some cases, the query system 114 can use the same component to process and execute the query or use one or more components to receive and process the query (e.g., a search head) and use one or more other components to execute at least a portion of the query (e.g., search nodes). In some cases, a search node and an indexing node may refer to the same computing device or hosted device performing different functions. In certain cases, a search node can be a separate computing device or hosted device from an indexing node.

Queries received by the query system 114 can be relatively complex and identify a set of data to be processed and a manner of processing the set of data from one or more client devices 106. In certain cases, the query can be implemented using a pipelined command language or other query language. As described herein, in some cases, the query system 114 can execute parts of the query in a distributed fashion (e.g., one or more mapping phases or parts associated with identifying and gathering the set of data identified in the query) and execute other parts of the query on a single component (e.g., one or more reduction phases). However, it will be understood that in some cases multiple components can be used in the map and/or reduce functions of the query execution.

In some cases, as part of executing the query, the query system 114 can use one or more catalogs or databases to identify the set of data to be processed or its location in the storage system 116 and/or can retrieve data from the storage system 116. In addition, in some embodiments, the query system 114 can store some or all of the query results in the storage system 116.

In some cases, the storage system 116 may include one or more data stores associated with or coupled to the components of the indexing system 112 that are accessible via a system bus or local area network. In certain embodiments, the storage system 116 may be a shared storage system 116, like Amazon S3 or Google Cloud Storage, that are accessible via a wide area network.

As mentioned and as will be described in greater detail below, the storage system 116 can be made up of one or more data stores storing data that has been processed by the indexing system 112. In some cases, the storage system includes data stores of the components of the indexing system 112 and/or query system 114. In certain embodiments, the storage system 116 can be implemented as a shared storage system 116. The shared storage system 116 can be configured to provide high availability, highly resilient, low loss data storage. In some cases, to provide the high availability, highly resilient, low loss data storage, the shared storage system 116 can store multiple copies of the data in the same and different geographic locations and across different types of data stores (e.g., solid state, hard drive, tape, etc.). Further, as data is received at the shared storage system 116 it can be automatically replicated multiple times according to a replication factor to different data stores across the same and/or different geographic locations. In some embodiments, the shared storage system 116 can correspond to cloud storage, such as Amazon Simple Storage Service (S3) or Elastic Block Storage (EBS), Google Cloud Storage, Microsoft Azure Storage, etc.

In some embodiments, indexing system 112 can read to and write from the shared storage system 116. For example, the indexing system 112 can copy buckets of data from its local or shared data stores to the shared storage system 116. In certain embodiments, the query system 114 can read from, but cannot write to, the shared storage system 116. For example, the query system 114 can read the buckets of data stored in shared storage system 116 by the indexing system 112, but may not be able to copy buckets or other data to the shared storage system 116. In some embodiments, the intake system 110 does not have access to the shared storage system 116. However, in some embodiments, one or more components of the intake system 110 can write data to the shared storage system 116 that can be read by the indexing system 112.

As described herein, in some embodiments, data in the system 102 (e.g., in the data stores of the components of the indexing system 112, shared storage system 116, or search nodes of the query system 114) can be stored in one or more time series buckets. Each bucket can include raw machine data associated with a timestamp and additional information about the data or bucket, such as, but not limited to, one or more filters, indexes (e.g., TSIDX, inverted indexes, keyword indexes, etc.), bucket summaries, etc. In some embodiments, the bucket data and information about the bucket data is stored in one or more files. For example, the raw machine data, filters, indexes, bucket summaries, etc. can be stored in respective files in or associated with a bucket. In certain cases, the group of files can be associated together to form the bucket.

The system 102 can include additional components that interact with any one or any combination of the intake system 110, indexing system 112, query system 114, and/or storage system 116. Such components may include, but are not limited to an authentication system, orchestration system, one or more catalogs or databases, a gateway, etc.

An authentication system can include one or more components to authenticate users to access, use, and/or configure the system 102. Similarly, the authentication system can be used to restrict what a particular user can do on the system 102 and/or what components or data a user can access, etc.

An orchestration system can include one or more components to manage and/or monitor the various components of the system 102. In some embodiments, the orchestration system can monitor the components of the system 102 to detect when one or more components has failed or is unavailable and enable the system 102 to recover from the failure (e.g., by adding additional components, fixing the failed component, or having other components complete the tasks assigned to the failed component). In certain cases, the orchestration system can determine when to add components to or remove components from a particular system 110, 112, 114, 116 (e.g., based on usage, user/tenant requests, etc.). In embodiments where the system 102 is implemented in a shared computing resource environment, the orchestration system can facilitate the creation and/or destruction of isolated execution environments or instances of the components of the system 102, etc.

In certain embodiments, the system 102 can include various components that enable it to provide stateless services or enable it to recover from an unavailable or unresponsive component without data loss in a time efficient manner. For example, the system 102 can store contextual information about its various components in a distributed way such that if one of the components becomes unresponsive or unavailable, the system 102 can replace the unavailable component with a different component and provide the replacement component with the contextual information. In this way, the system 102 can quickly recover from an unresponsive or unavailable component while reducing or eliminating the loss of data that was being processed by the unavailable component.

In some embodiments, the system 102 can store the contextual information in a catalog, as described herein. In certain embodiments, the contextual information can correspond to information that the system 102 has determined or learned based on use. In some cases, the contextual information can be stored as annotations (manual annotations and/or system annotations), as described herein.

In certain embodiments, the system 102 can include an additional catalog that monitors the location and storage of data in the storage system 116 to facilitate efficient access of the data during search time. In certain embodiments, such a catalog may form part of the storage system 116.

In some embodiments, the system 102 can include a gateway or other mechanism to interact with external devices or to facilitate communications between components of the system 102. In some embodiments, the gateway can be implemented using an application programming interface (API). In certain embodiments, the gateway can be implemented using a representational state transfer API (REST API).

In some environments, a user of a system 102 may install and configure, on computing devices owned and operated by the user, one or more software applications that implement some or all of the components of the system 102. For example, with reference to FIG. 1, a user may install a software application on server computers owned by the user and configure each server to operate as one or more components of the intake system 110, indexing system 112, query system 114, shared storage system 116, or other components of the system 102. This arrangement generally may be referred to as an "on-premises" solution. That is, the system 102 is installed and operates on computing devices directly controlled by the user of the system 102. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 102 operate.

In certain embodiments, one or more of the components of the system 102 can be implemented in a shared computing resource environment. In this context, a shared computing resource environment or cloud-based service can refer to a service hosted by one more computing resources that are accessible to end users over a network, for example, by using a web browser or other application on a client device to interface with the remote computing resources. For example, a service provider may provide a system 102 by managing computing resources configured to implement various aspects of the system (e.g., intake system 110, indexing system 112, query system 114, shared storage system 116, other components, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

When implemented in a shared computing resource environment, the underlying hardware (non-limiting examples: processors, hard drives, solid-state memory, RAM, etc.) on which the components of the system 102 execute can be shared by multiple customers or tenants as part of the shared computing resource environment. In addition, when implemented in a shared computing resource environment as a cloud-based service, various components of the system 102 can be implemented using containerization or operating-system-level virtualization, or other virtualization technique. For example, one or more components of the intake system 110, indexing system 112, or query system 114 can be implemented as separate software containers or container instances. Each container instance can have certain computing resources (e.g., memory, processor, etc.) of an underlying hosting computing system (e.g., server, microprocessor, etc.) assigned to it, but may share the same operating system and may use the operating system's system call interface. Each container may provide an isolated execution environment on the host system, such as by providing a memory space of the hosting system that is logically isolated from memory space of other containers. Further, each container may run the same or different computer applications concurrently or separately, and may interact with each other. Although reference is made herein to containerization and container instances, it will be understood that other virtualization techniques can be used. For example, the components can be implemented using virtual machines using full virtualization or paravirtualization, etc. Thus, where reference is made to "containerized" components, it should be understood that such components may additionally or alternatively be implemented in other isolated execution environments, such as a virtual machine environment.

Implementing the system 102 in a shared computing resource environment can provide a number of benefits. In some cases, implementing the system 102 in a shared computing resource environment can make it easier to install, maintain, and update the components of the system 102. For example, rather than accessing designated hardware at a particular location to install or provide a component of the system 102, a component can be remotely instantiated or updated as desired. Similarly, implementing the system 102 in a shared computing resource environment or as a cloud-based service can make it easier to meet dynamic demand. For example, if the system 102 experiences significant load at indexing or search, additional compute resources can be deployed to process the additional data or queries. In an "on-premises" environment, this type of flexibility and scalability may not be possible or feasible.

In addition, by implementing the system 102 in a shared computing resource environment or as a cloud-based service can improve compute resource utilization. For example, in an on-premises environment if the designated compute resources are not being used by, they may sit idle and unused. In a shared computing resource environment, if the compute resources for a particular component are not being used, they can be re-allocated to other tasks within the system 102 and/or to other systems unrelated to the system 102.

As mentioned, in an on-premises environment, data from one instance of a system 102 is logically and physically separated from the data of another instance of a system 102 by virtue of each instance having its own designated hardware. As such, data from different customers of the system 102 is logically and physically separated from each other. In a shared computing resource environment, components of a system 102 can be configured to process the data from one customer or tenant or from multiple customers or tenants. Even in cases where a separate component of a system 102 is used for each customer, the underlying hardware on which the components of the system 102 are instantiated may still process data from different tenants. Accordingly, in a shared computing resource environment, the data from different tenants may not be physically separated on distinct hardware devices. For example, data from one tenant may reside on the same hard drive as data from another tenant or be processed by the same processor. In such cases, the system 102 can maintain logical separation between tenant data. For example, the system 102 can include separate directories for different tenants and apply different permissions and access controls to access the different directories or to process the data, etc.

In certain cases, the tenant data from different tenants is mutually exclusive and/or independent from each other. For example, in certain cases, Tenant A and Tenant B do not share the same data, similar to the way in which data from a local hard drive of Customer A is mutually exclusive and independent of the data (and not considered part) of a local hard drive of Customer B. While Tenant A and Tenant B may have matching or identical data, each tenant would have a separate copy of the data. For example, with reference again to the local hard drive of Customer A and Customer B example, each hard drive could include the same file. However, each instance of the file would be considered part of the separate hard drive and would be independent of the other file. Thus, one copy of the file would be part of Customer's A hard drive and a separate copy of the file would be part of Customer B's hard drive. In a similar manner, to the extent Tenant A has a file that is identical to a file of Tenant B, each tenant would have a distinct and independent copy of the file stored in different locations on a data store or on different data stores.

Further, in certain cases, the system 102 can maintain the mutual exclusivity and/or independence between tenant data even as the tenant data is being processed, stored, and searched by the same underlying hardware. In certain cases, to maintain the mutual exclusivity and/or independence between the data of different tenants, the system 102 can use tenant identifiers to uniquely identify data associated with different tenants.

In a shared computing resource environment, some components of the system 102 can be instantiated and designated for individual tenants and other components can be shared by multiple tenants. In certain embodiments, a separate intake system 110, indexing system 112, and query system 114 can be instantiated for each tenant, whereas the shared storage system 116 or other components (e.g., data store, metadata catalog, and/or acceleration data store, described below) can be shared by multiple tenants. In some such embodiments where components are shared by multiple tenants, the components can maintain separate directories for the different tenants to ensure their mutual exclusivity and/or independence from each other. Similarly, in some such embodiments, the system 102 can use different hosting computing systems or different isolated execution environments to process the data from the different tenants as part of the intake system 110, indexing system 112, and/or query system 114.

In some embodiments, individual components of the intake system 110, indexing system 112, and/or query system 114 may be instantiated for each tenant or shared by multiple tenants. For example, some individual intake system components (e.g., forwarders, output ingestion buffer) may be instantiated and designated for individual tenants, while other intake system components (e.g., a data retrieval subsystem, intake ingestion buffer, and/or streaming data processor), may be shared by multiple tenants.

In certain embodiments, an indexing system 112 (or certain components thereof) can be instantiated and designated for a particular tenant or shared by multiple tenants. In some embodiments where a separate indexing system 112 is instantiated and designated for each tenant, different resources can be reserved for different tenants. For example, Tenant A can be consistently allocated a minimum of four indexing nodes and Tenant B can be consistently allocated a minimum of two indexing nodes. In some such embodiments, the four indexing nodes can be reserved for Tenant A and the two indexing nodes can be reserved for Tenant B, even if Tenant A and Tenant B are not using the reserved indexing nodes.

In embodiments where an indexing system 112 is shared by multiple tenants, components of the indexing system 112 can be dynamically assigned to different tenants. For example, if Tenant A has greater indexing demands, additional indexing nodes can be instantiated or assigned to Tenant A's data. However, as the demand decreases, the indexing nodes can be reassigned to a different tenant, or terminated. Further, in some embodiments, a component of the indexing system 112 can concurrently process data from the different tenants.

In some embodiments, one instance of query system 114 may be shared by multiple tenants. In some such cases, the same search head can be used to process/execute queries for different tenants and/or the same search nodes can be used to execute query for different tenants. Further, in some such cases, different tenants can be allocated different amounts of compute resources. For example, Tenant A may be assigned more search heads or search nodes based on demand or based on a service level arrangement than another tenant. However, once a search is completed the search head and/or nodes assigned to Tenant A may be assigned to Tenant B, deactivated, or their resource may be re-allocated to other components of the system 102, etc.

In some cases, by sharing more components with different tenants, the functioning of the system 102 can be improved. For example, by sharing components across tenants, the system 102 can improve resource utilization thereby reducing the amount of resources allocated as a whole. For example, if four indexing nodes, two search heads, and four search nodes are reserved for each tenant then those compute resources are unavailable for use by other processes or tenants, even if they go unused. In contrast, by sharing the indexing nodes, search heads, and search nodes with different tenants and instantiating additional compute resources, the system 102 can use fewer resources overall while providing improved processing time for the tenants that are using the compute resources. For example, if tenant A is not using any search nodes 506 and tenant B has many searches running, the system 102 can use search nodes that would have been reserved for tenant A to service tenant B. In this way, the system 102 can decrease the number of compute resources used/reserved, while improving the search time for tenant B and improving compute resource utilization.

2.0. Data Ingestion, Indexing, and Storage

FIG. 2 is a flow diagram illustrating an embodiment of a routine implemented by the system 102 to process, index, and store data received from host devices 104. The data flow illustrated in FIG. 2 is provided for illustrative purposes only. It will be understood that one or more of the steps of the processes illustrated in FIG. 2 may be removed or that the ordering of the steps may be changed. Furthermore, for the purposes of illustrating a clear example, one or more particular system components are described in the context of performing various operations during each of the data flow stages. For example, the intake system 110 is described as receiving machine data and the indexing system 112 is described as generating events, grouping events, and storing events. However, other system arrangements and distributions of the processing steps across system components may be used. For example, in some cases, the intake system 110 may generate events.

At block 202, the intake system 110 receives data from a host device 104. The intake system 110 initially may receive the data as a raw data stream generated by the host device 104. For example, the intake system 110 may receive a data stream from a log file generated by an application server, from a stream of network data from a network device, or from any other source of data. Non-limiting examples of machine data that can be received by the intake system 110 is described herein with reference to FIG. 3A.

In some embodiments, the intake system 110 receives the raw data and may segment the data stream into messages, possibly of a uniform data size, to facilitate subsequent processing steps. The intake system 110 may thereafter process the messages in accordance with one or more rules to conduct preliminary processing of the data. In one embodiment, the processing conducted by the intake system 110 may be used to indicate one or more metadata fields applicable to each message. For example, the intake system 110 may include metadata fields within the messages, or publish the messages to topics indicative of a metadata field. These metadata fields may, for example, provide information related to a message as a whole and may apply to each event that is subsequently derived from the data in the message. For example, the metadata fields may include separate fields specifying each of a host, a source, and a sourcetype related to the message. A host field may contain a value identifying a host name or IP address of a device that generated the data. A source field may contain a value identifying a source of the data, such as a pathname of a file or a protocol and port related to received network data. A sourcetype field may contain a value specifying a particular sourcetype label for the data. Additional metadata fields may also be included, such as a character encoding of the data, if known, and possibly other values that provide information relevant to later processing steps. In certain embodiments, the intake system 110 may perform additional operations, such as, but not limited to, identifying individual events within the data, determining timestamps for the data, further enriching the data, etc.

At block 204, the indexing system 112 generates events from the data. In some cases, as part of generating the events, the indexing system 112 can parse the data of the message. In some embodiments, the indexing system 112 can determine a sourcetype associated with each message (e.g., by extracting a sourcetype label from the metadata fields associated with the message, etc.) and refer to a sourcetype configuration corresponding to the identified sourcetype to parse the data of the message. The sourcetype definition may include one or more properties that indicate to the indexing system 112 to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a sourcetype for the data is unknown to the indexing system 112, the indexing system 112 may infer a sourcetype for the data by examining the structure of the data. Then, the indexing system 112 can apply an inferred sourcetype definition to the data to create the events.

In addition, as part of generating events from the data, the indexing system 112 can determine a timestamp for each event. Similar to the process for parsing machine data, the indexing system 112 may again refer to a sourcetype definition associated with the data to locate one or more properties that indicate instructions for determining a timestamp for each event. The properties may, for example, instruct the indexing system 112 to extract a time value from a portion of data for the event (e.g., using a regex rule), to interpolate time values based on timestamps associated with temporally proximate events, to create a timestamp based on a time the portion of machine data was received or generated, to use the timestamp of a previous event, or use any other rules for determining timestamps, etc.

The indexing system 112 can also associate events with one or more metadata fields. In some embodiments, a timestamp may be included in the metadata fields. These metadata fields may include any number of "default fields" that are associated with all events, and may also include one more custom fields as defined by a user. In certain embodiments, the default metadata fields associated with each event may include a host, source, and sourcetype field including or in addition to a field storing the timestamp.

In certain embodiments, the indexing system 112 can also apply one or more transformations to event data that is to be included in an event. For example, such transformations can include removing a portion of the event data (e.g., a portion used to define event boundaries, extraneous characters from the event, other extraneous text, etc.), masking a portion of event data (e.g., masking a credit card number), removing redundant portions of event data, etc. The transformations applied to event data may, for example, be specified in one or more configuration files and referenced by one or more sourcetype definitions.

At block 206, the indexing system 112 can group events. In some embodiments, the indexing system 112 can group events based on time. For example, events generated within a particular time period or events that have a time stamp within a particular time period can be grouped together to form a bucket. A non-limiting example of a bucket is described herein with reference to FIG. 3B.

In certain embodiments, multiple components of the indexing system, such as an indexing node, can concurrently generate events and buckets. Furthermore, each indexing node that generates and groups events can concurrently generate multiple buckets. For example, multiple processors of an indexing node can concurrently process data, generate events, and generate buckets. Further, multiple indexing nodes can concurrently generate events and buckets. As such, ingested data can be processed in a highly distributed manner.

In some embodiments, as part of grouping events together, the indexing system 112 can generate one or more inverted indexes for a particular group of events. A non-limiting example of an inverted index is described herein with reference to FIG. 3C. In certain embodiments, the inverted indexes can include location information for events of a bucket. For example, the events of a bucket may be compressed into one or more files to reduce their size. The inverted index can include location information indicating the particular file and/or location within a particular file of a particular event.

In certain embodiments, the inverted indexes may include keyword entries or entries for field values or field name-value pairs found in events. In some cases, a field name-value pair can include a pair of words connected by a symbol, such as an equals sign or colon. The entries can also include location information for events that include the keyword, field value, or field value pair. In this way, relevant events can be quickly located. In some embodiments, fields can automatically be generated for some or all of the field names of the field name-value pairs at the time of indexing. For example, if the string "dest=10.0.1.2" is found in an event, a field named "dest" may be created for the event, and assigned a value of "10.0.1.2." In certain embodiments, the indexing system can populate entries in the inverted index with field name-value pairs by parsing events using one or more regex rules to determine a field value associated with a field defined by the regex rule. For example, the regex rule may indicate how to find a field value for a userID field in certain events. In some cases, the indexing system 112 can use the sourcetype of the event to determine which regex to use for identifying field values.

Figure 3C:
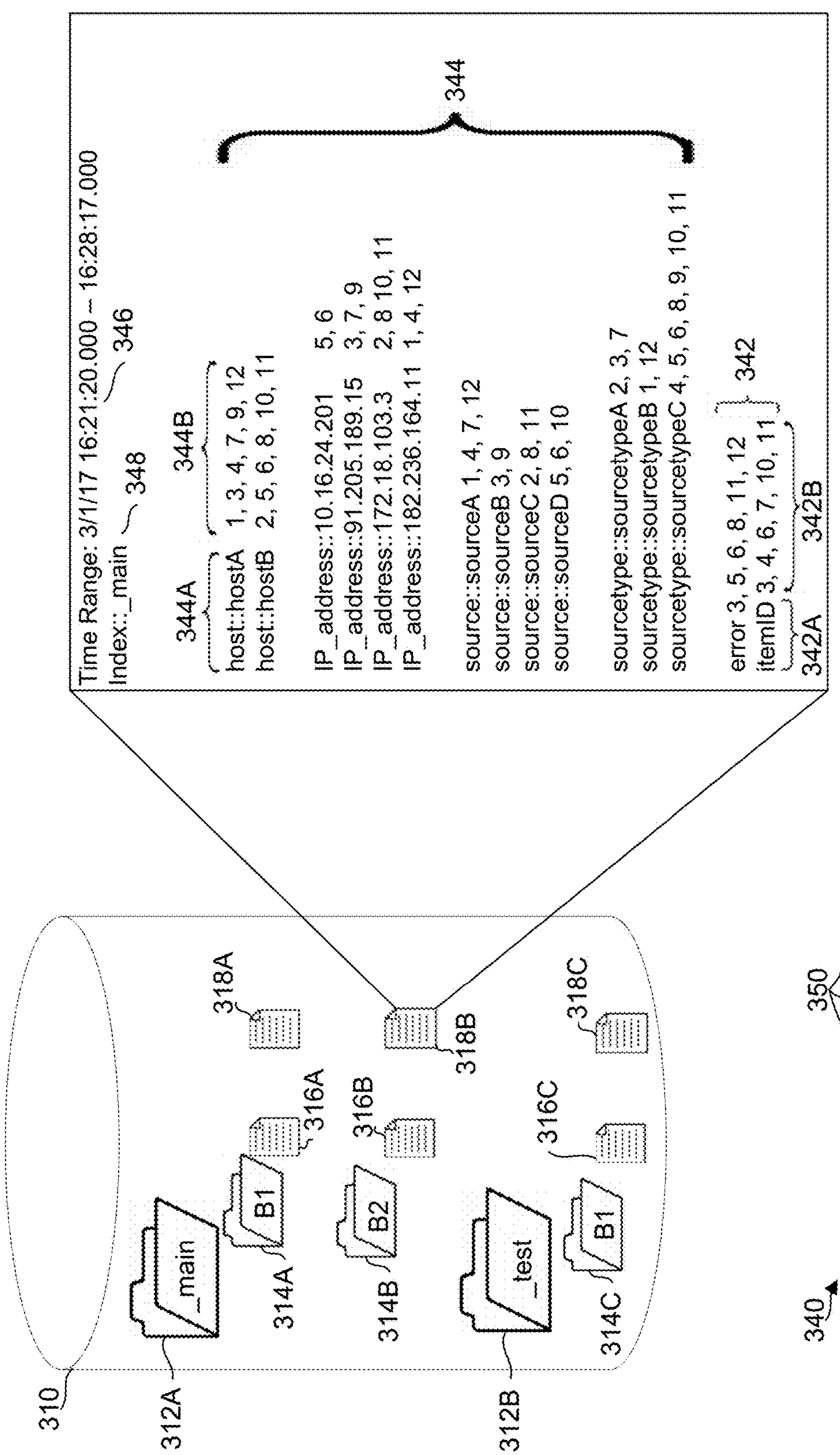

At block 208, the indexing system 112 stores the events with an associated timestamp in the storage system 116, which may be in a local data store and/or in a shared storage system. Timestamps enable a user to search for events based on a time range. In some embodiments, the stored events are organized into "buckets," where each bucket stores events associated with a specific time range based on the timestamps associated with each event. As mentioned, FIGS. 3B and 3C illustrate an example of a bucket. This improves time-based searching, as well as allows for events with recent timestamps, which may have a higher likelihood of being accessed, to be stored in a faster memory to facilitate faster retrieval. For example, buckets containing the most recent events can be stored in flash memory rather than on a hard disk. In some embodiments, each bucket may be associated with an identifier, a time range, and a size constraint.

The indexing system 112 may be responsible for storing the events in the storage system 116. As mentioned, the events or buckets can be stored locally on a component of the indexing system 112 or in a shared storage system 116. In certain embodiments, the component that generates the events and/or stores the events (indexing node) can also be assigned to search the events. In some embodiments separate components can be used for generating and storing events (indexing node) and for searching the events (search node).

By storing events in a distributed manner (either by storing the events at different components or in a shared storage system 116), the query system 114 can analyze events for a query in parallel. For example, using map-reduce techniques, multiple components of the query system (e.g., indexing or search nodes) can concurrently search and provide partial responses for a subset of events to another component (e.g., search head) that combines the results to produce an answer for the query. By storing events in buckets for specific time ranges, the indexing system 112 may further optimize the data retrieval process by the query system 114 to search buckets corresponding to time ranges that are relevant to a query. In some embodiments, each bucket may be associated with an identifier, a time range, and a size constraint. In certain embodiments, a bucket can correspond to a file system directory and the machine data, or events, of a bucket can be stored in one or more files of the file system directory. The file system directory can include additional files, such as one or more inverted indexes, high performance indexes, permissions files, configuration files, etc.

In embodiments where components of the indexing system 112 store buckets locally, the components can include a home directory and a cold directory. The home directory can store hot buckets and warm buckets, and the cold directory stores cold buckets. A hot bucket can refer to a bucket that is capable of receiving and storing additional events. A warm bucket can refer to a bucket that can no longer receive events for storage, but has not yet been moved to the cold directory. A cold bucket can refer to a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, components of the indexing system 112 may also have a quarantine bucket that contains events having potentially inaccurate information, such as an incorrect timestamp associated with the event or a timestamp that appears to be an unreasonable timestamp for the corresponding event. The quarantine bucket may have events from any time range; as such, the quarantine bucket may always be searched at search time. Additionally, components of the indexing system may store old, archived data in a frozen bucket that is not capable of being searched at search time. In some embodiments, a frozen bucket may be stored in slower and/or larger memory, such as a hard disk, and may be stored in offline and/or remote storage.

In some embodiments, components of the indexing system 112 may not include a cold directory and/or cold or frozen buckets. For example, in embodiments where buckets are copied to a shared storage system 116 and searched by separate components of the query system 114, buckets can be deleted from components of the indexing system as they are stored to the storage system 116. In certain embodiments, the shared storage system 116 may include a home directory that includes warm buckets copied from the indexing system 112 and a cold directory of cold or frozen buckets as described above.

FIG. 3A is a block diagram illustrating an embodiment of machine data received by the system 102. The machine data can correspond to data from one or more host devices 104 or data sources. As mentioned, the data source can correspond to a log file, data stream or other data structure that is accessible by a host device 104. In the illustrated embodiment of FIG. 3A, the machine data has different forms. For example, the machine data 302 may be log data that is unstructured or that does not have any clear structure or fields, and include different portions 302A-302E that correspond to different entries of the log and that separated by boundaries. Such data may also be referred to as raw machine data.

The machine data 304 may be referred to as structured or semi-structured machine data as it does include some data in a JSON structure defining certain field and field values (e.g., machine data 304A showing field name: field values container_name:kube-apiserver, host:ip 172 20 43 173.ec2.internal, pod_id:0a73017b-4efa-11e8-a4e1-0a2bf2ab4bba, etc.), but other parts of the machine data 304 is unstructured or raw machine data (e.g., machine data 304B). The machine data 306 may be referred to as structured data as it includes particular rows and columns of data with field names and field values.

In some embodiments, the machine data 302 can correspond to log data generated by a host device 104 configured as an Apache server, the machine data 304 can correspond to log data generated by a host device 104 in a shared computing resource environment, and the machine data 306 can correspond to metrics data. Given the differences between host devices 104 that generated the log data 302, 304, the form of the log data 302, 304 is different. In addition, as the log data 304 is from a host device 104 in a shared computing resource environment, it can include log data generated by an application being executed within an isolated execution environment (304B, excluding the field name "log:") and log data generated by an application that enables the sharing of computing resources between isolated execution environments (all other data in 304). Although shown together in FIG. 3A, it will be understood that machine data with different hosts, sources, or sourcetypes can be received separately and/or found in different data sources and/or host devices 104.

As described herein, the system 102 can process the machine data based on the form in which it is received. In some cases, the intake system 110 can utilize one or more rules to process the data. In certain embodiments, the intake system 110 can enrich the received data. For example, the intake system may add one or more fields to the data received from the host devices 104, such as fields denoting the host, source, sourcetype, index, or tenant associated with the incoming data. In certain embodiments, the intake system 110 can perform additional processing on the incoming data, such as transforming structured data into unstructured data (or vice versa), identifying timestamps associated with the data, removing extraneous data, parsing data, indexing data, separating data, categorizing data, routing data based on criteria relating to the data being routed, and/or performing other data transformations, etc.

In some cases, the data processed by the intake system 110 can be communicated or made available to the indexing system 112, the query system 114, and/or to other systems. In some embodiments, the intake system 110 communicates or makes available streams of data using one or more shards. For example, the indexing system 112 may read or receive data from one shard and another system may receive data from another shard. As another example, multiple systems may receive data from the same shard.

As used herein, a partition can refer to a logical division of data. In some cases, the logical division of data may refer to a portion of a data stream, such as a shard from the intake system 110. In certain cases, the logical division of data can refer to an index or other portion of data stored in the storage system 116, such as different directories or file structures used to store data or buckets. Accordingly, it will be understood that the logical division of data referenced by the term partition will be understood based on the context of its use.

FIGS. 3B and 3C are block diagrams illustrating embodiments of various data structures for storing data processed by the system 102. FIG. 3B includes an expanded view illustrating an example of machine data stored in a data store 310 of the data storage system 116. It will be understood that the depiction of machine data and associated metadata as rows and columns in the table 319 of FIG. 3B is merely illustrative and is not intended to limit the data format in which the machine data and metadata is stored in various embodiments described herein. In one particular embodiment, machine data can be stored in a compressed or encrypted format. In such embodiments, the machine data can be stored with or be associated with data that describes the compression or encryption scheme with which the machine data is stored. The information about the compression or encryption scheme can be used to decompress or decrypt the machine data, and any metadata with which it is stored, at search time.

In the illustrated embodiment of FIG. 3B the data store 310 includes a directory 312 (individually referred to as 312A, 312B) for each index (or partition) that contains a portion of data stored in the data store 310 and a sub-directory 314 (individually referred to as 314A, 314B, 314C) for one or more buckets of the index. In the illustrated embodiment of FIG. 3B, each sub-directory 314 corresponds to a bucket and includes an event data file 316 (individually referred to as 316A, 316B, 316C) and an inverted index 318 (individually referred to as 318A, 318B, 318C). However, it will be understood that each bucket can be associated with fewer or more files and each sub-directory 314 can store fewer or more files.

In the illustrated embodiment, the data store 310 includes a _main directory 312A associated with an index "_main" and a _test directory 312B associated with an index "_test." However, the data store 310 can include fewer or more directories. In some embodiments, multiple indexes can share a single directory or all indexes can share a common directory. Additionally, although illustrated as a single data store 310, it will be understood that the data store 310 can be implemented as multiple data stores storing different portions of the information shown in FIG. 3C. For example, a single index can span multiple directories or multiple data stores.

Furthermore, although not illustrated in FIG. 3B, it will be understood that, in some embodiments, the data store 310 can include directories for each tenant and sub-directories for each index of each tenant, or vice versa. Accordingly, the directories 312A and 312B can, in certain embodiments, correspond to sub-directories of a tenant or include sub-directories for different tenants.

In the illustrated embodiment of FIG. 3B, two sub-directories 314A, 314B of the _main directory 312A and one sub-directory 312C of the _test directory 312B are shown. The sub-directories 314A, 314B, 314C can correspond to buckets of the indexes associated with the directories 312A, 312B. For example, the sub-directories 314A and 314B can correspond to buckets "B1" and "B2," respectively, of the index "_main" and the sub-directory 314C can correspond to bucket "B1" of the index "_test." Accordingly, even though there are two "B1" buckets shown, as each "B1" bucket is associated with a different index (and corresponding directory 312), the system 102 can uniquely identify them.

Although illustrated as buckets "B1" and "B2," it will be understood that the buckets (and/or corresponding sub-directories 314) can be named in a variety of ways. In certain embodiments, the bucket (or sub-directory) names can include information about the bucket. For example, the bucket name can include the name of the index with which the bucket is associated, a time range of the bucket, etc.

As described herein, each bucket can have one or more files associated with it, including, but not limited to one or more raw machine data files, bucket summary files, filter files, inverted indexes (also referred to herein as high performance indexes or keyword indexes), permissions files, configuration files, etc. In the illustrated embodiment of FIG. 3B, the files associated with a particular bucket can be stored in the sub-directory corresponding to the particular bucket. Accordingly, the files stored in the sub-directory 314A can correspond to or be associated with bucket "B1," of index "_main," the files stored in the sub-directory 314B can correspond to or be associated with bucket "B2" of index "_main," and the files stored in the sub-directory 314C can correspond to or be associated with bucket "B1" of index "_test."

FIG. 3B further illustrates an expanded event data file 316C showing an example of data that can be stored therein. In the illustrated embodiment, four events 320, 322, 324, 326 of the machine data file 316C are shown in four rows.

Each event 320-326 includes machine data 330 and a timestamp 332. The machine data 330 can correspond to the machine data received by the system 102. For example, in the illustrated embodiment, the machine data 330 of events 320, 322, 324, 326 corresponds to portions 302A, 302B, 302C, 302D, respectively, of the machine data 302 after it was processed by the indexing system 112.

Metadata 334-338 associated with the events 320-326 is also shown in the table 319. In the illustrated embodiment, the metadata 334-338 includes information about a host 334, source 336, and sourcetype 338 associated with the events 320-326. Any of the metadata can be extracted from the corresponding machine data, or supplied or defined by an entity, such as a user or computer system. The metadata fields 334-338 can become part of, stored with, or otherwise associated with the events 320-326. In certain embodiments, the metadata 334-338 can be stored in a separate file of the sub-directory 314C and associated with the machine data file 316C. In some cases, while the timestamp 332 can be extracted from the raw data of each event, the values for the other metadata fields may be determined by the indexing system 112 based on information it receives pertaining to the host device 104 or data source of the data separate from the machine data.

While certain default or user-defined metadata fields can be extracted from the machine data for indexing purposes, the machine data within an event can be maintained in its original condition. As such, in embodiments in which the portion of machine data included in an event is unprocessed or otherwise unaltered, it is referred to herein as a portion of raw machine data. For example, in the illustrated embodiment, the machine data of events 320-326 is identical to the portions of the machine data 302A-302D, respectively, used to generate a particular event. Similarly, the entirety of the machine data 302 may be found across multiple events. As such, unless certain information needs to be removed for some reasons (e.g. extraneous information, confidential information), all the raw machine data contained in an event can be preserved and saved in its original form. Accordingly, the data store in which the event records are stored is sometimes referred to as a "raw record data store." The raw record data store contains a record of the raw event data tagged with the various fields.

In other embodiments, the portion of machine data in an event can be processed or otherwise altered relative to the machine data used to create the event. With reference to the machine data 304, the machine data of a corresponding event (or events) may be modified such that only a portion of the machine data 304 is stored as one or more events. For example, in some cases, only machine data 304B of the machine data 304 may be retained as one or more events or the machine data 304 may be altered to remove duplicate data, confidential information, etc.

In FIG. 3B, the first three rows of the table 319 present events 320, 322, and 324 and are related to a server access log that records requests from multiple clients processed by a server, as indicated by entry of "access.log" in the source column 336. In the example shown in FIG. 3B, each of the events 320-324 is associated with a discrete request made to the server by a client. The raw machine data generated by the server and extracted from a server access log can include the IP address 1140 of the client, the user id 1141 of the person requesting the document, the time 1142 the server finished processing the request, the request line 1143 from the client, the status code 1144 returned by the server to the client, the size of the object 1145 returned to the client (in this case, the gif file requested by the client) and the time spent 1146 to serve the request in microseconds. In the illustrated embodiments of FIGS. 3A, 3B, all the raw machine data retrieved from the server access log is retained and stored as part of the corresponding events 320-324 in the file 316C.

Event 326 is associated with an entry in a server error log, as indicated by "error.log" in the source column 336 that records errors that the server encountered when processing a client request. Similar to the events related to the server access log, all the raw machine data in the error log file pertaining to event 326 can be preserved and stored as part of the event 326.

Saving minimally processed or unprocessed machine data in a data store associated with metadata fields in the manner similar to that shown in FIG. 3B is advantageous because it allows search of all the machine data at search time instead of searching only previously specified and identified fields or field-value pairs. As mentioned above, because data structures used by various embodiments of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user can continue to refine the late-binding schema by defining new extraction rules, or modifying or deleting existing extraction rules used by the system.

FIG. 3C illustrates an embodiment of another file that can be included in one or more subdirectories 314 or buckets. Specifically, FIG. 3C illustrates an exploded view of an embodiments of an inverted index 318B in the sub-directory 314B, associated with bucket "B2" of the index "_main," as well as an event reference array 340 associated with the inverted index 318B.

In some embodiments, the inverted indexes 318 can correspond to distinct time-series buckets. As such, each inverted index 318 can correspond to a particular range of time for an index. In the illustrated embodiment of FIG. 3C, the inverted indexes 318A, 318B correspond to the buckets "B1" and "B2," respectively, of the index "_main," and the inverted index 318C corresponds to the bucket "B1" of the index "_test." In some embodiments, an inverted index 318 can correspond to multiple time-series buckets (e.g., include information related to multiple buckets) or inverted indexes 318 can correspond to a single time-series bucket.

Each inverted index 318 can include one or more entries, such as keyword (or token) entries 342 or field-value pair entries 344. Furthermore, in certain embodiments, the inverted indexes 318 can include additional information, such as a time range 346 associated with the inverted index or an index identifier 348 identifying the index associated with the inverted index 318. It will be understood that each inverted index 318 can include less or more information than depicted. For example, in some cases, the inverted indexes 318 may omit a time range 346 and/or index identifier 348. In some such embodiments, the index associated with the inverted index 318 can be determined based on the location (e.g., directory 312) of the inverted index 318 and/or the time range of the inverted index 318 can be determined based on the name of the sub-directory 314.

Token entries, such as token entries 342 illustrated in inverted index 318B, can include a token 342A (e.g., "error," "itemID," etc.) and event references 342B indicative of events that include the token. For example, for the token "error," the corresponding token entry includes the token "error" and an event reference, or unique identifier, for each event stored in the corresponding time-series bucket that includes the token "error." In the illustrated embodiment of FIG. 3C, the error token entry includes the identifiers 3, 5, 6, 8, 11, and 12 corresponding to events located in the bucket "B2" of the index "_main."

In some cases, some token entries can be default entries, automatically determined entries, or user specified entries. In some embodiments, the indexing system 112 can identify each word or string in an event as a distinct token and generate a token entry for the identified word or string. In some cases, the indexing system 112 can identify the beginning and ending of tokens based on punctuation, spaces, etc. In certain cases, the indexing system 112 can rely on user input or a configuration file to identify tokens for token entries 342, etc. It will be understood that any combination of token entries can be included as a default, automatically determined, or included based on user-specified criteria.

Similarly, field-value pair entries, such as field-value pair entries 344 shown in inverted index 318B, can include a field-value pair 344A and event references 344B indicative of events that include a field value that corresponds to the field-value pair (or the field-value pair). For example, for a field-value pair sourcetype::sendmail, a field-value pair entry 344 can include the field-value pair "sourcetype::sendmail" and a unique identifier, or event reference, for each event stored in the corresponding time-series bucket that includes a sourcetype "sendmail."

In some cases, the field-value pair entries 344 can be default entries, automatically determined entries, or user specified entries. As a non-limiting example, the field-value pair entries for the fields "host," "source," and "sourcetype" can be included in the inverted indexes 318 as a default. As such, all of the inverted indexes 318 can include field-value pair entries for the fields "host," "source," and "sourcetype." As yet another non-limiting example, the field-value pair entries for the field "IP_address" can be user specified and may only appear in the inverted index 318B or the inverted indexes 318A, 318B of the index "_main" based on user-specified criteria. As another non-limiting example, as the indexing system 112 indexes the events, it can automatically identify field-value pairs and create field-value pair entries 344. For example, based on the indexing system's 212 review of events, it can identify IP_address as a field in each event and add the IP_address field-value pair entries to the inverted index 318B (e.g., based on punctuation, like two keywords separated by an '=' or ':' etc.). It will be understood that any combination of field-value pair entries can be included as a default, automatically determined, or included based on user-specified criteria.

With reference to the event reference array 340, each unique identifier 350, or event reference, can correspond to a unique event located in the time series bucket or machine data file 316B. The same event reference can be located in multiple entries of an inverted index 318. For example if an event has a sourcetype "splunkd," host "www1" and token "warning," then the unique identifier for the event can appear in the field-value pair entries 344 "sourcetype::splunkd" and "host::www1," as well as the token entry "warning." With reference to the illustrated embodiment of FIG. 3C and the event that corresponds to the event reference 3, the event reference 3 is found in the field-value pair entries 344 "host::hostA," "source::sourceB," "sourcetype::sourcetypeA," and "IP_address::91.205.189.15" indicating that the event corresponding to the event references is from hostA, sourceB, of sourcetypeA, and includes "91.205.189.15" in the event data.

For some fields, the unique identifier is located in only one field-value pair entry for a particular field. For example, the inverted index 318 may include four sourcetype field-value pair entries 344 corresponding to four different sourcetypes of the events stored in a bucket (e.g., sourcetypes: sendmail, splunkd, web_access, and web_service). Within those four sourcetype field-value pair entries, an identifier for a particular event may appear in only one of the field-value pair entries. With continued reference to the example illustrated embodiment of FIG. 3C, since the event reference 7 appears in the field-value pair entry "sourcetype::sourcetypeA," then it does not appear in the other field-value pair entries for the sourcetype field, including "sourcetype::sourcetypeB," "sourcetype::sourcetypeC," and "sourcetype::sourcetypeD."

The event references 350 can be used to locate the events in the corresponding bucket or machine data file 316. For example, the inverted index 318B can include, or be associated with, an event reference array 340. The event reference array 340 can include an array entry 350 for each event reference in the inverted index 318B. Each array entry 350 can include location information 352 of the event corresponding to the unique identifier (non-limiting example: seek address of the event, physical address, slice ID, etc.), a timestamp 354 associated with the event, or additional information regarding the event associated with the event reference, etc.

For each token entry 342 or field-value pair entry 344, the event reference 342B, 344B, respectively, or unique identifiers can be listed in chronological order or the value of the event reference can be assigned based on chronological data, such as a timestamp associated with the event referenced by the event reference. For example, the event reference 1 in the illustrated embodiment of FIG. 3C can correspond to the first-in-time event for the bucket, and the event reference 12 can correspond to the last-in-time event for the bucket. However, the event references can be listed in any order, such as reverse chronological order, ascending order, descending order, or some other order (e.g., based on time received or added to the machine data file), etc. Further, the entries can be sorted. For example, the entries can be sorted alphabetically (collectively or within a particular group), by entry origin (e.g., default, automatically generated, user-specified, etc.), by entry type (e.g., field-value pair entry, token entry, etc.), or chronologically by when added to the inverted index, etc. In the illustrated embodiment of FIG. 3C, the entries are sorted first by entry type and then alphabetically.

In some cases, inverted indexes 318 can decrease the search time of a query. For example, for a statistical query, by using the inverted index, the system 102 can avoid the computational overhead of parsing individual events in a machine data file 316. Instead, the system 102 can use the inverted index 318 separate from the raw record data store to generate responses to the received queries.

3.0. Query Processing and Execution

Figure 4A:
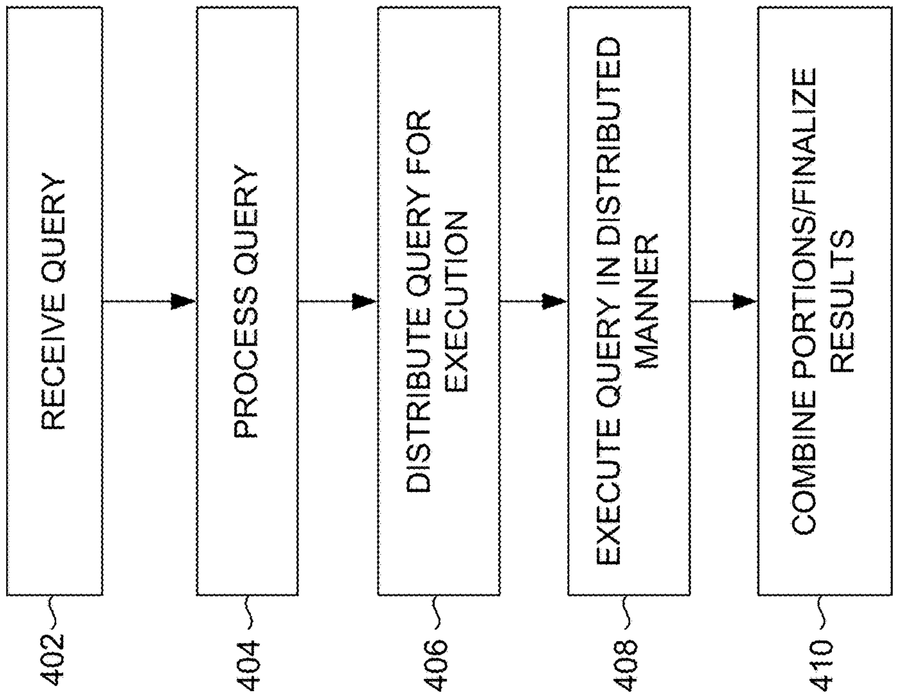
FIG. 4A is a flow diagram illustrating an embodiment of a routine implemented by the query system to execute a query.

FIG. 4A is a flow diagram illustrating an embodiment of a routine implemented by the query system 114 for executing a query. At block 402, the query system 114 receives a search query. As described herein, the query can be in the form of a pipelined command language or other query language and include filter criteria used to identify a set of data and processing criteria used to process the set of data.

At block 404, the query system 114 processes the query. As part of processing the query, the query system 114 can determine whether the query was submitted by an authenticated user and/or review the query to determine that it is in a proper format for the data intake and query system 102, has correct semantics and syntax, etc. In addition, the query system 114 can determine what, if any, configuration files or other configurations to use as part of the query.

In addition as part of processing the query, the query system 114 can determine what portion(s) of the query to execute in a distributed manner (e.g., what to delegate to search nodes) and what portions of the query to execute in a non-distributed manner (e.g., what to execute on the search head). For the parts of the query that are to be executed in a distributed manner, the query system 114 can generate specific commands, for the components that are to execute the query. This may include generating subqueries, partial queries or different phases of the query for execution by different components of the query system 114. In some cases, the query system 114 can use map-reduce techniques to determine how to map the data for the search and then reduce the data. Based on the map-reduce phases, the query system 114 can generate query commands for different components of the query system 114.

As part of processing the query, the query system 114 can determine where to obtain the data. For example, in some cases, the data may reside on one or more indexing nodes or search nodes, as part of the storage system 116 or may reside in a shared storage system or a system external to the system 102. In some cases, the query system 114 can determine what components to use to obtain and process the data. For example, the query system 114 can identify search nodes that are available for the query, etc.

At block 406, the query system 1206 distributes the determined portions or phases of the query to the appropriate components (e.g., search nodes). In some cases, the query system 1206 can use a catalog to determine which components to use to execute the query (e.g., which components include relevant data and/or are available, etc.).

At block 408, the components assigned to execute the query, execute the query. As mentioned, different components may execute different portions of the query. In some cases, multiple components (e.g., multiple search nodes) may execute respective portions of the query concurrently and communicate results of their portion of the query to another component (e.g., search head). As part of the identifying the set of data or applying the filter criteria, the components of the query system 114 can search for events that match the criteria specified in the query. These criteria can include matching keywords or specific values for certain fields. The searching operations at block 408 may use the late-binding schema to extract values for specified fields from events at the time the query is processed. In some embodiments, one or more rules for extracting field values may be specified as part of a sourcetype definition in a configuration file or in the query itself. In certain embodiments where search nodes are used to obtain the set of data, the search nodes can send the relevant events back to the search head, or use the events to determine a partial result, and send the partial result back to the search head.

At block 410, the query system 114 combines the partial results and/or events to produce a final result for the query. As mentioned, in some cases, combining the partial results and/or finalizing the results can include further processing the data according to the query. Such processing may entail joining different set of data, transforming the data, and/or performing one or more mathematical operations on the data, preparing the results for display, etc.

In some examples, the results of the query are indicative of performance or security of the IT environment and may help improve the performance of components in the IT environment. This final result may comprise different types of data depending on what the query requested. For example, the results can include a listing of matching events returned by the query, or some type of visualization of the data from the returned events. In another example, the final result can include one or more calculated values derived from the matching events.

The results generated by the query system 114 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring to the search jobs.

The query system 114 can also perform various operations to make the search more efficient. For example, before the query system 114 begins execution of a query, it can determine a time range for the query and a set of common keywords that all matching events include. The query system 114 may then use these parameters to obtain a superset of the eventual results. Then, during a filtering stage, the query system 114 can perform field-extraction operations on the superset to produce a reduced set of search results. This speeds up queries, which may be particularly helpful for queries that are performed on a periodic basis. In some cases, to make the search more efficient, the query system 114 can use information known about certain data sets that are part of the query to filter other data sets. For example, if an early part of the query includes instructions to obtain data with a particular field, but later commands of the query do not rely on the data with that particular field, the query system 114 can omit the superfluous part of the query from execution.

Various embodiments of the present disclosure can be implemented using, or in conjunction with, a pipelined command language. A pipelined command language is a language in which a set of inputs or data is operated on by a first command in a sequence of commands, and then subsequent commands in the order they are arranged in the sequence. Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can include filter criteria used to search or filter for specific data. The results of the first command can then be passed to another command listed later in the command sequence for further processing.

In various embodiments, a query can be formulated as a command sequence defined in a command line of a search UI. In some embodiments, a query can be formulated as a sequence of SPL commands. Some or all of the SPL commands in the sequence of SPL commands can be separated from one another by a pipe symbol "|." In such embodiments, a set of data, such as a set of events, can be operated on by a first SPL command in the sequence, and then a subsequent SPL command following a pipe symbol "|" after the first SPL command operates on the results produced by the first SPL command or other set of data, and so on for any additional SPL commands in the sequence. As such, a query formulated using SPL comprises a series of consecutive commands that are delimited by pipe "|" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various embodiments described herein can be implemented with Splunk Processing Language (SPL) used in conjunction with the SPLUNK® ENTERPRISE system.

While a query can be formulated in many ways, a query can start with a search command and one or more corresponding search terms or filter criteria at the beginning of the pipeline. Such search terms or filter criteria can include any combination of keywords, phrases, times, dates, Boolean expressions, fieldname-field value pairs, etc. that specify which results should be obtained from different locations. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some embodiments, the summary can include a graph, chart, metric, or other visualization of the data. An aggregation function can include analysis or calculations to return an aggregate value, such as an average value, a sum, a maximum value, a root mean square, statistical values, and the like.

Due to its flexible nature, use of a pipelined command language in various embodiments is advantageous because it can perform "filtering" as well as "processing" functions. In other words, a single query can include a search command and search term expressions, as well as data-analysis expressions. For example, a command at the beginning of a query can perform a "filtering" step by retrieving a set of data based on a condition (e.g., records associated with server response times of less than 1 microsecond). The results of the filtering step can then be passed to a subsequent command in the pipeline that performs a "processing" step (e.g. calculation of an aggregate value related to the filtered events such as the average response time of servers with response times of less than 1 microsecond). Furthermore, the search command can allow events to be filtered by keyword as well as field criteria. For example, a search command can filter events based on the word "warning" or filter events based on a field value "10.0.1.2" associated with a field "clientip."

The results obtained or generated in response to a command in a query can be considered a set of results data. The set of results data can be passed from one command to another in any data format. In one embodiment, the set of result data can be in the form of a dynamically created table. Each command in a particular query can redefine the shape of the table. In some implementations, an event retrieved from an index in response to a query can be considered a row with a column for each field value. Columns can contain basic information about the data and/or data that has been dynamically extracted at search time.

Figure 4B:
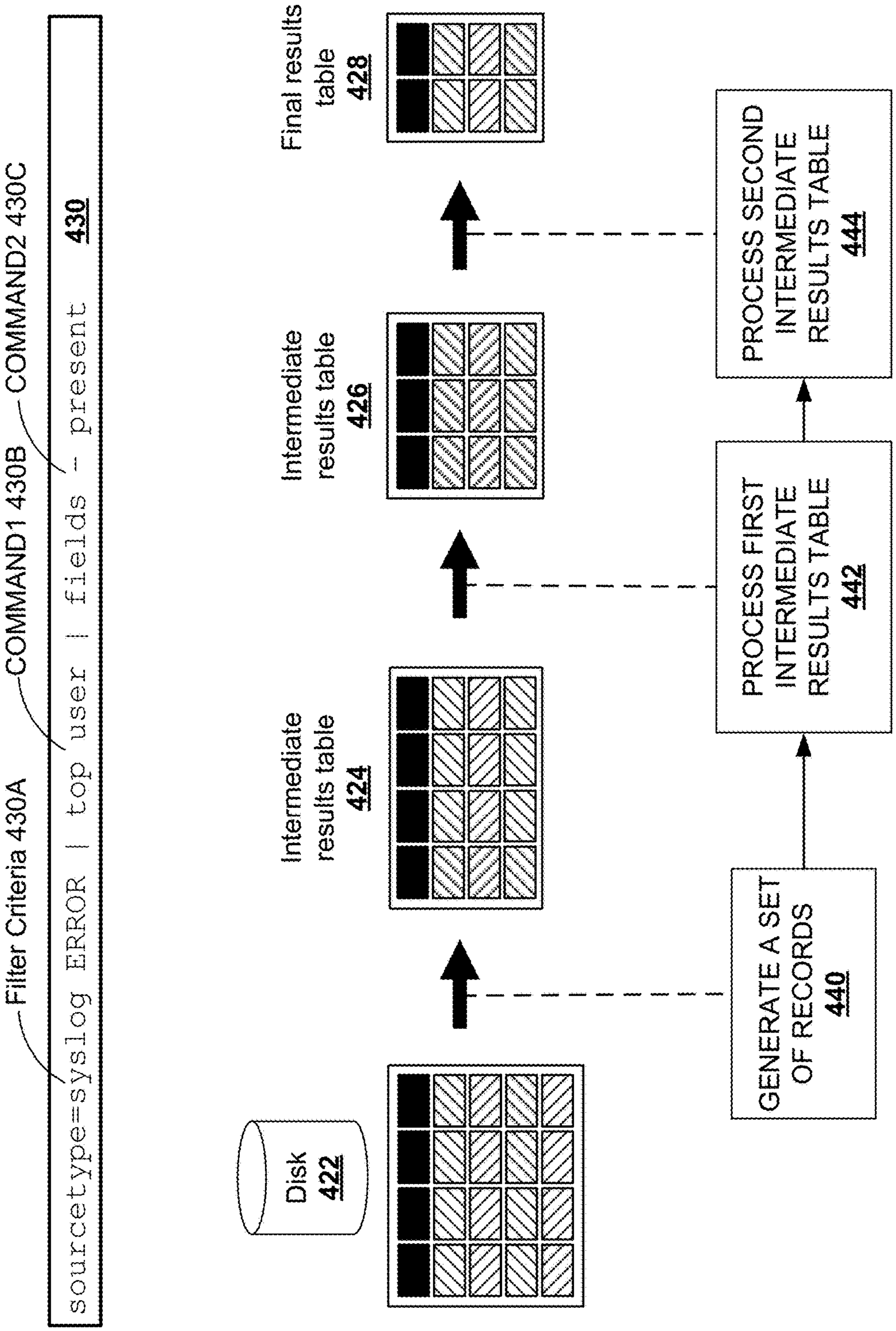
FIG. 4B provides a visual representation of the manner in which a pipelined command language or query can operate

FIG. 4B provides a visual representation of the manner in which a pipelined command language or query can operate in accordance with the disclosed embodiments. The query 430 can be input by the user and submitted to the query system 114. In the illustrated embodiment, the query 430 comprises filter criteria 430A, followed by two commands 430B, 430C (namely, Command1 and Command2). Disk 422 represents data as it is stored in a data store to be searched. For example, disk 422 can represent a portion of the storage system 116 or some other data store that can be searched by the query system 114. Individual rows of can represent different events and columns can represent different fields for the different events. In some cases, these fields can include raw machine data, host, source, and sourcetype.

At block 440, the query system 114 uses the filter criteria 430A (e.g., "sourcetype=syslog ERROR") to filter events stored on the disk 422 to generate an intermediate results table 424. Given the semantics of the query 430 and order of the commands, the query system 114 can execute the filter criteria 430A portion of the query 430 before executing Command1 or Command2.

Rows in the table 424 may represent individual records, where each record corresponds to an event in the disk 422 that satisfied the filter criteria. Columns in the table 424 may correspond to different fields of an event or record, such as "user," "count," percentage," "timestamp," or the raw machine data of an event, etc. Notably, the fields in the intermediate results table 424 may differ from the fields of the events on the disk 422. In some cases, this may be due to the late binding schema described herein that can be used to extract field values at search time. Thus, some of the fields in table 424 may not have existed in the events on disk 422.

Illustratively, the intermediate results table 424 has fewer rows than what is shown in the disk 422 because only a subset of events retrieved from the disk 422 matched the filter criteria 430A "sourcetype=syslog ERROR." In some embodiments, instead of searching individual events or raw machine data, the set of events in the intermediate results table 424 may be generated by a call to a pre-existing inverted index.

At block 442, the query system 114 processes the events of the first intermediate results table 424 to generate the second intermediate results table 426. With reference to the query 430, the query system 114 processes the events of the first intermediate results table 424 to identify the top users according to Command1. This processing may include determining a field value for the field "user" for each record in the intermediate results table 424, counting the number of unique instances of each "user" field value (e.g., number of users with the name David, John, Julie, etc.) within the intermediate results table 424, ordering the results from largest to smallest based on the count, and then keeping only the top 10 results (e.g., keep an identification of the top 10 most common users). Accordingly, each row of table 426 can represent a record that includes a unique field value for the field "user," and each column can represent a field for that record, such as fields "user," "count," and "percentage."

At block 444, the query system 114 processes the second intermediate results table 426 to generate the final results table 428. With reference to query 430, the query system 114 applies the command "fields-present" to the second intermediate results table 426 to generate the final results table 428. As shown, the command "fields-present" of the query 430 results in one less column, which may represent that a field was removed during processing. For example, the query system 114 may have determined that the field "percentage" was unnecessary for displaying the results based on the Command2. In such a scenario, each record of the final results table 428 would include a field "user," and "count." Further, the records in the table 428 would be ordered from largest count to smallest count based on the query commands.

It will be understood that the final results table 428 can be a third intermediate results table, which can be pipelined to another stage where further filtering or processing of the data can be performed, e.g., preparing the data for display purposes, filtering the data based on a condition, performing a mathematical calculation with the data, etc. In different embodiments, other query languages, such as the Structured Query Language ("SQL"), can be used to create a query.

As described herein, extraction rules can be used to extract field-value pairs or field values from data. An extraction rule can comprise one or more regex rules that specify how to extract values for the field corresponding to the extraction rule. In addition to specifying how to extract field values, the extraction rules may also include instructions for deriving a field value by performing a function on a character string or value retrieved by the extraction rule. For example, an extraction rule may truncate a character string or convert the character string into a different data format. Extraction rules can be used to extract one or more values for a field from events by parsing the portions of machine data in the events and examining the data for one or more patterns of characters, numbers, delimiters, etc., that indicate where the field begins and, optionally, ends. In certain embodiments, extraction rules can be stored in one or more configuration files. In some cases, a query itself can specify one or more extraction rules.

In some cases, extraction rules can be applied at data ingest by the intake system 110 and/or indexing system 112. For example, the intake system 110 and indexing system 112 can apply extraction rules to ingested data and/or events generated from the ingested data and store results in an inverted index.

The system 102 advantageously allows for search time field extraction. In other words, fields can be extracted from the event data at search time using late-binding schema as opposed to at data ingestion time, which was a major limitation of the prior art systems. Accordingly, extraction rules can be applied at search time by the query system 114. The query system can apply extraction rules to events retrieved from the storage system 116 or data received from sources external to the system 102. Extraction rules can be applied to all the events in the storage system 116 or to a subset of the events that have been filtered based on some filter criteria (e.g., event timestamp values, etc.).

FIG. 4C is a block diagram illustrating an embodiment of the table 319 showing events 320-326, described previously with reference to FIG. 3B. As described herein, the table 319 is for illustrative purposes, and the events 320-326 may be stored in a variety of formats in an event data file 316 or raw record data store. Further, it will be understood that the event data file 316 or raw record data store can store millions of events. FIG. 4C also illustrates an embodiment of a search bar 450 for entering a query and a configuration file 452 that includes various extraction rules that can be applied to the events 320-326.

As a non-limiting example, if a user inputs a query into search bar 450 that includes only keywords (also known as "tokens"), e.g., the keyword "error" or "warning," the query system 114 can search for those keywords directly in the events 320-326 stored in the raw record data store.

As described herein, the indexing system 112 can optionally generate and use an inverted index with keyword entries to facilitate fast keyword searching for event data. If a user searches for a keyword that is not included in the inverted index, the query system 114 may nevertheless be able to retrieve the events by searching the event data for the keyword in the event data file 316 or raw record data store directly. For example, if a user searches for the keyword "eva," and the name "eva" has not been indexed at search time, the query system 114 can search the events 320-326 directly and return the first event 320. In the case where the keyword has been indexed, the inverted index can include a reference pointer that will allow for a more efficient retrieval of the event data from the data store. If the keyword has not been indexed, the query system 114 can search through the events in the event data file to service the search.

In many cases, a query include fields. The term "field" refers to a location in the event data containing one or more values for a specific data item. Often, a field is a value with a fixed, delimited position on a line, or a name and value pair, where there is a single value to each field name. A field can also be multivalued, that is, it can appear more than once in an event and have a different value for each appearance, e.g., email address fields. Fields are searchable by the field name or field name-value pairs. Some examples of fields are "clientip" for IP addresses accessing a web server, or the "From" and "To" fields in email addresses.

By way of further example, consider the query, "status=404." This search query finds events with "status" fields that have a value of "404." When the search is run, the query system 114 does not look for events with any other "status" value. It also does not look for events containing other fields that share "404" as a value. As a result, the search returns a set of results that are more focused than if "404" had been used in the search string as part of a keyword search. Note also that fields can appear in events as "key=value" pairs such as "user_name=Bob." But in most cases, field values appear in fixed, delimited positions without identifying keys. For example, the data store may contain events where the "user_name" value always appears by itself after the timestamp as illustrated by the following string: "Nov 15 09:33:22 evaemerson."

FIG. 4C illustrates the manner in which configuration files may be used to configure custom fields at search time in accordance with the disclosed embodiments. In response to receiving a query, the query system 114 determines if the query references a "field." For example, a query may request a list of events where the "clientip" field equals "127.0.0.1." If the query itself does not specify an extraction rule and if the field is not an indexed metadata field, e.g., time, host, source, sourcetype, etc., then in order to determine an extraction rule, the query system 114 may, in one or more embodiments, locate configuration file 452 during the execution of the query.

Configuration file 452 may contain extraction rules for various fields, e.g., the "clientip" field. The extraction rules may be inserted into the configuration file 452 in a variety of ways. In some embodiments, the extraction rules can comprise regular expression rules that are manually entered in by the user.

In one or more embodiments, as noted above, a field extractor may be configured to automatically generate extraction rules for certain field values in the events when the events are being created, indexed, or stored, or possibly at a later time. In one embodiment, a user may be able to dynamically create custom fields by highlighting portions of a sample event that should be extracted as fields using a graphical user interface (GUI). The system can then generate a regular expression that extracts those fields from similar events and store the regular expression as an extraction rule for the associated field in the configuration file 452.

In some embodiments, the indexing system 112 can automatically discover certain custom fields at index time and the regular expressions for those fields will be automatically generated at index time and stored as part of extraction rules in configuration file 452. For example, fields that appear in the event data as "key=value" pairs may be automatically extracted as part of an automatic field discovery process. Note that there may be several other ways of adding field definitions to configuration files in addition to the methods discussed herein.

Events from heterogeneous sources that are stored in the storage system 116 may contain the same fields in different locations due to discrepancies in the format of the data generated by the various sources. For example, event 326 also contains a "clientip" field, however, the "clientip" field is in a different format from events 320, 322, and 324. Furthermore, certain events may not contain a particular field at all. To address the discrepancies in the format and content of the different types of events, the configuration file 452 can specify the set of events to which an extraction rule applies. For example, extraction rule 454 specifies that it is to be used with events having a sourcetype "access_combined," and extraction rule 456 specifies that it is to be used with events having a sourcetype "apache_error." Other extraction rules shown in configuration file 452 specify a set or type of events to which they apply. In addition, the extraction rules shown in configuration file 452 include a regular expression for parsing the identified set of events to determine the corresponding field value. Accordingly, each extraction rule may pertain to only a particular type of event. Accordingly, if a particular field, e.g., "clientip" occurs in multiple types of events, each of those types of events can have its own corresponding extraction rule in the configuration file 452 and each of the extraction rules would comprise a different regular expression to parse out the associated field value. In some cases, the sets of events are grouped by sourcetype because events generated by a particular source can have the same format.

The field extraction rules stored in configuration file 452 can be used to perform search-time field extractions. For example, for a query that requests a list of events with sourcetype "access_combined" where the "clientip" field equals "127.0.0.1," the query system 114 can locate the configuration file 452 to retrieve extraction rule 454 that allows it to extract values associated with the "clientip" field from the events where the sourcetype is "access_combined" (e.g., events 320-324). After the "clientip" field has been extracted from the events 320, 322, 324, the query system 114 can then apply the field criteria by performing a compare operation to filter out events where the "clientip" field does not equal "127.0.0.1." In the example shown in FIG. 4C, the events 320 and 322 would be returned in response to the user query. In this manner, the query system 114 can service queries with filter criteria containing field criteria and/or keyword criteria.

It should also be noted that any events filtered by performing a search-time field extraction using a configuration file 452 can be further processed by directing the results of the filtering step to a processing step using a pipelined search language. Using the prior example, a user can pipeline the results of the compare step to an aggregate function by asking the query system 114 to count the number of events where the "clientip" field equals "127.0.0.1."

By providing the field definitions for the queried fields at search time, the configuration file 452 allows the event data file or raw record data store to be field searchable. In other words, the raw record data store can be searched using keywords as well as fields, wherein the fields are searchable name/value pairings that can distinguish one event from another event and can be defined in configuration file 452 using extraction rules. In comparison to a search containing field names, a keyword search may result in a search of the event data directly without the use of a configuration file.

Further, the ability to add schema to the configuration file 452 at search time results in increased efficiency and flexibility. A user can create new fields at search time and simply add field definitions to the configuration file 452. As a user learns more about the data in the events, the user can continue to refine the late-binding schema by adding new fields, deleting fields, or modifying the field extraction rules in the configuration file for use the next time the schema is used by the system 102. Because the system 102 maintains the underlying raw data and uses late-binding schema for searching the raw data, it enables a user to continue investigating and learn valuable insights about the raw data long after data ingestion time. Similarly, multiple field definitions can be added to the configuration file to capture the same field across events generated by different sources or sourcetypes. This allows the system 102 to search and correlate data across heterogeneous sources flexibly and efficiently.

The system 102 can use one or more data models to search and/or better understand data. A data model is a hierarchically structured search-time mapping of semantic knowledge about one or more datasets. It encodes the domain knowledge used to build a variety of specialized searches of those datasets. Those searches, in turn, can be used to generate reports.

The above-described system provides significant flexibility by enabling a user to analyze massive quantities of minimally-processed data "on the fly" at search time using a late-binding schema, instead of storing pre-specified portions of the data in a database at ingestion time. This flexibility enables a user to see valuable insights, correlate data, and perform subsequent queries to examine interesting aspects of the data that may not have been apparent at ingestion time.

Performing extraction and analysis operations at search time can involve a large amount of data and require a large number of computational operations, which can cause delays in processing the queries. In some embodiments, the system 102 can employ a number of unique acceleration techniques to speed up analysis operations performed at search time. These techniques include: performing search operations in parallel using multiple components of the query system 114, using an inverted index 118, and accelerating the process of generating reports.

To facilitate faster query processing, a query can be structured such that multiple components of the query system 114 (e.g., search nodes) perform the query in parallel, while aggregation of search results from the multiple components is performed at a particular component (e.g., search head). For example, consider a scenario in which a user enters the query "Search "error" | stats count BY host." The query system 114 can identify two phases for the query, including: (1) subtasks (e.g., data retrieval or simple filtering) that may be performed in parallel by multiple components, such as search nodes, and (2) a search results aggregation operation to be executed by one component, such as the search head, when the results are ultimately collected from the search nodes.

Based on this determination, the query system 114 can generate commands to be executed in parallel by the search nodes, with each search node applying the generated commands to a subset of the data to be searched. In this example, the query system 114 generates and then distributes the following commands to the individual search nodes: "Search "error" | prestats count BY host." In this example, the "prestats" command can indicate that individual search nodes are processing a subset of the data and are responsible for producing partial results and sending them to the search head. After the search nodes return the results to the search head, the search head aggregates the received results to form a single search result set. By executing the query in this manner, the system effectively distributes the computational operations across the search nodes while reducing data transfers. It will be understood that the query system 114 can employ a variety of techniques to use distributed components to execute a query. In some embodiments, the query system 114 can use distributed components for only mapping functions of a query (e.g., gather data, applying filter criteria, etc.). In certain embodiments, the query system 114 can use distributed components for mapping and reducing functions (e.g., joining data, combining data, reducing data, etc.) of a query.

4.0. Example Use Cases

The system 102 provides various schemas, dashboards, and visualizations that simplify developers' tasks to create applications with additional capabilities, including but not limited to security, data center monitoring, IT service monitoring, and client/customer insights.

An embodiment of an enterprise security application is as SPLUNK® ENTERPRISE SECURITY, which performs monitoring and alerting operations and includes analytics to facilitate identifying both known and unknown security threats based on large volumes of data stored by the system 102. The enterprise security application provides the security practitioner with visibility into security-relevant threats found in the enterprise infrastructure by capturing, monitoring, and reporting on data from enterprise security devices, systems, and applications. Through the use of the system 102 searching and reporting capabilities, the enterprise security application provides a top-down and bottom-up view of an organization's security posture.

An embodiment of an IT monitoring application is SPLUNK® IT SERVICE INTELLIGENCE™, which performs monitoring and alerting operations. The IT monitoring application also includes analytics to help an analyst diagnose the root cause of performance problems based on large volumes of data stored by the system 102 as correlated to the various services an IT organization provides (a service-centric view). This differs significantly from conventional IT monitoring systems that lack the infrastructure to effectively store and analyze large volumes of service-related events. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, an IT monitoring application system stores large volumes of minimally-processed service-related data at ingestion time for later retrieval and analysis at search time, to perform regular monitoring, or to investigate a service issue. To facilitate this data retrieval process, the IT monitoring application enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the events that pertains to the entity, whether produced by the entity itself or by another machine, and considering the many various ways the entity may be identified in machine data (such as by a URL, an IP address, or machine name). The service and entity definitions can organize events around a service so that all of the events pertaining to that service can be easily identified. This capability provides a foundation for the implementation of Key Performance Indicators.

As described herein, the system 102 can receive heterogeneous data from disparate systems. In some cases, the data from the disparate systems may be related and correlating the data can result in insights into client or customer interactions with various systems of a vendor. To aid in the correlation of data across different systems, multiple field definitions can be added to one or more configuration files to capture the same field or data across events generated by different sources or sourcetypes. This can enable the system 102 to search and correlate data across heterogeneous sources flexibly and efficiently.

Figure 4D:
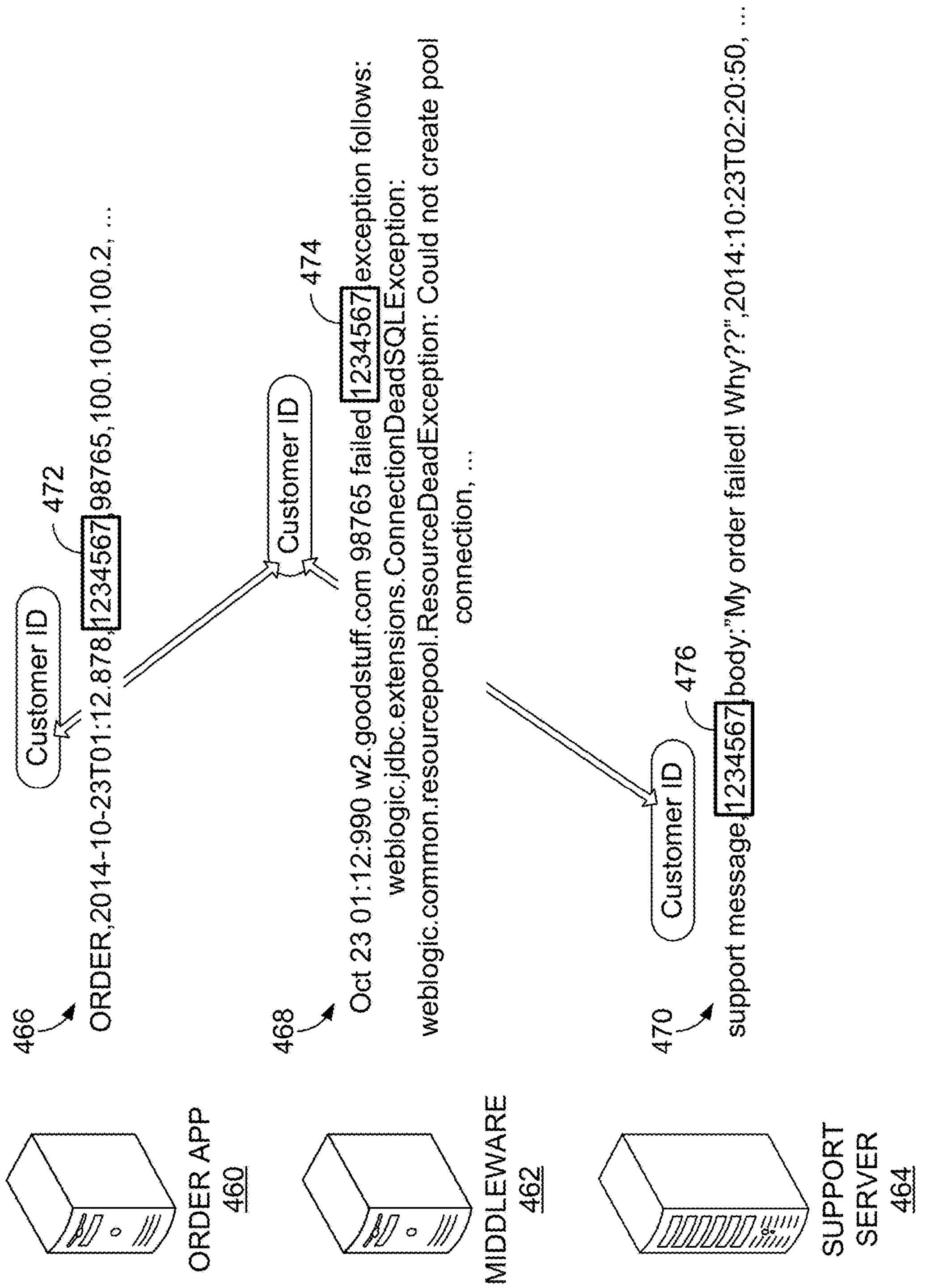
FIG. 4D is a block diagram illustrating an example scenario where a common customer identifier is found among log data received from disparate data sources.

As a non-limiting example and with reference to FIG. 4D, consider a scenario in which a common customer identifier is found among log data received from three disparate data sources. In this example, a user submits an order for merchandise using a vendor's shopping application program 460 running on the user's system. In this example, the order was not delivered to the vendor's server due to a resource exception at the destination server that is detected by the middleware code 462. The user then sends a message to the customer support server 464 to complain about the order failing to complete. The three systems 460, 462, 464 are disparate systems that do not have a common logging format. The shopping application program 460 sends log data 466 to the system 102 in one format, the middleware code 462 sends error log data 468 in a second format, and the support server 464 sends log data 470 in a third format.

Using the log data received at the system 102 from the three systems 460, 462, 464, the vendor can uniquely obtain an insight into user activity, user experience, and system behavior. The system 102 allows the vendor's administrator to search the log data from the three systems 460, 462, 464, thereby obtaining correlated information, such as the order number and corresponding customer ID number of the person placing the order. The system 102 also allows the administrator to see a visualization of related events via a user interface. The administrator can query the system 102 for customer ID field value matches across the log data from the three systems 460, 462, 464 that are stored in the storage system 116. While the customer ID field value exists in the data gathered from the three systems 460, 462, 464, it may be located in different areas of the data given differences in the architecture of the systems. The query system 114 obtains events from the storage system 116 related to the three systems 460, 462, 464. The query system 114 then applies extraction rules to the events in order to extract field values for the field "customer ID" that it can correlate. As described herein, the query system 114 may apply a different extraction rule to each set of events from each system when the event format differs among systems. In this example, a user interface can display to the administrator the events corresponding to the common customer ID field values 472, 474, and 476, thereby providing the administrator with insight into a customer's experience. The system 102 can provide additional user interfaces and reports to aid a user in analyzing the data associated with the customer.

5.0. Architecture of Cluster Computing System

One or more embodiments are directed to a distributed alert and suppression management technique in a cluster computing system. In the cluster computing system, rather than having a cluster manager that performs alert and suppression management, each processing node is configured to individually perform alert and suppression management. An alert may be issued when results of a query satisfy a trigger condition. One or more actions may be performed after the alert is issued. Examples of actions performed when an alert is issued may include displaying information about the alert in a GUI in real time and/or logging an alert record for the alert. A suppression may suppress the issuing of an alert for a period of time. The period of time may be referred to as the suppression expiration time or time to live (TTL). The suppressed alert may be issued after the suppression expiration time has elapsed. A shared data store external to the processing nodes of the cluster computing system stores the global state of alerts and suppressions. The global state of alerts and suppressions are stored as alert records and suppression records in a shared alert data store and a shared suppression data store, respectively, of the shared data store.

One aspect of a cluster environment is maintaining data consistency across processing nodes, which may each use and update various alert records and suppression records. One or more embodiments are directed to a distributed updating technique used to propagate changes amongst the various processing nodes. For example, when an alert record is deleted, a matching delete alert record is generated and stored in the alert data store. The delete alert record is propagated with the original alert records to the various processing nodes, and used to delete the corresponding copies on the various processing nodes. Thus, processing nodes may delete local copies of the alert records. For suppressions, as new suppression keys are generated, a processing node may send a batch update to the shared data store. The batch update is a single update to reduce network bandwidth of the cluster computing system.

Figure 5A:
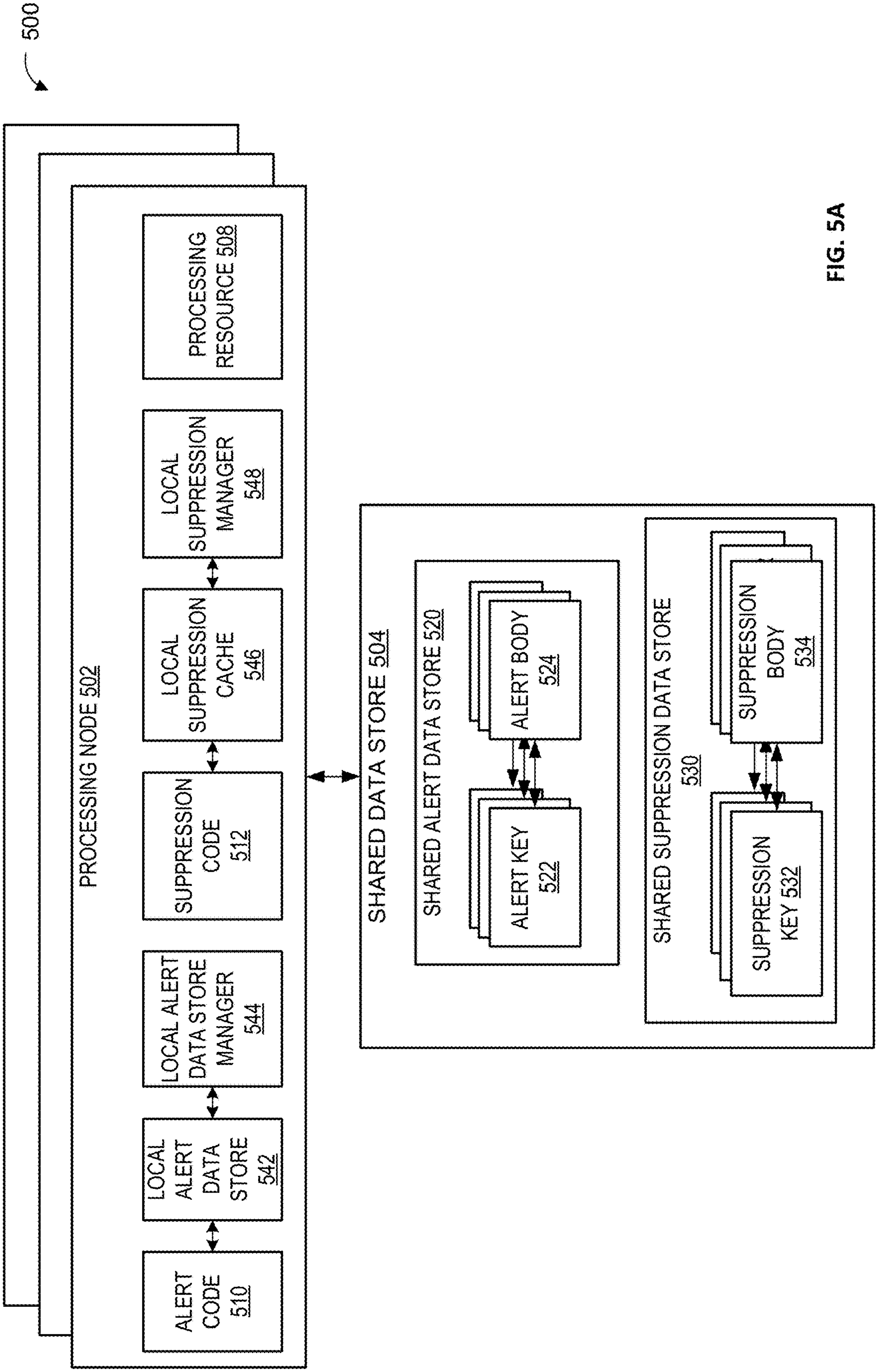
FIG. 5A is a block diagram of an embodiment of a cluster computing system.
Figure 6:
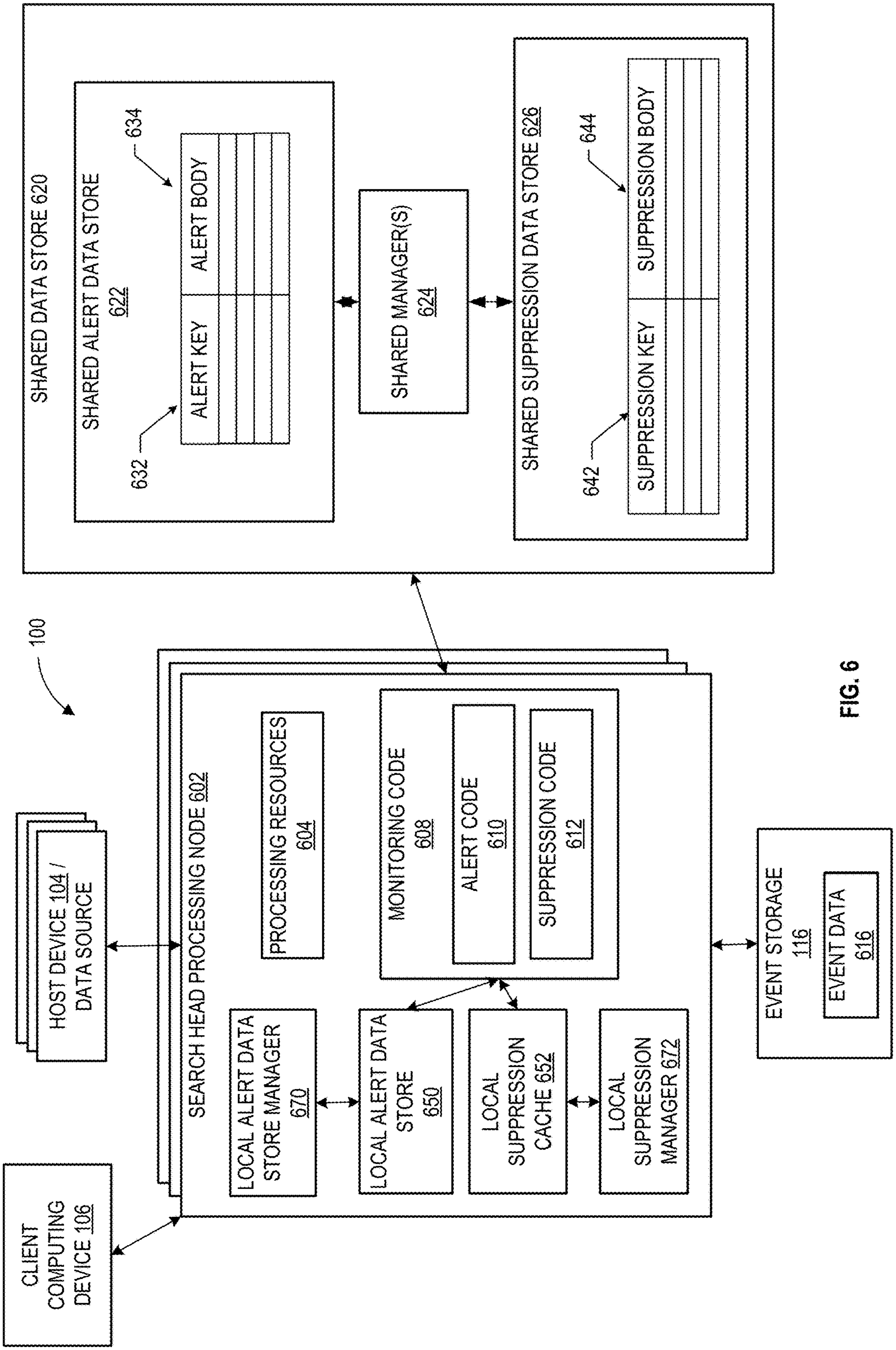
FIG. 6 is a block diagram of an embodiment of a data processing system.

FIG. 5A shows a cluster computing system 500 for performing distributed alert and suppression management. FIG. 6 shows a cluster computing system 100 for operating the data intake and query system, or a portion thereof, that includes functionality to perform distributed alert and suppression management. The cluster computing system can comprise servers, sensors, routers, personal computers, mobile devices, internet of things (IoT) devices, or hosting devices, such as computing devices in a shared computing resource environment on which multiple isolated execution environment (e.g., virtual machines, containers, etc.) can be instantiated, or other computing devices in an IT environment (e.g., device that includes computer hardware, e.g., processors, non-transitory, computer-readable media, etc.). In certain cases, the cluster can include a hosted, virtualized, or containerized devices, such as an isolated execution environment, which shares computing resources (e.g., processor, memory, etc.) of a particular machine (e.g., a hosting device or hosting machine) with other isolated execution environments.

Turning now to the figures of the distributed alert and suppression management, FIG. 5A is a block diagram of an embodiment of a cluster computing system 500. As shown in FIG. 5A, processing nodes 502 are connected to a shared data store 504. A processing node 502 is a physical or virtual computing node that includes dedicated processing resources 508. The dedicated processing resources 508 may include dedicated hardware and/or hardware shared with other computing nodes. For example, the processing node 502 may be a server, laptop or desktop computer, or other device that includes computer hardware (e.g., processors, non-transitory, computer-readable media, etc.). In another example, the processing node 502 may be a hosted, virtualized, or containerized device, such as an isolated execution environment, which shares processing resources (e.g., processor, memory, etc.) 508 of a particular machine with other isolated execution environments. In such a scenario, the dedicated processing resource 508 may be a physical portion of the shared processing resources and/or time slices thereof.

As shown in FIG. 5A, multiple processing nodes exist. The various processing nodes may be homogeneous or heterogeneous with respect to the processing resources assigned to the processing node and/or whether the processing node is physical or virtual. The various processing nodes may operate as peers. Thus, rather than having a cluster manager processing node that performs alert and suppression management, each processing node individually performs alert and suppression management. A manager processing node, which is separate or part of the cluster, may optionally exist to perform overall management of the cluster, such as to add new processing nodes, perform fault and failure detection, etc.

Each processing node 502 has a unique node identifier that uniquely identifies the processing node within the cluster. For example, the node identifier may be a network address of the processing node, a media access control (MAC) address, or other unique identifier of the processing node 502. The various processing nodes 502 each include alert code 510 and suppression code 512. The alert code 510 and suppression code 512 are sets of computer readable program code for performing alert and suppression management, respectively. The alert code 510 and suppression code 512 can include scripts and/or executable files for performing alert and suppression management. The alert code 510 includes functionality to issue an alert when a trigger condition is satisfied by results of a search query. The suppression code 512 includes functionality to suppress the issuance of an alert prior to the expiration of a suppression expiration time.

Alerts and suppressions are described below. An alert is a notification (e.g., to another system and/or a user) stating that a trigger condition has been satisfied. An alert may be issued when results of a query satisfy a trigger condition. The query may be a request for monitoring streaming event data in real-time for the trigger condition, a request to monitor temporarily stored data that is evaluated at recurring time intervals, and/or a request to search a data store for events matching the trigger condition (e.g., that is evaluated according to a schedule). One or more actions may be performed after the alert is issued. Examples of actions performed when an alert is issued may include displaying information about the alert in a GUI in real time and/or logging an alert record for the alert in the shared alert data store 520. The trigger condition may be evaluated in real time. Alternatively, the trigger condition may be evaluated according to a schedule.

Alerts are defined by an alert definition. The alert definition identifies the query and the trigger condition. The alert definition may further include configuration parameters. The configuration parameters may include the mode(s) to issue the alert. Further, the configuration parameters may indicate the frequency to execute a search and a number of alerts to trigger for each execution of a search. Specifically, the execution of a search searches the events and compares the events to the trigger condition. If the trigger condition is satisfied, at least one alert is issued. The search parameters of the search may be configured to trigger a single alert for the search or to transmit multiple alerts for the search. For example, a separate alert may be generated for each event that matches the trigger condition. Alert definitions are uniquely identified by a saved search selector.

A suppression is a state in which the issuance of an alert is suppressed for a period of time. Suppression removes at least one mode (e.g., real-time notification, pop-up notification, email notification, logging, delayed notification, etc.) of issuing an alert. For example, an alert may be deemed suppressed when the real-time notification is not transmitted, and the alert is logged. In another example, the suppression of the alert may mean both not transmitting the notification via short messaging service (SMS) and not logging the alert. Other methods of suppressing an alert may be used without departing from the scope of the claims. Thus, suppressing the alert stops the notification of the alert through at least one mechanism.

The period of time may be referred to as the suppression expiration time or time to live (TTL). The suppressed alert may be issued after the suppression expiration time has elapsed. An alert defined in single-suppression mode may be suppressed at most once per processing node. For example, the first time an alert defined in single-suppression mode is triggered on a processing node, the alert may be suppressed. Continuing this example, subsequent triggering of the alert in the processing node within the suppression expiration time is not suppressed.

A suppression may be a field-based suppression that specifies a list of field names (e.g., host, sourcetype, etc.) and a suppression period. Each unique combination of field values corresponding to the list of field names may be recorded (e.g., recorded in a sort key). Events with a previously recorded combination of field values of the fields identified by the field names may be suppressed. For example, if the field-based suppression specifies the field names of host and sourcetype, and there are four events with field values <host1, source1, remaining fields>, <host1, source2, remaining fields>, <host2, source1, remaining fields> <host1, source1, remaining fields>, then the first three events are not suppressed because the first three events have a combination of host and sourcetype field values that have not yet been recorded. However, the fourth event is suppressed because the fourth event has a combination of host and sourcetype field values that has already been recorded (i.e., the fourth event has the same combination of host and sourcetype values as the first event, which was recorded when the first event was processed). In an alternative embodiment, a field-based suppression may specify values of one or more fields such that search query results matching specified values of the one or more fields are suppressed. As yet another alternative embodiment, the field-based suppression may specify values of the one or more fields such that results of the search query matching the specified values of the one or more fields are not suppressed.

A suppression may be a group suppression that specifies a group of alerts each corresponding to a different suppression expiration time. When the group suppression suppresses a first alert in the group of alerts then the group suppression also suppresses the other alerts in the group. The expiration time of the group suppression may be set to the suppression expiration time corresponding to the first alert.

A shared data store 504 is a data storage repository external to the processing nodes 502 that includes a shared alert data store 520 and a shared suppression data store 530. The shared data store 504 stores the global state of alerts and suppressions for the processing nodes of the cluster. In general, a data storage repository is a storage unit or storage device for storing data. Examples of a data repository and, correspondingly, the shared data store 504 include a flat file, a data structure, such as a table, heap, or other data structure, a database, etc. The shared data store 504 may be implemented using a database service that supports key-value access to data, such as Amazon DynamoDB® service. Amazon DynamoDB® is a registered trademark of Amazon Technologies, Incorporated.

Storing the global, synchronized state of alerts and suppressions in an external shared data store 504, may reduce storage requirements for the processing nodes. In addition, it is unnecessary for the processing nodes to communicate with a cluster manager regarding alerts and/or suppressions, thus decoupling the processing nodes and the cluster manager.

The shared alert data store 520 stores different types of records. For example, a saved search selector record relates saved search selectors to a cluster. A counting record relates the saved search selector to a count of a number of alerts issued for the saved search selector; an original alert record is an alert record of an alert. A delete alert record is an alert record that identifies an original alert record to delete.

Figure 5B:
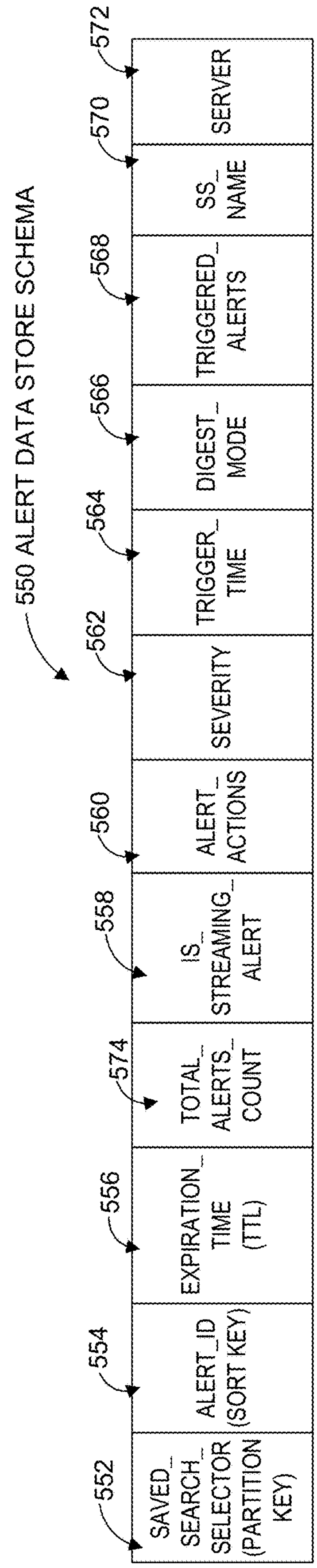
FIG. 5B is an example of an alert table schema.

The records in the shared alert data store 520 include an alert key 522 and an alert body 524. The format of the alert key 522 and the alert body 524 is defined by an alert data store schema. FIG. 5B shows an example of an alert data store schema 550.

Turning to FIG. 5A and FIG. 5B, the alert key 522 may be a primary key that uniquely identifies the corresponding record. The alert key 522 may include a partition key 552 and/or a sort key 554. For a saved search selector record, partition key 552 is an identifier of a cluster and the sort key 554 is a saved search selector. For counting records, original alert records, and delete alert records, the partition key 552 may be a saved search selector. The saved search selector may include the following fields: a global unique identifier (GUID) of a cluster, a username of a user that defines an owner of the search (if exists), application name of an application of where a search exists, and object name. For example, the object name may be the name of a query object that identifies a query. The sort key 554 is a key used to sort the records. For a saved search selector record, the sort key 554 is the saved search selector. For a counting record, the sort key identifies the record as a counting record. For an original alert record and delete alert record, the sort key 554 may be an alert identifier field 554. The alert identifier field 554 may be an identifier of an executed query (e.g., a scheduled query or a monitoring query). The alert identifier identifies a particular execution of the search according to the alert definition. The alert identifier may also include a unique identifier of a particular alert. The alert identifier field 554 may further include a timestamp field. In the case of an original alert record generated by an alert, the timestamp field identifies a time when the alert was triggered. In the case of a delete alert record, the timestamp field identifies a time the delete alert record was generated.

The alert body may include an expiration time (TTL) field 556, a total alerts count field 574, an "is streaming" alert field 558, an alert actions field 560, a severity field 562, a trigger time field 564, a digest mode field 566, a triggered alerts field 568, a saved search (ss) name field 570, and a server field 572. The expiration time field 556 stores the expiration time, which is the time when the alert expires. At the expiration time, the record may be deleted. The total alerts count field 574 is used for a counting record and stores a total number of alerts for saved search selector. The is streaming alert field 558 stores an "is streaming" alert flag indicating whether the alert is a streaming metric alert. For example, the streaming metric alert may be a real time alert that calculates a performance or computing resource utilization metric. A streaming metric alert may be executed as a historical scheduled search. The evaluation of a streaming metric alert can be done by group, where groups are defined as a list of dimension fields, delimited by comma. If there are multiple groups, each group (dimension field) is evaluated against the triggering condition.

The alert actions field 560 stores alert actions, which are the actions that are performed when the alert triggers (e.g., when the alert is issued). The severity field 562 stores a severity, which is a number indicating the severity of the alert. The trigger time field 564 stores a trigger time, which is a time when the alert was triggered. For an original alert, the triggered time matches the timestamp while for a delete alert record, the triggered time matches the triggered time of the original alert record. The digest mode field 566 stores a digest mode. The digest mode is a flag, which, when set, indicates that the alert may be triggered at most once per execution of the saved search query. The triggered alerts field 568 stores a tally of triggered alerts, which is the number of times that the alert has been triggered. For example, each time the alert is triggered, the triggered alerts field may be incremented. The triggered alerts field refers to the number of alerts triggered for a given execution of saved search. For digest mode alerts, the number of alerts will be either 0 or 1. For per-result alerts, the number of alerts will be the number of results in the saved search query that triggered alerts (i.e., results that are not suppressed if a suppression was present or number of results in the query if no suppression present). The saved search (ss) name field 570 stores a saved search name, which is the name of the saved query. The server field 572 stores a server identifier, which is the processing node where the alert is triggered.

In one or more embodiments, the shared alert data store 520 stores multiple types of records together. For example, the shared alert data store 520 may be a table in which the fields of a record that are pertinent to the record are populated while one or more other fields that are not pertinent are not populated. Other data structures may be used for the shared alert data store 520.

Figure 5C:
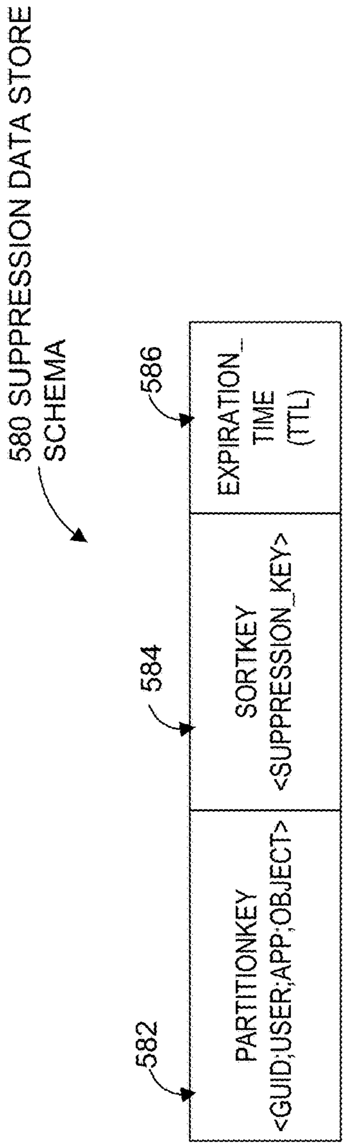
FIG. 5C is an example of a suppression data store schema.

As shown in FIG. 5A, the shared data store 504 also includes a shared suppression data store 530. The shared suppression data store 530 stores suppression records each describing a suppression. A suppression record includes a suppression key 532 and a suppression body 534. The format of the suppression key 532 and the suppression body 534 is defined by a suppression schema. FIG. 5C is an example of a suppression data store schema. The suppression key 532 may be a primary key that uniquely identifies the corresponding suppression record. The suppression key 532 may include a partition key 582 and/or a sort key 584. The partition key 582 in the shared suppression data store 530 may be an encoding of a global unique identifier (GUID), user, application, and/or object name. The partition key 582 may be thought of as a saved search query selector. In one or more embodiments, when the suppression is a group suppression, the application may be omitted from the partition key 582 and the object name may be the name of the group suppression. The GUID may be a GUID of a processing node. Alternatively, the GUID may be a GUID of a cluster of processing nodes. Inclusion of the GUID in the partition key enables a single shared suppression data store 530 to store suppression records for a cluster of processing nodes or a combination of multiple clusters and processing nodes.

The sort key 584 may be a suppression identifier. The suppression identifier may be an identifier of a query. The sort key may be empty or have the saved search selector when the alert corresponding to the suppression specifies digest mode (e.g., the corresponding alert is a single alert that is for an execution of a search). In the case of field-based suppression, the sort key may include an encoding (e.g., a hash value) of one or more field names and corresponding field values. Thus, the encoding records a combination of field values for field names specified in a field-suppression list that match events returned by the query or search results. The suppression body may include an expiration time field (i.e., TTL field 586) storing an expiration time. The expiration time is the next time at which an existing suppression expires.

One motivation for including a separate sort key in the suppression key is to support querying of suppressions by search query name, which can enable optimized deletion of suppressions for a saved search query when field-based suppression is enabled, for example, and the saved search query is disabled or deleted. In addition, the shared suppression data store may allow querying by partition key and thereby avoid an expensive scan on the shared suppression data store 530.

Returning to FIG. 5A, while processing nodes 502 use a shared data store 504, processing nodes 502 also have local copies of the records in the shared data store 504. For example, for the shared alert data store 520, the processing node 502 has a local alert data store 542. The local alert data store 542 has at least a portion of the records in the shared alert data store 520. In particular, the local alert data store 542 has copies of at least some of the records. When a processing node 502 updates a local copy, the update is copied to the shared alert data store such as by using embodiments described herein. A local alert data store manager 544 is configured to manage the local alert data store 542. The local alert data store manager 544 may include one or more threads. The threads may include one or more threads that periodically obtain updated records from the shared alert data store 520 and store the updated records in the local alert data store 542, transmit updates to the shared alert data store 520 from the local alert data store 542, and delete expired records based on the TTL field of each record. Using the local alert data store 542, the processing nodes may add new original alert records based on execution of a search, and interface with a user to show alerts and receive requests to delete alerts.

For the shared suppression data store 530, the processing nodes 502 each include a local suppression cache 546. The local suppression cache 546 includes suppression records in the shared suppression data store 530. The suppression records in the local suppression cache 546 are copies of a subset of the suppression records in the shared suppression data store 530. In one or more embodiments, the local suppression cache 546 is a cache of current suppression records. The cache may be updated prior to each search in some embodiments. The local suppression code 512 uses the local suppression cache 546 to perform suppression operations on the processing node 502. The local suppression cache 546 is connected to a local suppression manager 548. The local suppression manager 548 may include one or more threads. The threads may include one or more threads that periodically obtain suppression records from the shared suppression data store 530 and store the suppression records in the local suppression data store 546. The one or more threads may also send new suppression records to the shared suppression data store 530 from the local suppression data store 546 and delete expired suppression records based on the TTL field of each record. Using the local suppression data store 546, the processing nodes 502 may suppress alerts based on execution of a search without accessing the shared data store 504.

In one or more embodiments, each processing node 502 includes an interface (e.g., application programing interface (API) or graphical user interface (GUI)) (not shown) to communicate with applications and users directly or indirectly. Through the interface, the user may add alert definitions, suppression information, view and delete alerts, and perform other operations. The cluster computing system 500 of FIG. 5A may be performed in the context of a data intake and query system described above.

FIG. 6 is an example block diagram of an embodiment of a cluster computing system in a context of a data intake and query system 100. FIG. 6 shows a cluster computing system for operating the data intake and query system 100, or a portion thereof, that includes functionality to perform distributed alert and suppression management. The cluster computing system of FIG. 6 may be configured to ingest event data 616 into event storage 116 in FIG. 1. In the example of FIG. 6, the processing nodes of FIG. 5A are search head processing nodes 602 of FIG. 6. The host devices 104, client computing device 106, and event storage 116 are the same or similar to the host device, client computing device, and event storage, respectively, described above with reference to FIG. 1. The search head processing nodes 602 includes processing resources 604, such as the processing resources 508 discussed above with reference to FIG. 5A.

The search head processing nodes 602 in a search head cluster each include monitoring code 608. The monitoring code 608 includes functionality to monitor and/or respond to specific events. The monitoring code 608 may be located in centralized storage for reading by multiple search head processing nodes 602. The monitoring code 608 includes alert code 610 and suppression code 612, which is connected to a local alert data store 650 and local suppression cache 652, respectively. The local alert data store 650 and local suppression cache 652 are respectively managed by a local alert data store manager 670 and a local suppression manager 672. The alert code 610, suppression code 612, local alert data store 650, local suppression cache 652, local alert data store manager 670, and local suppression manager 672 are the same or similar to the respective like-named components described above with reference to FIGS. 5A-5C.

The search head processing nodes 602 are connected to a shared data store 620. The shared data store 620 is the shared data store 504 in FIG. 5A. For example, the data store may be an Amazon DynamoDB® database. As shown in FIG. 6, the shared data store 620 includes a shared alert data store 622, one or more shared managers 624, and a shared suppression data store 626. The shared alert data store 622 stores alert records each including an alert key 632 and an alert body 634. The shared suppression data store 626 stores suppression records each including a suppression key 642 and a suppression body 644.

The shared manager(s) 624 includes functionality to receive alert records and/or suppression records from the search head processing nodes 602. The shared manager(s) 624 includes functionality to send alert records and/or suppression records to the search head processing nodes 602. The shared manager(s) 624 includes functionality to delete a record from the shared data store when a current time exceeds the expiration time of the record or upon a request of an interface. For example, the record to be deleted may be stored in the shared alert data store 622 or the shared suppression data store 626. Further, in one or more embodiments, the shared manager(s) 624 includes functionality to maintain a count of a number of alert records (original or delete alert records), for each saved search selector, in the shared alert data store. Each saved search selector in the shared alert data store has a corresponding count of a number of alert records. The shared manager(s) 624 is configured to store the count in a counting record associated with the saved search selector in the shared alert data store. Further, the shared alert manager 624 is configured to add a saved search selector record when the counting record for the corresponding saved search selector has at least one in the total alert count field. Conversely, the shared alert manager 624 is configured to delete a saved search selector record when the counting record for the corresponding saved search selector does not have at least one in the total alert count field.

If the shared data store 620 is implemented as an Amazon DynamoDB® database, expired alerts and/or suppressions may be deleted automatically using the expiration time field. Alternatively, if the shared data store 620 is implemented as a key-value (KV) Service (e.g., a thread running inside a search head) the shared data store 620 may be periodically scanned to remove the expired alerts and/or suppressions.

Although FIG. 5A and FIG. 6 individually describe the general system and the specific data intake and query system for distributed alert and suppression management, any combination of the systems may be used. For example, rather than tables as shown in FIG. 6, any data structure may be used for the shared data store. Other combinations of the technologies described in FIG. 5A and FIG. 6 may exist without departing from the scope of the disclosure.

Figure 7:
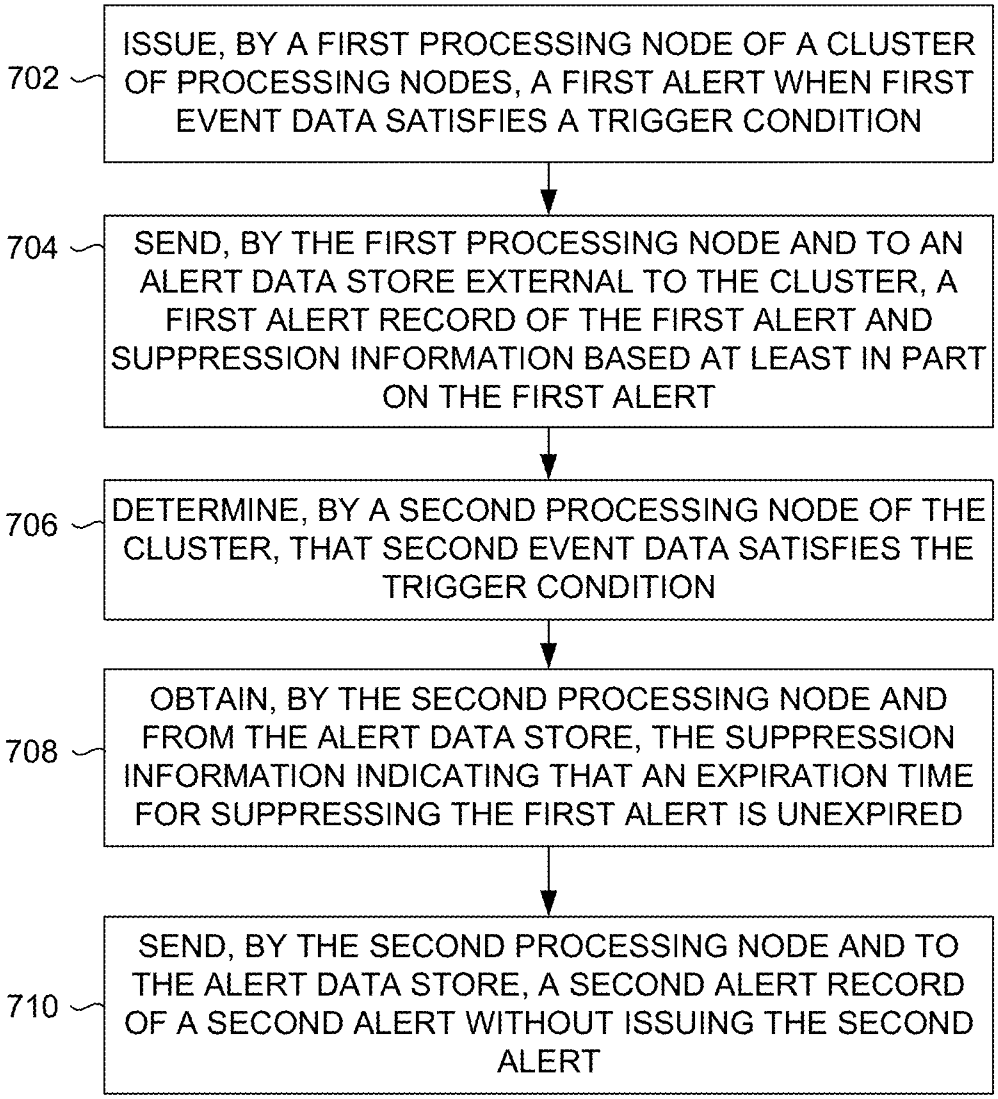
FIG. 7 is a flow diagram illustrating an embodiment of distributed alert and suppression management in a cluster computing system.

FIG. 7 is a flow diagram illustrating an embodiment of distributed alert and suppression management in a cluster computing system. At block 702, a first alert is issued by a first processing node of a cluster of processing nodes when first event data satisfies a trigger condition. The first event data may be a result of executing a query to events observed at the first processing node. In one or more embodiments, the first processing node may issue the alert after failing to obtain, from the shared data store, suppression information for the first alert.

An upper bound on the number of alerts to be triggered may be useful for a per-result alert. For example, the first 5 results may be processed per-result, and the remaining results could be grouped into one additional result. In addition, an upper bound may be placed on the alert expiration time.

At block 704, the first processing node sends an alert record of the first alert and suppression information to a shared data store external to the cluster based at least in part on the first alert. For example, the alert record may include values for one or more fields defined in an alert schema. The alert record may be stored in the alert data store of the shared data store. To send the alert record and the suppression record, the first processing node may store the alert record in a local alert data store and the suppression record in the local suppression data store of the first processing node. The local alert data store manager and local suppression manager may transmit the respective alert record and suppression record to the shared data store.

In one or more embodiments, the suppression information corresponds to a field-based suppression that specifies values for one or more fields. For example, the field-based suppression may specify a series of one or more field name/field value pairs. Alternatively, or additionally, the suppression information may correspond to a group suppression for multiple alerts. The suppression information may be stored in a suppression record in the data store of the shared data store. The suppression information includes an expiration time.

In one or more embodiments, the first processing node sends an alert record of another alert whose access is restricted to the first processing node to the shared data store. For example, the other alert may be a streaming metric alert that is local to the first processing node.

Some suppression fields can generate a huge number of suppressions. An upper bound on the number of suppressions may be used.

At block 706, a second processing node of the cluster determines that second event data satisfies the trigger condition. The second event data may be a result of executing the search query to events observed at the second processing node.

At block 708, the second processing node obtains, from the shared data store, suppression information indicating that an expiration time for suppressing the first alert is unexpired. The expiration time is unexpired when the expiration time is greater than the current time. The suppression information obtained from the shared data store represents the global state (e.g., relative to the processing nodes of the cluster) of suppression information for the first alert.

The shared data store may store suppression information corresponding to the names of multiple queries. Thus, the shared data store may transmit suppression information corresponding to the name of a query in response to receiving the name of the query.

At block 710, a second alert record of a second alert is sent by the second processing node to the shared data store, without issuing the second alert. Sending the second alert record may be performed in a similar manner to sending the first alert record, via the local alert data store. That is, the shared data store may store an alert record of an alert that has triggered and has not yet been issued due to the alert being suppressed. Subsequent to sending the second alert record to the shared data store, the second processing node may determine that the expiration time for suppressing the first alert has expired. In response to determining that the expiration time for suppressing the first alert has expired, the second processing node may then issue the second alert.

By sending the second alert record to the shared data store, a centralized record of alerts is maintained. Thus, if the second processing node, first processing node, or another processing node, receives a request for alerts and/or suppressions through a GUI, then the processing node may respond using the shared data store. For example, the GUI may be a dashboard from which a user may monitor the global state of alerts and/or suppression information for alerts. The processing node may obtain, from the shared data store, alert records and/or suppression records corresponding to the alert records. The processing node receiving the request may then update the GUI using the alert records and/or suppression records.

In one or more embodiments, once the expiration time for suppressing the first alert has expired, the expiration time may be updated (e.g., extended) if subsequent suppression of the first alert is desired.

Figure 8:
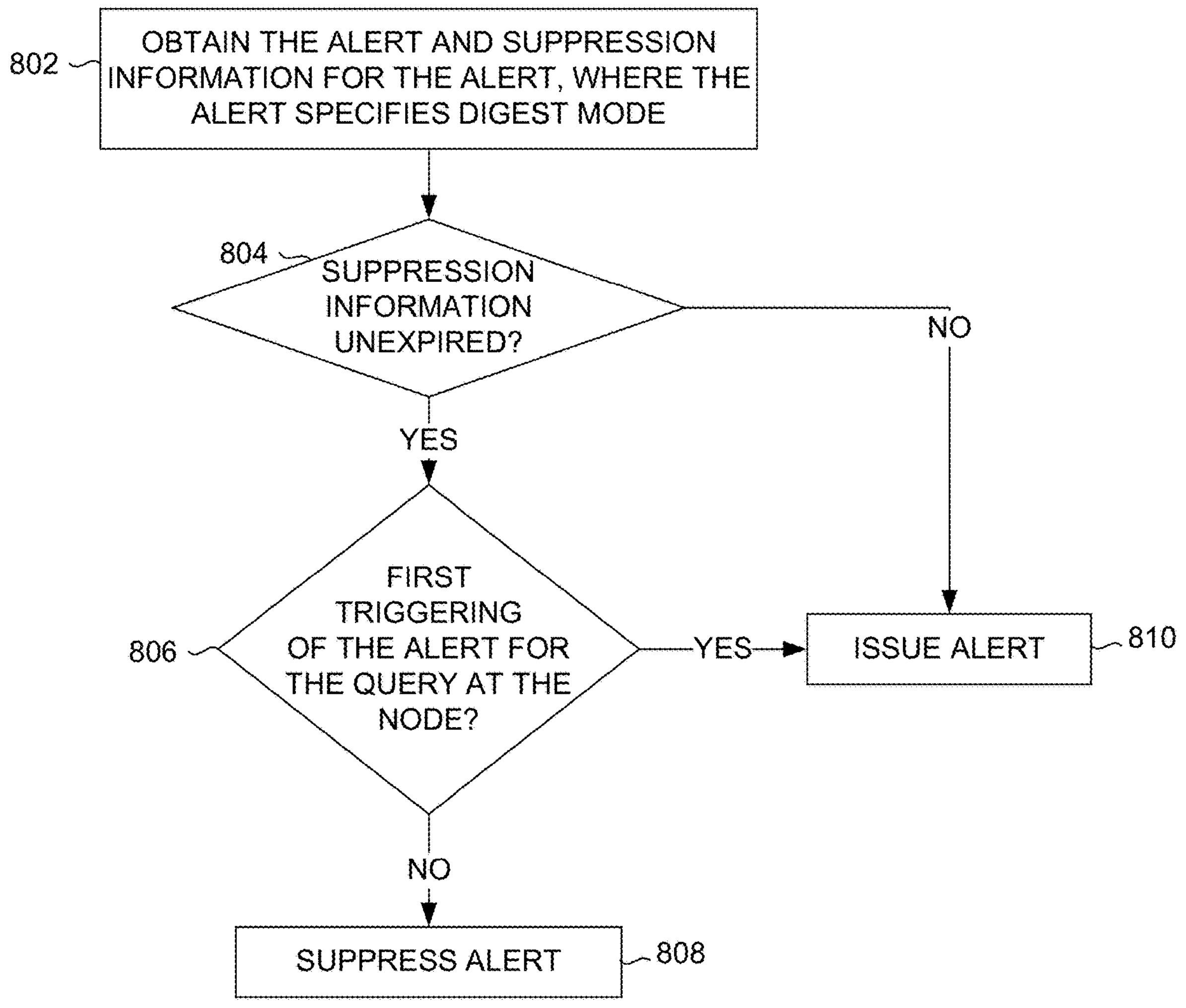
FIG. 8 is a flow diagram illustrating an embodiment of suppressing an alert in digest mode.

FIG. 8 shows a flow diagram describing how the suppression information is processed when the suppression information is for an alert that specifies digest mode. Digest mode may indicate that the alert is suppressed at most once per execution of the query on the processing node. In one or more embodiments, digest mode may be implemented based on the entire results of the search query rather than being based on each individual search result. For example, a trigger condition for an alert specifying digest mode may be satisfied when a count of search results exceeds 10. If suppression is specified, the first alert may be issued, and a suppression key may be stored and later referenced when deciding whether to suppress issuance of subsequent alerts. At block 802, the alert and suppression information for the alert is obtained, where the alert specifies digest mode (see description of block 708 above). If, at block 804 it is determined that the suppression information is unexpired, then block 806 below is performed. Otherwise, if block 804 determines that the suppression information is expired, then in block 810, the alert is issued.

If, at block 806 it is determined that this is the first triggering of the alert for the execution of the query at the processing node, then in block 810 the alert is issued. Otherwise, if block 806 determines that the alert has already been triggered (e.g., and issued) for the execution of the query at the processing node, then in block 808 the alert is suppressed. For example, suppressing the alert may include sending an alert record for the alert to the shared data store without issuing the alert.

Figure 9:
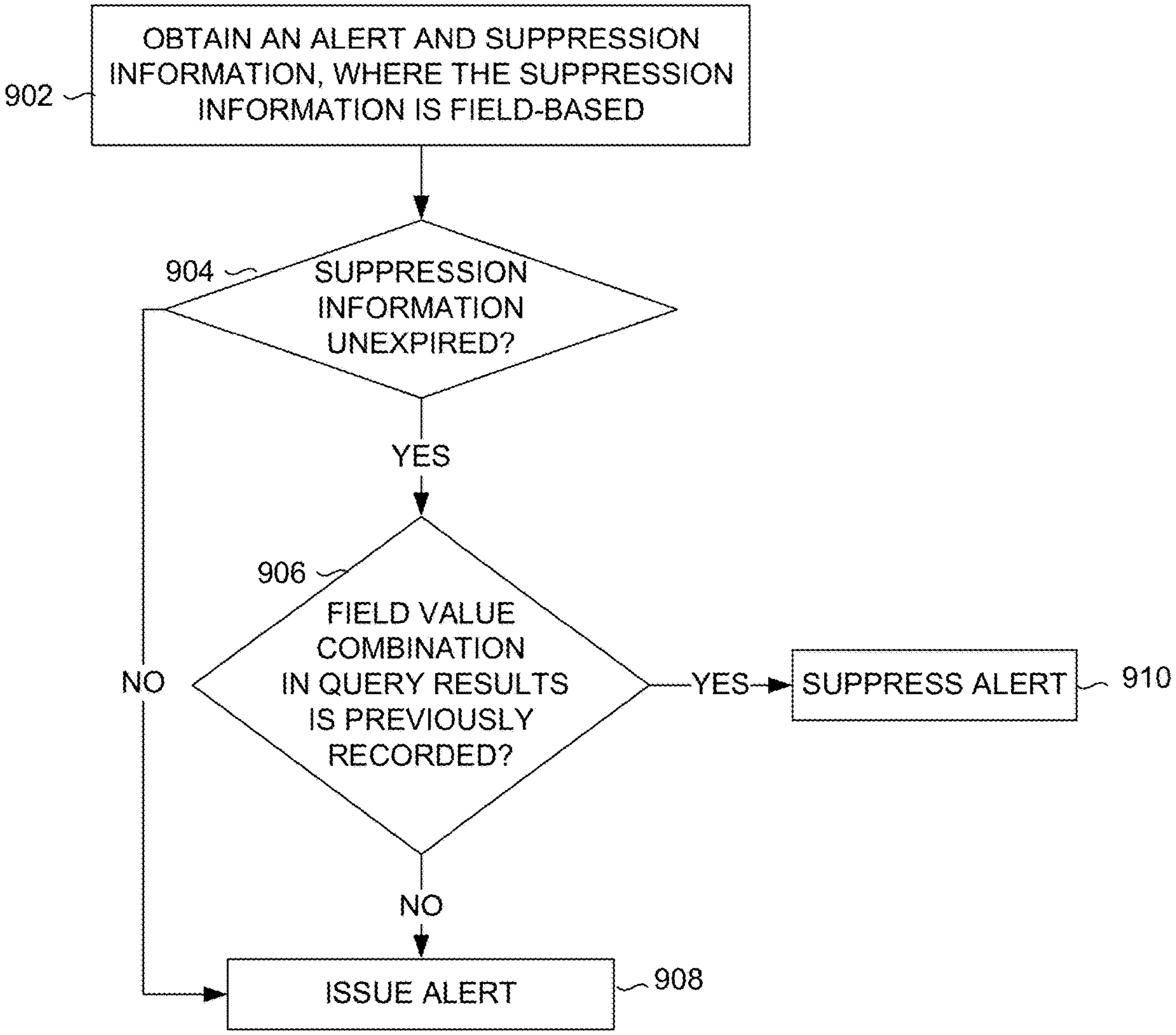
FIG. 9 is a flow diagram illustrating an embodiment of field-based suppression.

FIG. 9 shows a flow diagram describing how the suppression information is processed when the suppression information describes a field-based suppression. At block 902, the alert and suppression information for the alert is obtained, where the suppression information is field-based (see description of block 708 above). If, at block 904, it is determined that the suppression information is unexpired, then block 906 below is performed. Otherwise, if block 904 determines that the suppression information is expired, then in block 908, the alert is issued.

If, at block 906 it is determined that the combination of field values in the search query results for the fields specified by the suppression information match a previously recorded combination of field values, then in block 910 the alert is suppressed. For example, if the suppression information specifies the fields <host, sourcetype>, and a search query result includes the previously recorded values <host1, sourcetype1>, an alert may be suppressed. Otherwise, if block 906 determines that the combination of field values fails to match a previously recorded combination of field values, then in block 908 the alert is issued. For example, if the search query result includes the previously unrecorded values <host2, sourcetype2>, then an alert may be issued, and the values <host2, sourcetype2> may be recorded (e.g., hashed) in a sort key for the suppression information. Issuing the alert may include transmitting the alert through one or more various configurable modes. For example, the alert may be issued when the alert is transmitted to an external system and/or to a user via a mode of transmission (i.e., communication channel).

Figure 10:
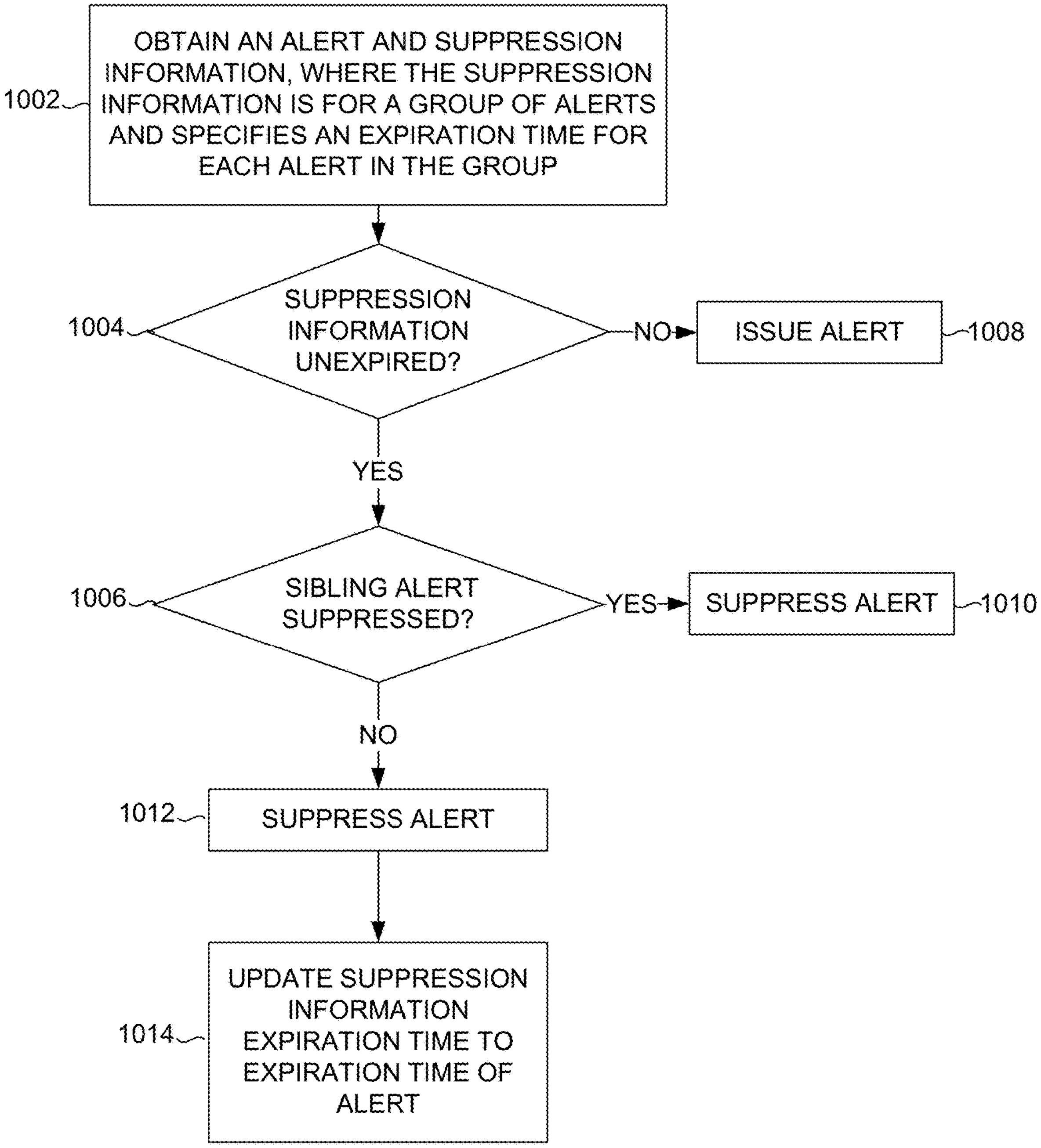
FIG. 10 is a flow diagram illustrating an embodiment of group suppression.

FIG. 10 shows a flow diagram describing how the suppression information is processed when the suppression information describes a group suppression. At block 1002, the alert and suppression information for the alert is obtained, where the suppression information is for a group of alerts that includes the alert (see description of block 708 above). The suppression information may specify a different expiration time for each of the alerts in the group of alerts. If, at block 1004 it is determined that the suppression information is unexpired, then block 1006 below is performed. Otherwise, if block 1004 determines that the suppression information is expired, then in block 1008, the alert is issued.

If, at block 1006 it is determined that one of the other alerts in the group of alerts has already been suppressed, then at block 1010 the alert is suppressed (e.g., because in a group suppression, the suppression of one alert causes the suppression of the other alerts in the group). Otherwise, if block 1006 determines that none of the other alerts in the group of alerts have yet been suppressed, then block 1012 below is performed.

In block 1012, the alert is suppressed. In block 1014, the suppression information is updated to set the suppression expiration time for each alert in the group to the suppression expiration time of the alert. A suppression record including the updated suppression information may be sent to the shared data store.

Figure 11:
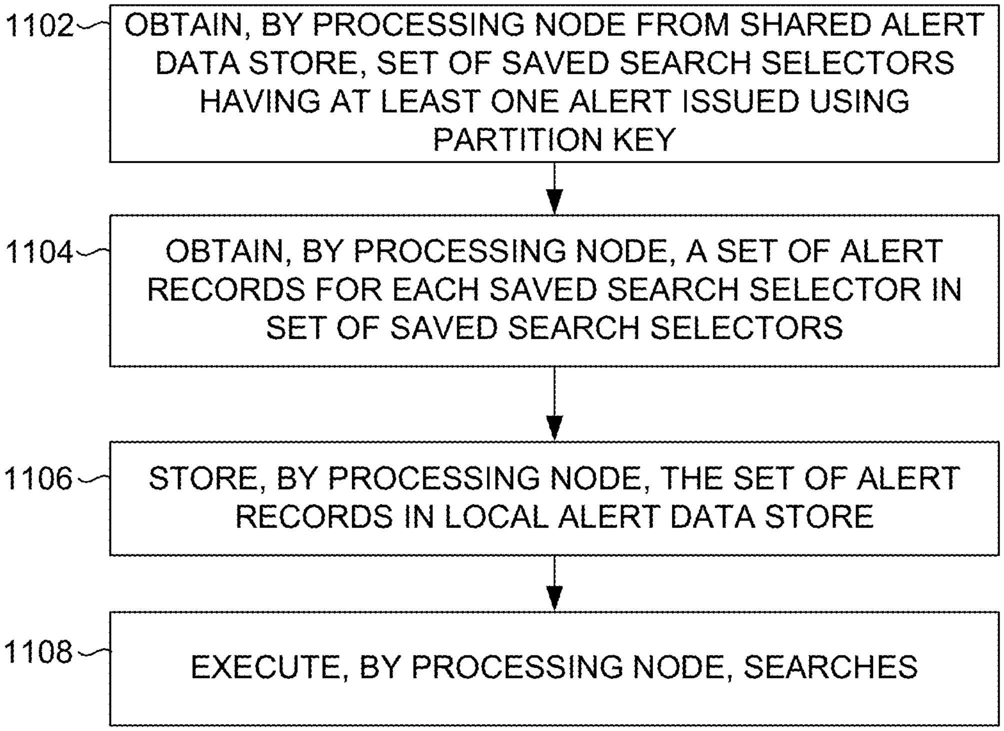
FIG. 11 is a flow diagram illustrating an embodiment of initializing a processing node.

FIG. 11 shows a flowchart for a processing node to initially obtain alert records from the shared alert data store. The initial obtaining of alert records may be performed, for example, when a new processing node is added to the cluster or restart in the cluster. As another example, the obtaining of alert regards may be responsive to the clearing of alert records in the local alert data store. At block 1102, the processing node obtains from the shared alert data store, a set of saved search selectors having at least one alert issued using the partition key. The processing node sends a query to the shared alert data store with the partition key of the processing node. The partition key can include the GUID of the processing node, and other information to obtain a portion of the search records for the particular processing node. The shared alert data store stores a saved search selector record that relates the partition key provided by the processing node to one or more saved search selectors. As described above, a saved search selector record exists for each saved search selector that is related to at least one alert. The shared alert data store tracks the count so that processing nodes only request the triggered alert state of saved searches that have triggered alerts. Namely, the obtaining of alert records may be a two part process: (1) find saved searches that have triggered alerts based on the count; and (2) request the alert records for only those saved searches. Thus, the network resources by not sending all alerts, even those irrelevant to the processing node, is saved.

At block 1104, the processing node obtains a set of alert records for each saved search selector in the set of saved search selectors. The processing node queries the shared alert data store for alert records having one of the saved search selectors in the set of saved search selectors as the partition key. Responsive to the request, the shared alert data store transmits the matching alert records to the processing node. At block 1106, the processing node stores the matching alert records in the local alert data store of the processing node. At this stage, the local alert data store manager may manage the copies of the alert records in the local alert data store, including obtaining new records. Further, if the processing node receives a request, via an interface, for alert records, the processing node may respond to the request using the local alert data store.

At Block 1108, the processing node executes searches as defined by the scheduler. Executing a search may be performed as described above. The execution of searches may cause new alerts. Any new search which is configured as an alert can result in triggering of new alerts which will be then added to the shared alert data store. In some cases, a user or application may access a processing node to manage the alerts.

Figure 12:
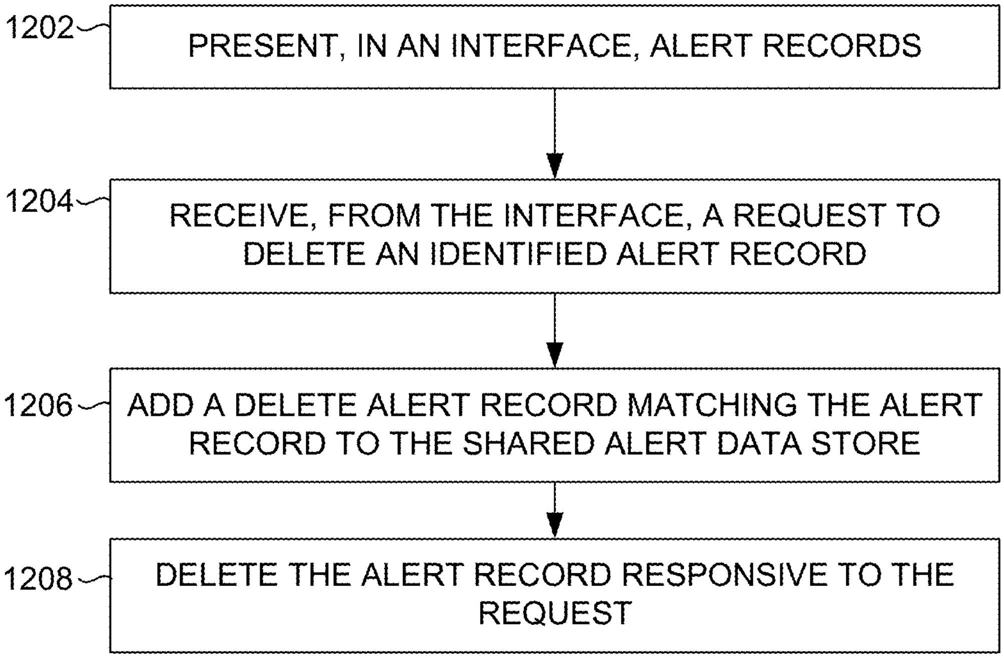
FIG. 12 is a flow diagram illustrating an embodiment of deleting a search record.

FIG. 12 shows a flowchart for interfacing directly or indirectly to review an alert. At block 1202, alert records are presented in an interface. For example, a processing node may display the alert records in tabular form in a GUI. When the user has viewed the alert record, the user may decide to delete an alert record. Similarly, when an alert record is sent to another application, the other application may initiate deletion of the alert record. At block 1204, a request to delete the identified alert record is received. The request to delete the local copy is to delete prior to the expiration of the TTL time.

While the identified alert record is deleted on the local processing node, the deletion should be propagated to the shared alert data store and the local alert data stores of the other processing nodes. To propagate the deletion, a delete alert record matching the identified alert record is added to the shared alert data store in Block 1206. The delete alert record has the same saved search selector, the same trigger time, and the same expiration time as the identified search record. Further, the alert identifier of the delete alert record has a new timestamp as of when the delete occurred and an annotation identifying the alert record as a delete alert record. The rest of the alert identifier of the delete alert record is the same as the identifier of the identified alert record that is deleted in Block 1206. By having the same saved search selector, rest of the alert identifier, and the same trigger time as the identified alert record, the delete alert record uniquely identifies the identified alert record. By having the same TTL time as the identified alert record, the delete alert record is not deleted until after copies of the processing nodes would otherwise remove the identified alert record. When the new alert records of the processing node are transmitted from the local alert data store to the shared alert data store, the delete alert records are also transmitted to the shared alert data store. At the shared alert data store, the identified alert record is identified and deleted based on the delete alert record.

The identified alert record is deleted without waiting for expiration of the TTL time in Block 1208. Specifically, a local copy of the alert record is deleted.

Figure 13:
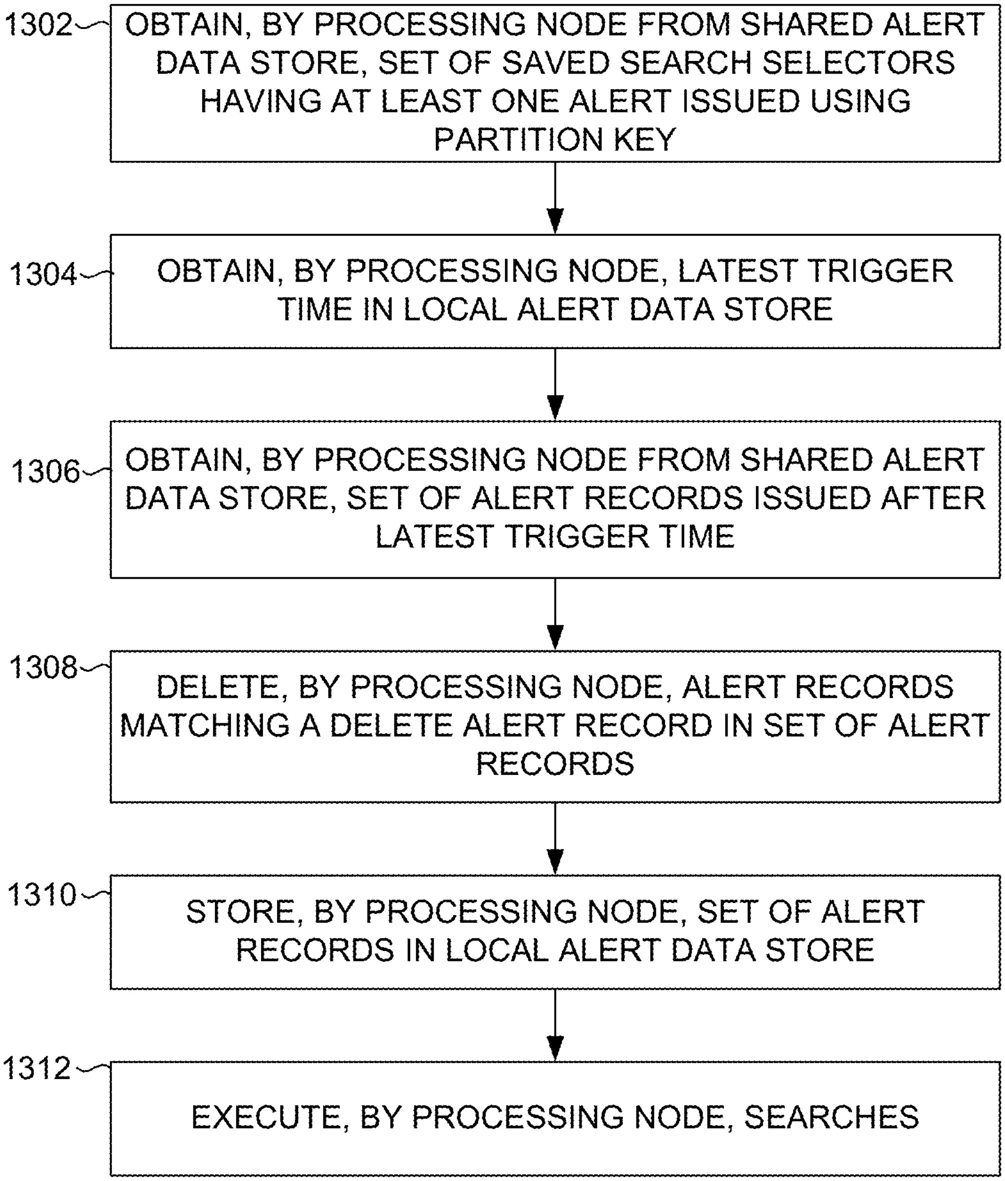
FIG. 13 is a flow diagram illustrating an embodiment of propagating a deletion.

FIG. 13 shows a flowchart for other processing nodes to obtain updated alert records. At block 1302, a processing node obtains from the shared alert data store, a set of saved search selectors having at least one alert issued using the partition key. Block 1302 may be performed in a similar manner discussed above with reference to block 1102 of FIG. 11. The shared alert data store transmits, to the processing node, the set of saved search selectors. By transmitting the set of saved search selectors, searches that have generated alerts are received, and used to identify the corresponding alert records.

In block 1304, the processing node obtains the latest trigger time in the local alert data store. The processing node determines the most recent trigger time listed in the local alert data store of the processing node. Using the latest trigger time, the processing node obtains, from the shared alert data store, the set of alert records issued after the latest trigger time. The processing node sends the latest trigger time as a query to the shared alert data store. The query may also include the set of saved search selectors.

In block 1306, the processing node obtains the set of alert records issued after the latest trigger time from the shared alert data store. The shared alert data store identifies the set of alert records having a timestamp in the alert identifier that is more recent than the latest trigger time. The shared alert data store may filter the alert records based on the set of saved search selectors. The set of alert records having a timestamp more recent than the latest trigger time is transmitted to the processing node. Notably, the set of alert records may include original alert records and delete alert records.

In block 1308, the processing node deletes the original alert records matching the delete alert records in the set of alert records. The processing node parses the alert records in the set to identify the alert records that are annotated as delete alert records. For each delete alert record in the set, the processing node compares the delete alert record to the copies of the alert records on the processing node in order to determine if the processing node has a matching original alert record. Determining whether a match is found may be performed as described above and based on a comparison of the trigger time, saved search selector, and alert identifier. If a match is found, the copy of the original alert record in the local alert data store is deleted.

In block 1310, the processing node stores the set of alert records in the local alert data store. Further, in block 1312, the processing node executes searches as defined by the scheduler. Storing the alert records and executing the searches may be performed as discussed above with reference to FIG. 11.

Continuing with the discussion, the execution of a search may cause alerts, some of which should be suppressed. Because various processing nodes may perform searches and generate alerts and suppression records, the processing node performing the search obtains current suppression keys with the execution of a search.

Figure 14:
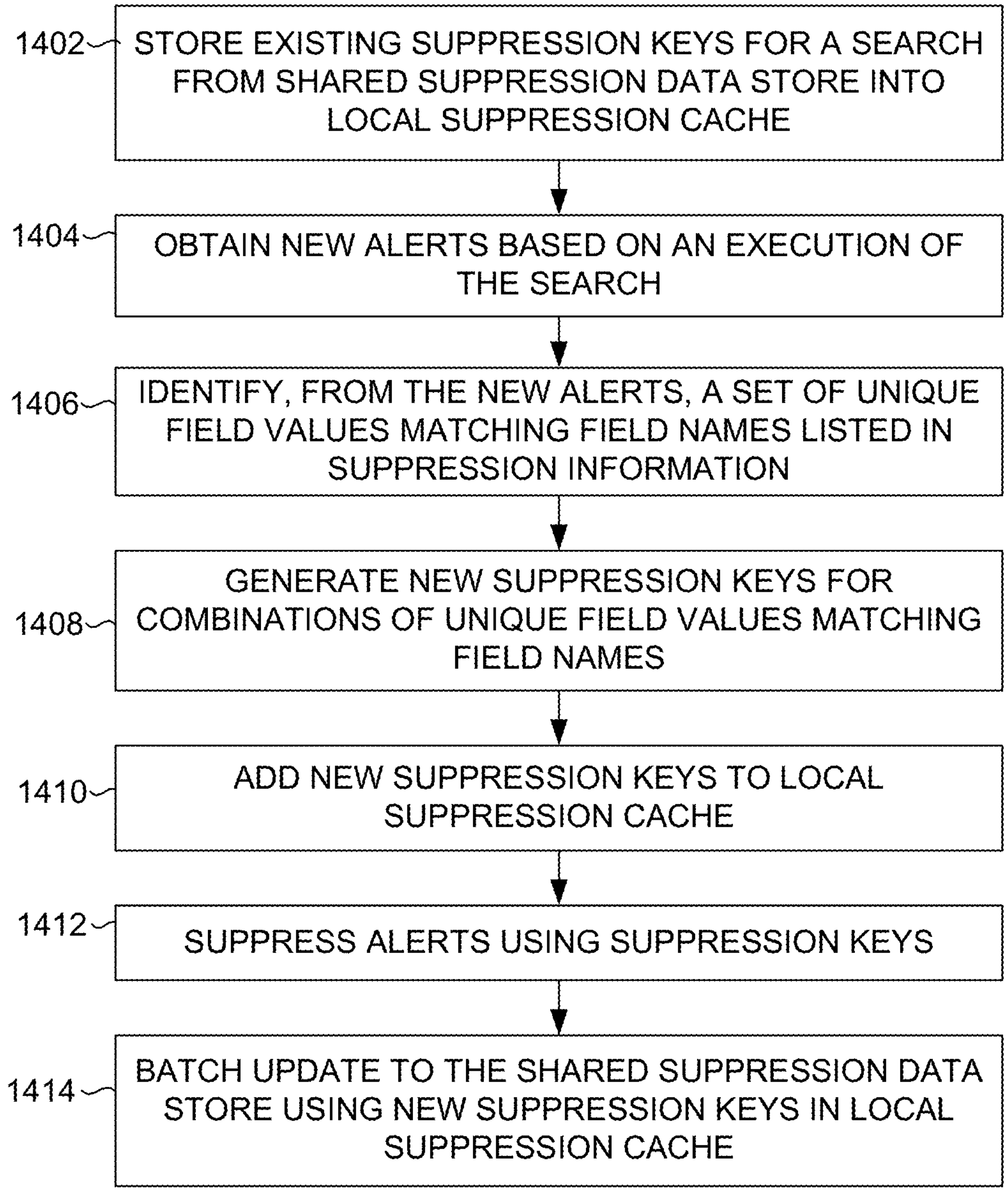
FIG. 14 is a flow diagram illustrating an embodiment of generating and using suppression records.

FIG. 14 shows a flowchart for suppression key management. In block 1402, the existing suppression keys for a search from the shared suppression data store are stored in the local suppression data store. The processing node obtains the existing suppression records by querying the shared suppression data store with the saved search selector of the search. Responsive to the query, the shared suppression data store transmits the suppression records to the processing node, which stores the existing suppression records in the local suppression data store.

The processing node executes a search. Based on an execution of a search, new alerts are obtained in block 1404. For field based suppression, from the new alerts, a set of unique field values matching field names listed in suppression information in block 1406 are identified. In block 1408, new suppression keys are generated for combinations of unique field values matching the field names in the suppression information. One method of identifying combinations of field values is based on the alerts themselves. Specifically, for each unique combination of field values represented in the alerts, a suppression key is generated. Another method of identifying combinations of field values is to determine, individually for each field name, the set of unique field values in the alerts. Then, combinations of field values are identified independent of the alerts. From the combinations of field values, suppression keys are generated. For example, a hash function may be executed individually for each combination to calculate a suppression key for the combination.

The suppression keys are stored in the local suppression cache in block 1410. Further, alerts are suppressed, if required, using suppression keys in block 1412. The alerts may be suppressed based on the existing suppression keys generated in block 1402 and the new suppression keys in block 1408. For each new suppression key, a single alert may be left not suppressed while remaining alerts matching the new suppression key are suppressed.

Further, in block 1414, an update is transmitted as a batch to the shared suppression data store using new suppression keys in the local suppression cache. In order to prevent multiple communications, a single transmission of new suppression keys may be performed. By performing the batch update, the overall network bandwidth is reduced.

Figure 15:
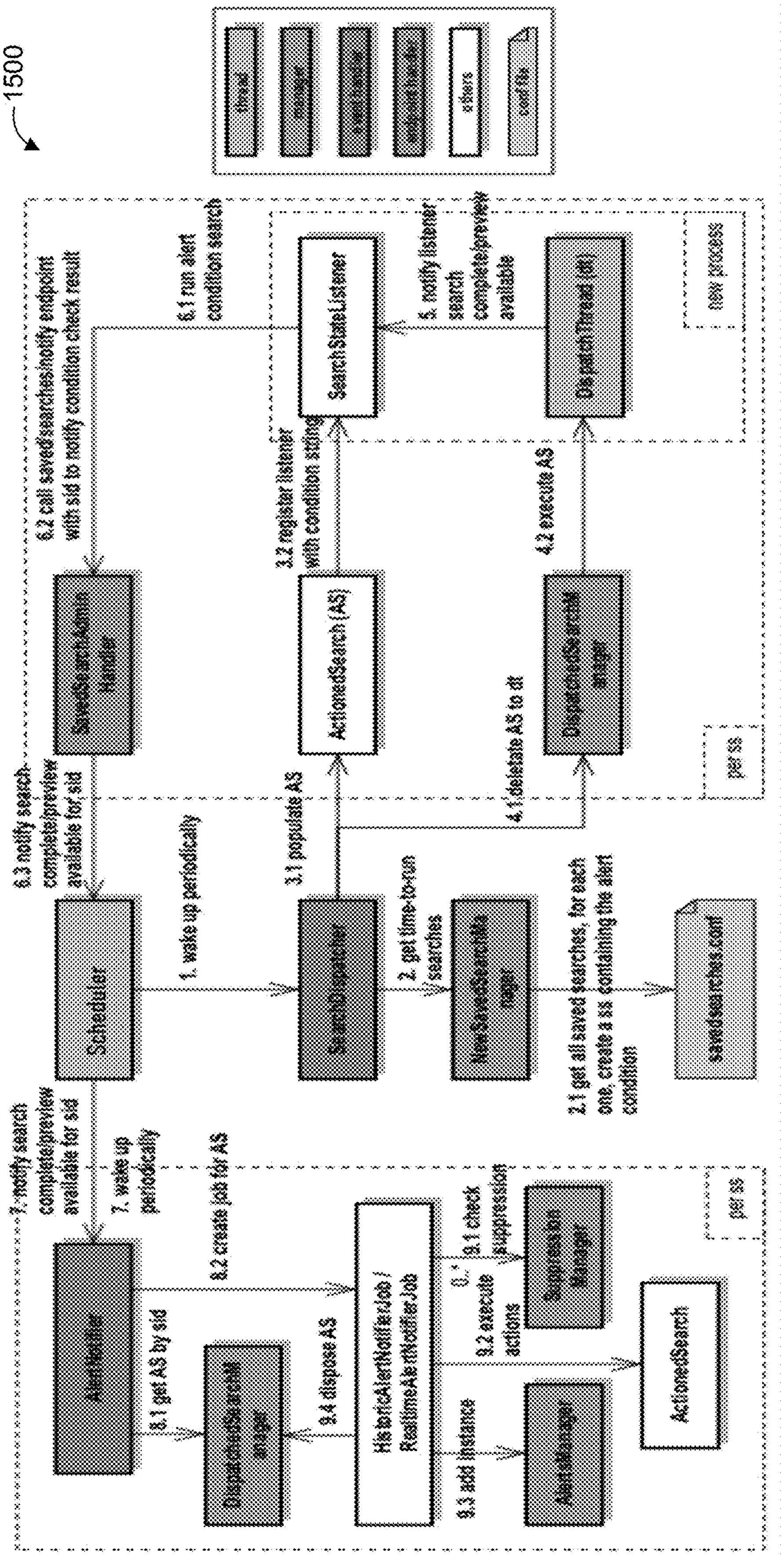
FIG. 15 is an example of a distributed alert and suppression management architecture in accordance with an embodiment.

6.0. Example of Cluster Computing with Distributed Alert and Suppression Management FIG. 15 is an example of a distributed alert and suppression management architecture 1500 in accordance with an embodiment. As shown in FIG. 15, the example distributed alert and suppression management architecture 1500 includes an alert notifier, a dispatch search manager, an alert job queue, an alerts manager, a suppression manager, a scheduler, a search dispatcher, a saved search manager, a saved search administrator handler, a dispatched search manager, and dispatch threads. The alert notifier may be periodically awakened by the scheduler to process historical (e.g., scheduled) alerts. Two kinds of alert handling are performed in a cluster of processing nodes, one for alert triggering, the other for communicating alert information with the shared data store.

The alert triggering workflow includes the following:

1) The scheduler places scheduled search queries into a search job queue.
2) A job executor obtains a search job from the search job queue, and delegates the search job to a search head (i.e., a processing node).
3) The search head receives the search job from the job executor, and dispatches the search locally. When dispatching the scheduled search, the search job is marked with triggerAction=true regardless of whether the scheduled search is a real-time search or a historical search.
4) For a real-time search, the search job may not finish. Periodically, the real-time search generates a preview, and evaluates a trigger condition on the preview. If the preview satisfies the trigger condition, the real-time search process notifies the main splunkd service via a POST command to "saved/searches/ss_name/notify", which places a "RealTimeAlertNotifierJob" into the alert job queue.
5) There are two ways to collect results of completed scheduled historical searches:

A) Upon completion, a scheduled search checks if the trigger condition is satisfied. If the condition is satisfied, the search process notifies the main splunkd service via a POST command to the endpoint "saved/searches/ss_name/notify", which places a Historic AlertNotifierJob into the alert job queue.

B) The AlertNotifier periodically (e.g., every 30 seconds) collects completed search jobs, and places the completed scheduled search jobs (e.g., HistoricAlertNotifierJobs) into the alert job queue.

6) The job executor pops, from the alert job queue, an AlertNotifierJob (either Historic AlertNotifierJob, or RealTimeAlertNotifierJob), and executes the job.

A) If the scheduled search job generates an error condition, the scheduled search job is not processed any further.

B) If the "condition is met" flag is not initialized, the job executor evaluates the trigger condition.

C) If the trigger condition evaluates to "true," the job executor checks if the alert can be suppressed by consulting the suppression data store. If the alert is not suppressed, the job executor executes the actions associated with the alert. Suppression information (e.g., a suppression record) may be added during the check. If the suppression is enabled, and there is no corresponding suppression information, new suppression information is sent to the suppression manager.

D) The job executor registers the alert by calling "Alerts-Manager::instance( )-<alertTriggered.

A streaming metric alert is run as a historical scheduled search, and the scheduled search may be restricted to one search head. The evaluation of a streaming metric alert can be done by group, where groups are defined as a list of dimension fields, delimited by comma. If there are multiple groups, each group (e.g., dimension field) may be evaluated against the trigger condition.

Figure 17:
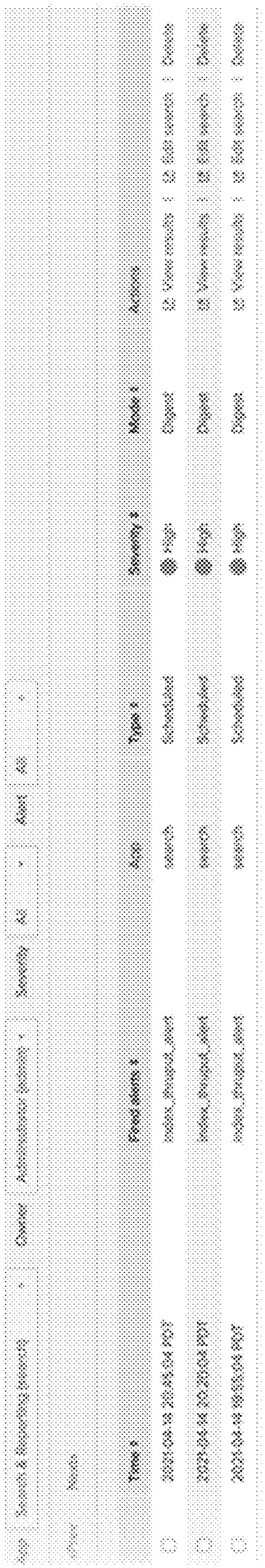
FIG. 17 is an example of an interface showing alert records in accordance with an embodiment.

Triggered alerts are sent to the alert manager. The shared data store plays the roles of alert manager and suppression manager. Examples of alert records 1700 for alerts are shown in FIG. 17 and below:

```
[timestamp=04-14-2021 22:25:03.724, user=admin, action=alert__fired,
ss__user="nobody", ss__app="search",
ss__name="index__thruput__alert__field__suppression",
sid="scheduler___admin___search___RMD5d6d15a37d355d4f0__at__1618464300__1
2005", alert__actions="lookup", severity=5, trigger__time=1618464303,
expiration=1618550703, digest__mode=0, triggered__alerts=8]
```

The workflow for communicating alert information with the shared data store includes the following:

Splunk search head sends latest alerts and suppressions to the data store.

The shared data store includes alerts and suppressions from the search heads. There are two ways of sending the alerts and suppressions to the shared data store.

1) New alerts and/or new suppressions are sent to the shared data store instantly, which can help the shared data store maintain the global alerts and suppressions in a real time manner, with lower latency.

2) Each search head periodically sends the latest alerts and suppressions to the shared data store, which can help reduce the number of transactions between the search heads and the external data store, thereby improving performance.

When updating the alert or suppression data store, "condition expressions" can be used to confirm that the new item has a later timestamp (e.g., expiration time).

Splunk search head fetches alerts and suppressions from the shared data store.

The shared data store includes the alerts and suppressions from the search heads. Each search head can obtain the latest alerts or suppressions from the data store.

1) When there is a need to show alerts, or check suppressions, a search head can send a query to the shared data store and use the query result to either show the alerts or suppress the alerts. This method has the benefit of a stateless search head in terms of alerts and suppressions. This technique is a form of lazy fetching when there is a need to suppress alerts, based on an assumption the number of alert conditions to be evaluated is small. A possible optimization is to use a local cache to store suppressions. Fetching of the entire suppression data store from the shared data store is unnecessary—just the individual entry based on the suppression key is needed.

2) Each search head periodically fetches the global alerts and suppressions from the shared data store. This method has better performance in terms of a smaller number of data store transactions.

Alert suppression groups can encompass multiple saved searches, where the key is based on the shared group name. This technique may require the suppressionKey to be used as the key (which does not affect suppression handling).

7.0. Example of Alert Triggering, Incremental Fetching and Deletion of Triggered Alerts FIG. 16A shows an example 1600 of a partition key and sort key of the alerts data store. The partition key may be a tuple "GUID; owner; app; saved_search_name", where GUID is the GUID of the search head cluster so that multiple search head clusters can be managed in the same alerts table. The alert_id sort key implements incremental fetching of triggered alerts and is represented as "timestamp, search_id" to store a triggered alert, where the timestamp is the time the alert was triggered or the delete alert record created, and search_id is the search id for the alert that got triggered.

Each search head may execute a separate AlertFetcher thread that periodically (e.g., every 60 seconds by default) runs a query on the alerts DynamoDB® table. The query does an incremental fetch with key condition expression as saved_search_selector::saved_search_selector and alert_id>=:trigger_time to do an incremental fetch and writes the results to the local alerts map (e.g., the local alerts data store). For the next fetch cycle, thread uses trigger_time as the trigger time of the latest alert entry in the cache for a saved search selector. The query using key condition expression uses read capacity only for the items that are returned based on the match, providing cost savings as compared to a full query on the partition key. For example, if a saved search has 1000 alerts triggered but only one alert triggered in the last minute, the incremental query would use the same amount of processing resources as only a single alert that was triggered in the last minute. In addition to the cost savings, incremental fetching also provides performance improvement as far fewer items need to be fetched in each cycle as opposed to the entire set of triggered alerts.

In one or more embodiments, an AMAZON WEB SERVICES (AWS) Lambda may be used to update alert counts on the table. Since many configured alerts may exist for different users and applications, it may be unnecessary to query triggered alerts for those when there may be no actual alerts triggered for those. For this optimization, the lambda function is used to keep an alert count for each saved search selector and then write all the saved search selector partition keys under a separate partition key GUID; SSS in a saved search selector record; if the alert count is non-zero. FIG. 16B shows an example table implementation of the shared alerts data store 1602 for the two saved searches that have triggered alerts.

As shown in FIG. 16B, at least two original alert records are in the alert data store (i.e., the last two rows) The counting record indicates a total alert count of 1 for the saved search selector, "GUID; USER; APP; ALERT1," and a total alert count of 2 for the saved search selector, "GUID; USER; APP; ALERT2." Because both total alert counts are greater than one, a saved search selector record exists for both alert types.

For each alert fetch cycle, a search head would first query all the sort keys under GUID; SSS partition key to get the saved search selectors that have triggered alerts and then do an incremental fetch on each of those saved searches using the key condition expression based on the last fetched trigger time.

The management of total alerts count for a saved search and the saved searches that have triggered alerts may be done using a compute service, such as the AWS Lambda function.

The AWS Lambda function is used as a trigger on the alerts DynamoDB® table, so that the total number of triggered alerts can be maintained as a pre-computed aggregate for each saved search selector. The triggered alert count is kept with partition key as saved search selector and sort key as #TOTAL_ALERTS and the attribute total_alerts_count. For each saved search selector, if the triggered alert count is non-zero, the saved search selector is added to the partition key GUID; SSS or deleted otherwise. The write is only done once when the count becomes non-zero and the entry is deleted when the count reaches zero.

When an alert is triggered, it is added to the alerts DynamoDB® table which generates a new record on the DynamoDB® Streams for this table. The Lambda function polls the DynamoDB® Stream and increments the total alerts count if the record is an insertion of a new alert item in the table or decrements the total alerts count if the record is deletion of an existing alert item in the table. If a Lambda operation fails, it is retried up to a maximum of 3 times.

Different ways may be used to delete an alert. In a first way, automatic alert deletion may occur based on TTL. Alert expiration time attribute expiration_time is used as the TTL (Time to Live) attribute to automatically delete the expired alerts. This is done in a background process by DynamoDB® automatically. TTL may delete expired items within a couple of days to a few minutes, but there can still be alerts in the table that are expired but still present on the table. The incremental alert fetching thread removes the alerts that are expired according to expiration time, from the local alert data store on every fetch cycle. The advantage with using TTL attributes is that the delete operations are not charged, and there are very few expired alerts on the table that need to be removed from the local alert data store.

Further, a user interacting with the GUI may delete arbitrary triggered alerts for a saved search selector. For example, the user might be reviewing the triggered alerts page and may decide to delete the ones that are triaged. The triggered alert is immediately deleted from the DynamoDB® table, and a write is also made to the DynamoDB® table as an item that looks like a triggered alert but is actually a delete alert record with trigger time in sort key as the current time. The write with the delete alert record may be made prior to deleting the triggered alert. The triggered alert is also deleted from the local data store to reflect the change. For example, showing the important attributes only, consider the original triggered alert 1604 of FIG. 16C.

When the triggered alert 1604 is deleted, a deleted alert record 1606 in FIG. 16D is generated. The delete alert record includes an alert_id sort key tuple with a timestamp for the time that the delete record is generated and the same search id for alert 1604. The delete alert record further annotates the alert_id sort key in the tuple with a "D" indicating that the record is a delete entry. Furthermore, the expiration_time of the delete entry 1606 will be the expiration time of the original triggered alert 1604. Having the same expiration time will ensure that any processing node of the cluster that could have cached that original triggered alert will read this delete entry and update the local cache correctly. The trigger_time attribute in the delete entry 1606 will be the trigger time of the original triggered alert, so that the delete entry can be identified as shown in FIG. 16D.

Note that the original triggered alert is deleted and there is a new delete entry for the same alert which will be read by other search heads in the new fetch cycle, and the delete entry will propagate to their local cache. In the alert_id sort key, the timestamp is the time the delete was initiated and based on sorting order it will be returned to other search heads on their incremental fetch cycle. The trigger_time attribute and the search id from alert_id sort key will be used by other search heads to determine which triggered alert was actually deleted.

For the table in FIG. 16B for 2 saved searches, if the triggered alert for sid2 got deleted, the new table 1608 with delete entry will appear as shown in FIG. 16E. As shown in FIG. 16E, the #TOTAL_ALERTS count for ALERT2 also accounts for the delete entries since it is possible that all triggered alerts for a saved search selector are deleted, and in that case other search heads will need to update their local state for such alerts while continuing to execute the corresponding searches.

Continuing with the example, consider the scenario in which a new alert is triggered for saved search selector ALERT1 with the search id sid4. The alert table 1610 is shown in FIG. 16F. As shown, a second alert record is added, and the counting record #TOTAL_ALERTS for ALERT1 is updated to 2.

Continuing with the example, consider that both the alerts for saved search selector ALERT1 are deleted that refer to search ids sid1 and sid4. Thus, both alert records on the table are deleted, and there are delete entries added with the same expiration time as original alerts as shown in table 1612 of FIG. 16G.

The total alert count for GUID1; user; app; alert1 is still 2 due to the delete entries that are present. By keeping the total alert count at 2, the other search heads will read in these entries on the search head's respective next fetch cycle and update their local alert data stores. As shown in table 1614 of FIG. 16H, after the expiration times te1 and te4 have elapsed, the total alert count for GUID1; user; app; alert1 will drop to 0, and the saved search alert1 will be removed by the lambda from the set of saved search selectors that have triggered alerts.

When a saved search is deleted, the triggered alerts for that saved search selector will be deleted. This is because the user can create a new saved search with the same user, application and name, and then the triggered alerts should not show up from the deleted saved search. Same is the case with disabled saved searches, all the triggered alerts need to be removed.

This is handled with the same approach as with user initiated deletes of triggered alerts. Here, all the triggered alerts under the saved search selector partition key are deleted from the DynamoDB® table and also the corresponding delete entries for the triggered alerts are written to the table so that other search heads can update their local cache for these deleted triggered alerts. The delete entries may be added prior to deleting the triggered alerts. The local cache is also cleared to remove these triggered alerts under the saved search selector.

As discussed above, users may modify alert records. FIG. 17 shows an example of a graphical user interface showing alert records 1700. As shown, for each alert record, the user may view the results to view individual events, edit the search, or delete the alert.

Figure 18:
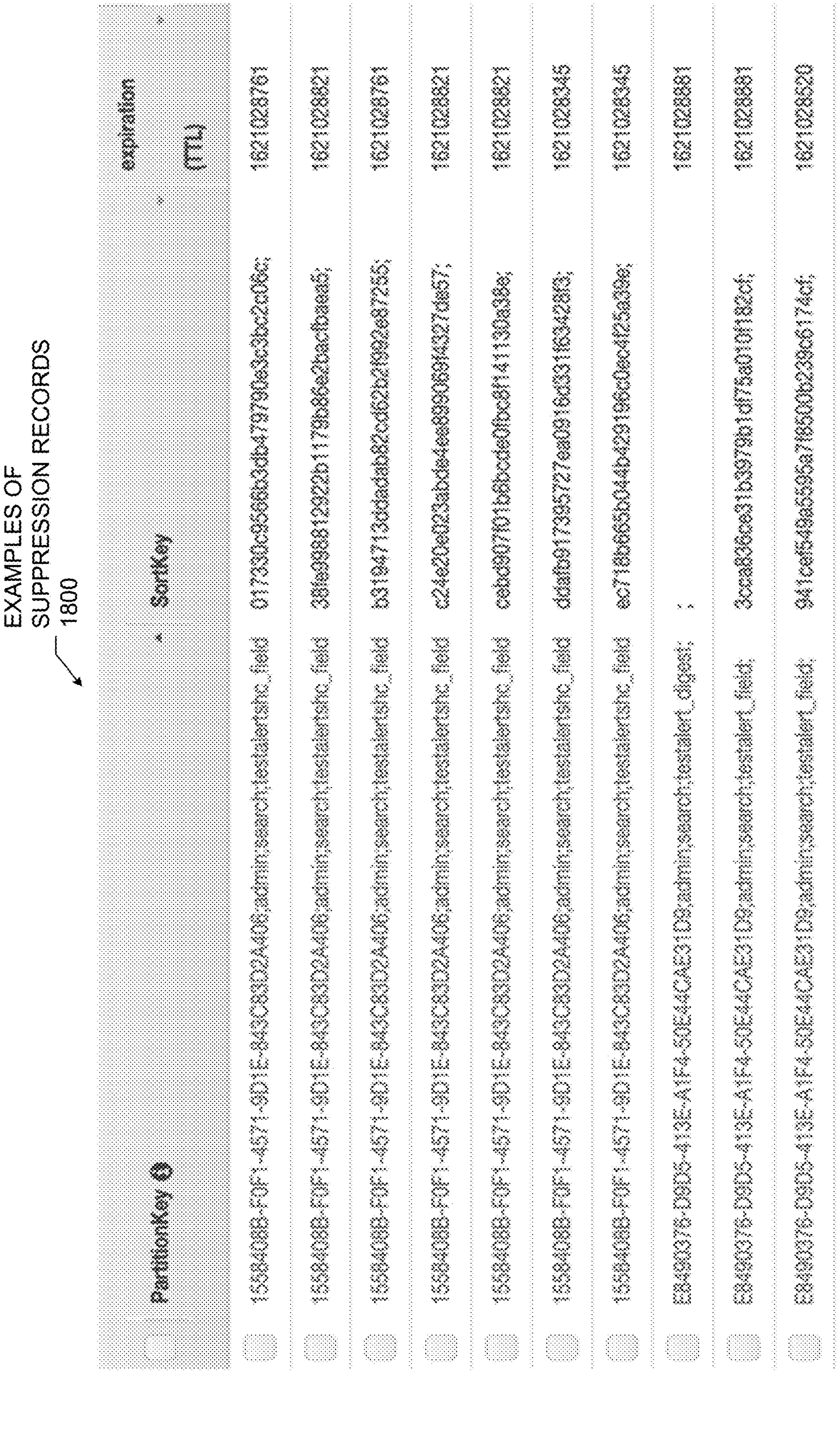
FIG. 18 is an example of an interface showing suppression records in accordance with an embodiment.

FIG. 18 shows examples of suppression records. As shown in FIG. 18, each suppression record may have a partition key, a sort key and an expiration time.

8.0. Terminology

Computer programs typically comprise one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Furthermore, use of "e.g.," is to be interpreted as providing a non-limiting example and does not imply that two things are identical or necessarily equate to each other.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from GUIs, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C. sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method, comprising:

sending, by a first processing node, a request comprising an identified alert record from a shared alert data store that is shared amongst a cluster of processing nodes comprising the first processing node;

receiving, by the first processing node and responsive to the request, a delete alert record, that is separate from the identified alert record, uniquely identifying the identified alert record to delete and comprising an annotation identifying a new delete alert record as being a delete alert record type;

matching, by the first processing node and responsive to detecting the annotation identifying the delete alert record type, the delete alert record to a local copy of the identified alert record based on the delete alert record uniquely identifying the identified alert record via a comparison of at least one of trigger times, saved search selectors or alert identifiers; and deleting, by the first processing node and based on the annotation, the local copy of the identified alert record according to the delete alert record.

2. The computer-implemented method of claim 1, wherein the delete alert record comprises a same trigger time as the identified alert record, and a new timestamp based on a time of adding the new delete alert record to the shared alert data store.

3. The computer-implemented method of claim 1, wherein the new delete alert record comprises:

a same trigger time, a same expiration time, and a same saved search selector as the identified alert record, and a new timestamp based on a time of adding the new delete alert record to the shared alert data store.

4. The computer-implemented method of claim 1, wherein the new delete alert record comprises:

a same trigger time as the identified alert record, and a new timestamp in an alert identifier field based on a time of adding the new delete alert record to the shared alert data store.

5. The computer-implemented method of claim 1, further comprising:

sending, to the shared alert data store a latest trigger time in a local alert data store of the first processing node; and obtaining, from the shared alert data store, a second set of alert records having a timestamp after the latest trigger time.

6. The computer-implemented method of claim 1, further comprising:
sending, to the first processing node, a latest trigger time in a local alert data store of the first processing node; and
obtaining, from the shared alert data store, a second set of alert records having a timestamp after the latest trigger time and matching a set of saved search selectors having at least one alert issued, the second set of alert records comprising the new delete alert record.

7. The computer-implemented method of claim 1, further comprising:
obtaining, by a second processing node, from the shared alert data store, a set of saved search selectors;
obtaining, by the second processing node, the first set of alert records for a saved search selector in the set of saved search selectors;
storing, by the second processing node, the first set of alert records in a local alert data store;
receiving, by the second processing node, a request to display the first set of alert records; and
displaying, by the second processing node, the first set of alert records.

8. The computer-implemented method of claim 1, further comprising:
obtaining a plurality of new alerts based on an execution of a search;
identifying, from the plurality of new alerts, a set of unique field values matching a set of field names listed in suppression information;
generating a plurality of new suppression keys corresponding to a plurality of combinations of the set of unique field values;
adding the plurality of new suppression keys to a local suppression cache; and
batching an update to a shared suppression data store using the plurality of new suppression keys in the local suppression cache.

9. The computer-implemented method of claim 1, further comprising:
storing a plurality of existing suppression keys for a search from a shared suppression data store into a local suppression cache;
obtaining a plurality of new alerts based on an execution of the search;
generating a plurality of new suppression keys corresponding to a plurality of combinations of a set of unique field values;
suppressing the plurality of new alerts using the plurality of existing suppression keys and the plurality of new suppression keys; and
batching an update to the shared suppression data store using the plurality of new suppression keys.

10. The computer-implemented method of claim 1, further comprising:
issuing, by the first processing node, a first alert when first event data satisfies a trigger condition;
sending, by the first processing node and to a shared data store, a first alert record of the first alert and suppression information based at least in part on the first alert;
determining, by a second processing node of the cluster of processing nodes, that second event data satisfies the trigger condition;
obtaining, by the second processing node and from the shared data store, the suppression information indicating that an expiration time for suppressing the first alert is unexpired; and
sending, by the second processing node and to the shared alert data store, a second alert record of a second alert without issuing the second alert.

11. A computing device, comprising:
a processor; and
a non-transitory computer-readable medium having stored thereon instructions that, when executed by the processor, cause the processor to perform operations including:
sending, by a first processing node, a request comprising an identified alert record from a shared alert data store that is shared amongst a cluster of processing nodes comprising the first processing node,
receiving, by the first processing node and responsive to the request, a delete alert record, that is separate from the identified alert record, uniquely identifying the identified alert record to delete and comprising an annotation identifying a new delete alert record as being a delete alert record type,
matching, by the first processing node and responsive to detecting the annotation identifying the delete alert record type, the delete alert record to a local copy of the identified alert record based on the delete alert record uniquely identifying the identified alert record via a comparison of at least one of trigger times, saved search selectors or alert identifiers, and
deleting, by the first processing node and based on the annotation, the local copy of the identified alert record according to the delete alert record.

12. The computing device of claim 11, wherein the new delete alert record comprises:
a same trigger time as the identified alert record, and
a new timestamp based on a time of adding the new delete alert record to the shared alert data store.

13. The computing device of claim 11, wherein the new delete alert record comprises:
a same trigger time, a same expiration time, and a same saved search selector as the identified alert record, and
a new timestamp based on a time of adding the new delete alert record to the shared alert data store.

14. The computing device of claim 11, wherein the new delete alert record comprises:
a same trigger time as the identified alert record, and
a new timestamp in an alert identifier field based on a time of adding the new delete alert record to the shared alert data store.

15. The computing device of claim 11, wherein the operations further comprise:
sending, to the shared alert data store a latest trigger time in a local alert data store of the first processing node; and
obtaining, from the shared alert data store, a second set of alert records having a timestamp after the latest trigger time.

16. The computing device of claim 11, wherein the operations further comprise:
sending, to the first processing node, a latest trigger time in a local alert data store of the first processing node; and
obtaining, from the shared alert data store, a second set of alert records having a timestamp after the latest trigger time and matching a set of saved search selectors having at least one alert issued, the second set of alert records comprising the new delete alert record.

17. A non-transitory computer-readable medium having stored thereon instructions that, when executed by one or more processors, cause the one or more processors to perform operations including:

sending, by a first processing node, a request comprising an identified alert record from a shared alert data store that is shared amongst a cluster of processing nodes comprising the first processing node;

receiving, by the first processing node and responsive to the request, a delete alert record, that is separate from the identified alert record, uniquely identifying the identified alert record to delete and comprising an annotation identifying a new delete alert record as being a delete alert record type;

matching, by the first processing node and responsive to detecting the annotation identifying the delete alert record type, the delete alert record to a local copy of the identified alert record based on the delete alert record uniquely identifying the identified alert record via a comparison of at least one of trigger times, saved search selectors or alert identifiers; and deleting, by the first processing node and based on the annotation, the local copy of the identified alert record according to the delete alert record.

18. The non-transitory computer-readable medium of claim 17, wherein the new delete alert record comprises:

a same trigger time as the identified alert record, and a new timestamp based on a time of adding the new delete alert record to the shared alert data store.

19. The non-transitory computer-readable medium of claim 17, wherein the new delete alert record comprises:

a same trigger time, a same expiration time, and a same saved search selector as the identified alert record, and a new timestamp based on a time of adding the new delete alert record to the shared alert data store.

20. The non-transitory computer-readable medium of claim 17, further comprising:

sending, to the shared alert data store a latest trigger time in a local alert data store of the first processing node; and obtaining, from the shared alert data store, a second set of alert records having a timestamp after the latest trigger time.

* * * * *